(12) United States Patent
Jeon et al.

(10) Patent No.: US 12,408,121 B2
(45) Date of Patent: Sep. 2, 2025

(54) POWER HEADROOM REPORT FOR MULTIPLE SOUNDING REFERENCE SIGNAL RESOURCE SETS

(71) Applicant: Ofinno, LLC, Reston, VA (US)

(72) Inventors: Hyoungsuk Jeon, Centreville, VA (US); Esmael Hejazi Dinan, McLean, VA (US); Ali Cagatay Cirik, Chantilly, VA (US); Kai Xu, Great Falls, VA (US); Kyungmin Park, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 113 days.

(21) Appl. No.: 18/381,834

(22) Filed: Oct. 19, 2023

(65) Prior Publication Data

US 2024/0056986 A1 Feb. 15, 2024

Related U.S. Application Data

(63) Continuation of application No. 17/401,675, filed on Aug. 13, 2021, now Pat. No. 11,895,598, which is a
(Continued)

(51) Int. Cl.
*H04W 52/30* (2009.01)
*H04W 24/08* (2009.01)
(Continued)

(52) U.S. Cl.
CPC ......... *H04W 52/365* (2013.01); *H04W 24/08* (2013.01); *H04W 76/00* (2013.01); *H04W 24/10* (2013.01)

(58) Field of Classification Search
CPC ... H04W 52/365; H04W 24/08; H04W 76/00; H04W 24/10
See application file for complete search history.

(56) References Cited

U.S. PATENT DOCUMENTS 9,516,610 B2 * 12/2016 Boström ............ H04W 52/365
9,838,982 B2    12/2017 Yi et al.
(Continued)

FOREIGN PATENT DOCUMENTS

WO     2016/013814 A1    1/2016

OTHER PUBLICATIONS

R1-1901206; 3GPP TSG-RAN WG1 Ad-Hoc Meeting 1901; Taipei, Taiwan, Jan. 21-25, 2019; Agenda item: 7.2.8.3; Title: On Beam Failure Recovery for SCell; Source: Convida Wireless; Document for: Discussion.
(Continued)

*Primary Examiner* — Andrew Wendell
(74) *Attorney, Agent, or Firm* — Matthew Fernandez; Kavon Nasabzadeh; Jacob L. Mangan

(57) ABSTRACT

A wireless device receives a radio resource control message comprising a first sounding reference signal (SRS) resource set identifier of a first SRS resource set of a serving cell and a second SRS resource set identifier of a second SRS resource set of the serving cell. The wireless device transmits a power headroom report (PHR) medium access control control element (MAC CE) comprising a first field indicating a first power headroom value associated with the first SRS resource set and a second field indicating a second power headroom value associated with the second SRS resource set. The order of the first field and the second field in the PHR MAC CE is based on an ascending order of the first SRS resource set identifier and the second SRS resource set identifier.

20 Claims, 28 Drawing Sheets

Related U.S. Application Data continuation of application No. PCT/US2020/018439, filed on Feb. 14, 2020.

(60) Provisional application No. 62/805,898, filed on Feb. 14, 2019.

(51) Int. Cl.
  H04W 52/36 (2009.01)
  H04W 76/00 (2018.01)
  H04W 24/10 (2009.01)

(56) References Cited

U.S. PATENT DOCUMENTS

| | | | |
|---|---|---|---|
| 10,361,833 B2* | 7/2019 | Chen | H04L 5/0057 |
| 11,757,483 B2 | 9/2023 | Zhou et al. | |
| 2012/0314665 A1 | 12/2012 | Ishida et al. | |
| 2013/0083729 A1* | 4/2013 | Xu | H04W 52/325 |
| | | | 370/328 |
| 2016/0262118 A1 | 9/2016 | Kim et al. | |
| 2016/0309426 A1 | 10/2016 | Zhang et al. | |
| 2017/0223642 A1* | 8/2017 | Lee | H04W 52/365 |
| 2019/0081753 A1 | 3/2019 | Jung et al. | |
| 2019/0104477 A1 | 4/2019 | MolavianJazi et al. | |
| 2019/0239170 A1 | 8/2019 | Thangarasa et al. | |
| 2019/0253985 A1* | 8/2019 | Dinan | H04W 52/242 |
| 2019/0274155 A1* | 9/2019 | Bhattad | H04L 5/0073 |
| 2019/0394732 A1* | 12/2019 | Loehr | H04L 25/0224 |
| 2020/0052741 A1 | 2/2020 | Kim et al. | |
| 2020/0145927 A1 | 5/2020 | Sun et al. | |
| 2020/0145936 A1 | 5/2020 | Lee | |
| 2020/0374073 A1* | 11/2020 | Chen | H04L 5/0048 |
| 2021/0045070 A1 | 2/2021 | Yi et al. | |

OTHER PUBLICATIONS

R1-1901275; 3GPP TSG RAN WG1 Ad-Hoc Meeting 1901; Taipei, Taiwan, Jan. 21-25, 2019; Source: Intel Corporation; Title: On multi-TRP/multi-panel transmission; Agenda item: 7.2.8.2; Document for: Discussion and Decision.

R1-1901336; 3GPP TSG RAN WG1 Ad-Hoc Meeting 1901; Taipei, Taiwan, Jan. 21-25, 2019; Agenda Item: 7.2.2.2.5; Source: LG Electronics; Title: Summary on wide-band operation for NR-U; Document for: Discussion and decision.

R1-1901430; 3GPP TSG RAN WG1 Ad-Hoc Meeting 1901; Taipei, Taiwan, Jan. 21-25, 2019; Agenda item: 7.2.8.3; Source: LG Electronics; Title: Updated feature lead summary of Enhancements on Multi-beam Operations; Document for: Discussion and Decision. International Search Report and Written Opinion of the International Searching Authority mailed Jun. 8, 2020 in International application No. PCT/US2020/018439.

R1-1718625; 3GPP TSG RAN WG1 Meeting 90bis; Prague, CZ, Oct. 9-13, 2017; Agenda Item: 7.6.1 Source: ITL; Title: UL power control and PHR; Document for: Discussion and Decision.

R1-1900088; 3GPP TSG RAN WG1 Ad-Hoc Meeting #1901; Taipei, Jan. 21-25, 2019; Source: ZTE; Title: Enhancements on multi-beam operation; Agenda Item: 7.2.8.3; Document for: Discussion and Decision.

R1-1900294; 3GPP TSG RAN WG1 Ad-Hoc Meeting 1901; Taipei, Jan. 21-25, 2019; Source: OPPO; Title: Discussion on Multi-beam Operation Enhancements; Agenda Item: 7.2.8.3; Document for: Discussion and Decision.

R1-1900339; 3GPP TSG RAN WG1 Ad-Hoc Meeting 1901; Taipei, Jan. 21-25, 2019; Source: CATT; Title: Consideration on multi-TRP/panel transmission; Agenda Item: 7.2.8.2; Document for: Discussion and Decision.

R1-1900340; 3GPP TSG RAN WG1 Ad-Hoc Meeting 1901; Taipei, Jan. 21-25, 2019; Source: CATT; Title: Enhancements on multi-beam operation; Agenda Item: 7.2.8.3; Document for: Discussion and Decision.

R1-1900359; 3GPP TSG RAN WG1 Meeting AH-1901; Taipei, Taiwan Jan. 21-25, 2019; Agenda Item: 7.2.8.3 Enhancements on Multi-beam Operation; Source: Fraunhofer IIS, Fraunhofer HHI; Title: UE panel-specific UL transmission; Document for: Decision.

R1-1900377; 3GPP TSG RAN WG1 Meeting #AH1901; Taipei, Taiwan, Jan. 21-25, 2019; Agenda Item: 7.2.8.2; Source: Sony; Title: Considerations on Multi-TRP/Panel Transmission; Document for: Discussion and Decision.

R1-1900378; 3GPP TSG RAN WG1 Ad-Hoc Meeting 1901; Taipei, Taiwan, Jan. 21-25, 2019; Agenda Item: 7.2.8.3; Source: Sony; Title: Considerations on multi-beam operation; Document for: Discussion.

R1-1900386; 3GPP TSG RAN WG1 Ad-Hoc Meeting 1901; Taipei,Jan. 21-25, 2019; Agenda Item: 7.2.8.2; Source: Lenovo, Motorola Mobility; Title: Discussion of multi-panel transmission; Document for: Discussion.

R1-1900387; 3GPP TSG RAN WG1 Ad-Hoc Meeting 1901; Taipei,Jan. 21-25, 2019; Agenda Item: 7.2.8.3; Source: Lenovo, Motorola Mobility; Title: Discussion of multi-beam operation; Document for: Discussion.

R1-1900418; 3GPP TSG RAN WG1 Ad-Hoc Meeting 1901; Taipei, Jan. 21-25, 2019; Source: CMCC; Title: Discussion on DL multi-TRP transmission; Agenda item: 7.2.8.2; Document for: Discussion & Decision.

R1-1900419; 3GPP TSG RAN WG1 Ad-Hoc Meeting 1901; Taipei, Jan. 21-25, 2019; Agenda item: 7.2.8.3; Source: CMCC; Title: Enhancements on multi-beam operation; Document for: Discussion and Decision.

R1-1900434; 3GPP TSG RAN WG1 Ad-Hoc Meeting 1901; Taipei, Taiwan, Jan. 21-25, 2019; Agenda item: 7.2.8.2; Source: AT Title: Overview of Multi-TRP/Panel Enhancements; Document for: Discussion/Decision.

R1-1900450; 3GPP TSG-RAN WG1 Ad hoc Meeting 1901; Taipei, Taiwan, Jan. 21-26, 2019; Source: AT Title: Enhancements on Multi-Beam Operation for NR; Agenda Item: 7.2.8.3; Document for: Discussion and Decision.

R2-1711801; 3GPP TSG-RAN WG2 #99bis; Prague, Czech Republic, Oct. 9-13, 2017; Agenda item: 10.3.1.12; Title: Extended PHR considering beam and TRxP change Document for: Discussion & Decision.

R1-1900503; 3GPP TSG RAN WG1 Ad-Hoc Meeting 1901; Taipei, Jan. 21-25, 2019; Source: Intel Corporation; Title: On Beam Management Enhancement; Agenda item: 7.2.8.3; Document for: Discussion and Decision.

R1-1900622; 3GPP TSG RAN WG1 Ad-Hoc Meeting 1901; Taipei, Taiwan, Jan. 21-25, 2019; Agenda item: 7.2.8.2; Source: LG Electronics; Title: Enhancements on multi-TRP/panel transmission; Document for: Discussion and Decision.

R1-1900623; 3GPP TSG RAN WG1 Ad-Hoc Meeting 1901; Taipei, Taiwan, Jan. 21-25, 2019; Agenda item: 7.2.8.3; Source: LG Electronics; Title: Discussion on multi-beam based operations and enhancements; Document for: Discussion and Decision.

R1-1900634; 3GPP TSG RAN WG1 Ad-Hoc Meeting Taipei, Taiwan, Jan. 21-25, 2019; Source: Mitsubishi Electric; Title: Views on multi-beam operation; Agenda Item: 7.2.8.3Enhancements on Multi-beam Operation; Document for: Discussion/Decision.

R1-1900637; 3GPP TSG RAN WG1 Ad-Hoc Meeting 1901; Taipei, Jan. 21-25, 2019; Agenda item: 7.2.8.3; Source: China Telecom; Title: Enhancements on Multi-beam Operation for UL beam management; Document for: Discussion.

R1-1900664; 3GPP TSG RAN WG1 Ad-Hoc Meeting 1901; Taipei, Taiwan, Jan. 21-25, 2019; Agenda item: 7.2.8.3; Source: NEC; Title: Discussion on multi-beam operation; Document for: Discussion and Decision.

R1-1900672; 3GPP TSG RAN WG1 Ad-Hoc Meeting 1901; Taipei, China, Jan. 21-25, 2019; Agenda item: 7.2.8.2; Source: NEC; Title: Discussion on multi-TRP transmission; Document for: Discussion and Decision.

R1-1900677; 3GPP TSG RAN WG1 Ad-Hoc Meeting 1901; Taipei, Taiwan, Jan. 21-25, 2019; Source: Panasonic; Title: On multi-TRP enhancements for NR MIMO in Rel. 16; Agenda Item: 7.2.8.2; Document for: Discussion.

(56) References Cited

OTHER PUBLICATIONS

R1-1900691; 3GPP TSG RAN WG1 Ad-Hoc Meeting 1901; Taipei, Taiwan, Jan. 21-25, 2019; Agenda item: 7.2.8.2; Source: Nokia, Nokia Shanghai Bell; Title: Enhancements on Multi-TRP/Panel Transmission; Document for: Discussion and Decision.

R1-1900692; 3GPP TSG RAN WG1 Meeting #AH-1901; Taipei, Taiwan, Jan. 21-25, 2019; Agenda item: 7.2.8.3; Source: Nokia, Nokia Shanghai Bell; Title: Enhancements on Multi-beam Operation; Document for: Discussion and Decision.

R1-1900700; 3GPP TSG RAN WG1 Ad-Hoc Meeting 1901; Taipei, Jan. 21-25, 2019; Agenda Item: 7.2.8.3; Source: Spreadtrum Communications; Title: Discussion on multi-beam operation; Document for: Discussion and decision.

R1-1900711; 3GPP TSG RAN WG1 Meeting #AH1901; Taipei, Jan. 21-25, 2019; Agenda Item: 7.2.8.2; Source: Spreadtrum Communications; Title: Discussion on Multi-TRP transmission; Document for: Discussion and decision.

R1-1900728; 3GPP TSG RAN WG1 Meeting Ad-Hoc Meeting 1901; Taipei, Taiwan, Jan. 21-25, 2019; Source: Ericsson; Title: On multi-TRP and multi-panel; Agenda Item: 7.2.8.2; Document for: Discussion and Decision.

R1-1900737; 3GPP TSG RAN WG1 Meeting AH-1901; Taipei, Taiwan, Jan. 21-25, 2018; Source: Fraunhofer HHI, Fraunhofer IIS; Title: Enhancements on multi-TRP/panel transmission for ultra-reliable communications; Agenda item: 7.2.8.2; Document for: Discussion and Decision.

R1-1900749; 3GPP TSG RAN WG1 Ad-Hoc Meeting 1901; Taipei, Taiwan, Jan. 21-25, 2019; Agenda Item: 7.2.8.2; Source: Apple; Title: Considerations on PDCCH design for NCJT; Document for: Discussion/Decision.

R1-1900750; 3GPP TSG RAN WG1 Ad-Hoc Meeting 1901; Taipei, Taiwan, Jan. 21-25, 2019; Agenda Item: 7.2.8.3; Source: Apple Inc.; Title: Consideration on beam measurement and reporting enhancement; Document for: Discussion/Decision.

R1-1900751; 3GPP TSG RAN WG1 Ad-Hoc Meeting 1901; Taipei, Taiwan, Jan. 21-25, 2019; Agenda Item: 7.2.8.6; Source: Apple; Title: Considerations on separate DL and UL beam reporting; Document for: Discussion/ Decision.

R1-1900808; 3GPP TSG RAN WG1 Ad-Hoc Meeting 1901; Taipei, Taiwan, Jan. 21-25, 2019; Source: InterDigital Inc.; Title: Enhanced Reliability for Multi-TRP Transmission; Agenda item: 7.2.8.2; Document for: Discussion and Decision.

R1-1900809; 3GPP TSG RAN WG1 Meeting AH 1901; Taipei, Taiwan, Jan. 21-25, 2019; Agenda Item: 7.2.8.3; Source: InterDigital, Inc.; Title: On Multi-Beam Operation Enhancement; Document for: Discussion and Decision.

R1-1900820; 3GPP TSG-RAN WG1 Meeting AH-1901; Taipei, Taiwan, Jan. 21-25, 2019; Source: MTI; Title: Enhancements on UL Multi-beam Operation; Agenda item: 7.2.8.3; Document for: Discussion and Decision.

R1-1900835; 3GPP TSG RAN WG1 Meeting AH 1901; Taipei, Taiwan, Jan. 21-25, 2019; Source: Sharp; Title: Discussion on multi-TRP/panel techniques for URLLC; Agenda Item: 7.2.8.2; Enhancements on Multi-TRP/Panel Transmission; Document for: Discussion and Decision.

R1-1900841; 3GPP TSG RAN WG1 Ad-Hoc Meeting 1901; Taipei, Jan. 21-25, 2019; Agenda Item: 7.2.8.2; Source: Xiaomi; Title: Enhancements on Multi-TRP/Panel Transmission; Document for: Discussion and Decision.

R1-1900842; 3GPP TSG RAN WG1 Ad-Hoc Meeting 1901; Taipei, Jan. 21-25, 2019; Agenda Item: 7.2.8.3; Source: Xiaomi; Title: Enhancements on beam management; Document for: Discussion and Decision.

R1-1900905; 3GPP TSG-RAN WG1 Meeting AH-1901R1-1900905; Jan. 21-25, 2019; Taipei, Taiwan; Agenda item: 7.2.8.2; Source: Qualcomm Incorporated; Title: Multi-TRP Enhancements; Document for: Discussion/Decision.

R1-1900906; 3GPP TSG RAN WG1 Ad-Hoc Meeting 1901; Taipei, Taiwan, Jan. 21-25, 2019; Agenda item: 7.2.8.3; Source: Qualcomm Incorporated; Title: Enhancements on Multi-beam Operation; Document for: Discussion/Decision.

R1-1900944; 3GPP TSG RAN WG1 AH-1901; Taipei, Jan. 21-25, 2019; Agenda item: 7.2.8.6; Source: Motorola Mobility, Lenovo; Title: Power control for multi-panel uplink transmission; Document for: Discussion and Decision.

R1-1900978; 3GPP TSG RAN WG1 Ad-Hoc Meeting 1901; Taipei, Jan. 21-25, 2019; Source: NTT Docomo, Inc; Title: Enhancements on multi-TRP/panel transmission; Agenda Item: 7.2.8.2; Document for: Discussion and Decision.

R1-1900979; 3GPP TSG RAN WG1 Ad-Hoc Meeting 1901; Taipei, Jan. 21-25, 2019; Source: NTT Docomo, Inc.; Title: Discussion on multi-beam enhancement; Agenda Item: 7.2.8.3; Document for: Discussion and Decision.

R1-1900990; 3GPP TSG RAN WG1 Ad-Hoc Meeting 1901; Taipei, Taiwan, Jan. 21-25, 2019; Agenda Item: 7.2.8.3; Source: ITRI; Title: Discussion on enhancements on multi-beam operation; Document for: Discussion and Decision.

R1-1901076; 3GPP TSG RAN WG1 Ad-Hoc Meeting 1901; Taipei, Taiwan, Jan. 21-25, 2019; Agenda item: 7.2.8.2; Source: Samsung; Title: Enhancements on Multi-TRP/Panel Transmission; Document for: Discussion and Decision.

R1-1901077; 3GPP TSG RAN WG1 Ad-Hoc Meeting 1901; Taipei, Taiwan, Jan. 21-25, 2019; Agenda item: 7.2.8.3; Source: Samsung; Title: Enhancements on multi-beam operations; Document for: Discussion and Decision.

R1-1901133; 3GPP TSG RAN WG1 Ad-Hoc Meeting 1901; Taipei, Jan. 21-25, 2019; Agenda Item: 7.2.8.2; Source: CAICT; Title: Discussion on URLLC reliability/robustness enhancement with multi-TRP/panel; Document for: Discussion and Decision.

R1-1901141; 3GPP TSG RAN WG1 Ad-Hoc Meeting 1901; Taipei, Taiwan, Jan. 21-25, 2019; Source: KDDI; Title: Discussion on multi-beam operation; Agenda Item: 7.2.8.3; Document for: Discussion and Decision.

R1-1901153; 3GPP TSG RAN WG1 Ad-Hoc Meeting 1901; Taipei, Taiwan, Jan. 21-25, 2019; Agenda Item: 7.2.8.2; Source: ASUSTeK; Title: Enhancements on multi-TRP or panel transmission; Document for: Discussion and Decision.

R1-1901154; 3GPP TSG RAN WG1 Ad-Hoc Meeting 1901; Taipei, Taiwan, Jan. 21-25, 2019; Agenda Item: 7.2.8.3; Source: ASUSTeK; Title: Enhancements on multi-beam operation; Document for: Discussion and Decision.

R1-1901164; 3GPP TSG RAN WG1 Ad-Hoc Meeting 1901Tdoc; Taipei, Taiwan, Jan. 21-25, 2019; Agenda Item: 7.2.8.3; Source: Ericsson; Title: Enhancements to multi-beam operation; Document for: Discussion, Decision.

R1-1901205; 3GPP TSG RAN WG1 Ad-Hoc Meeting 1901Tdoc; Taipei, Taiwan, Jan. 21-25, 2019; Agenda Item: 7.2.8.6; Source: Ericsson; Title: UL beam selection improvements; Document for: Discussion, Decision.

* cited by examiner

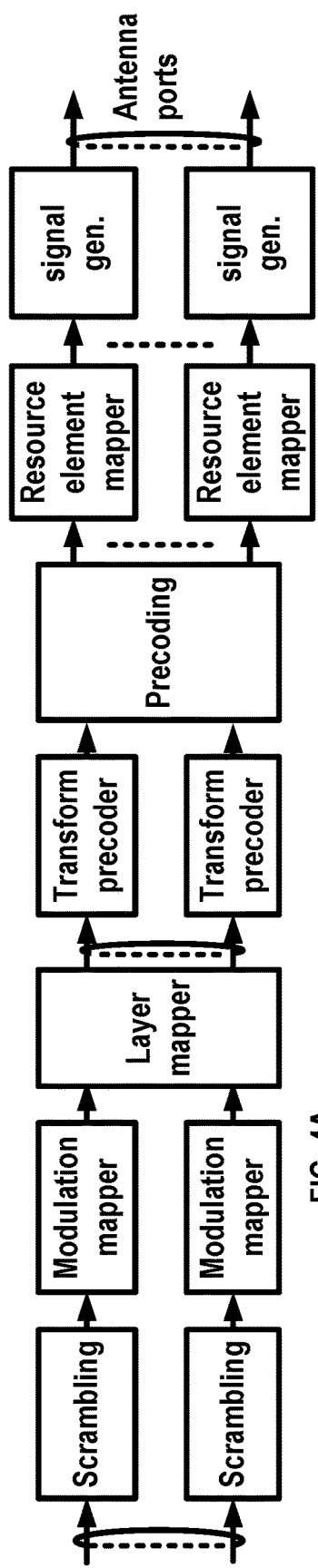
FIG. 4A
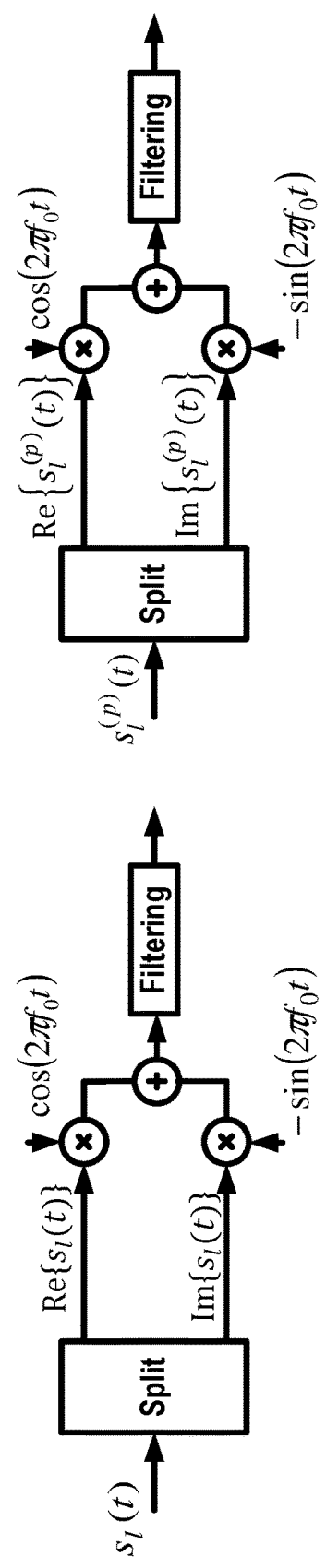
FIG. 4B
FIG. 4D
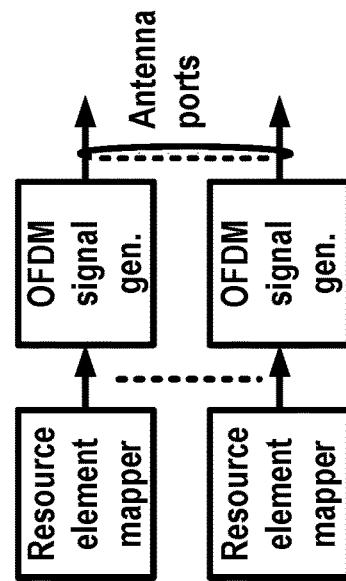
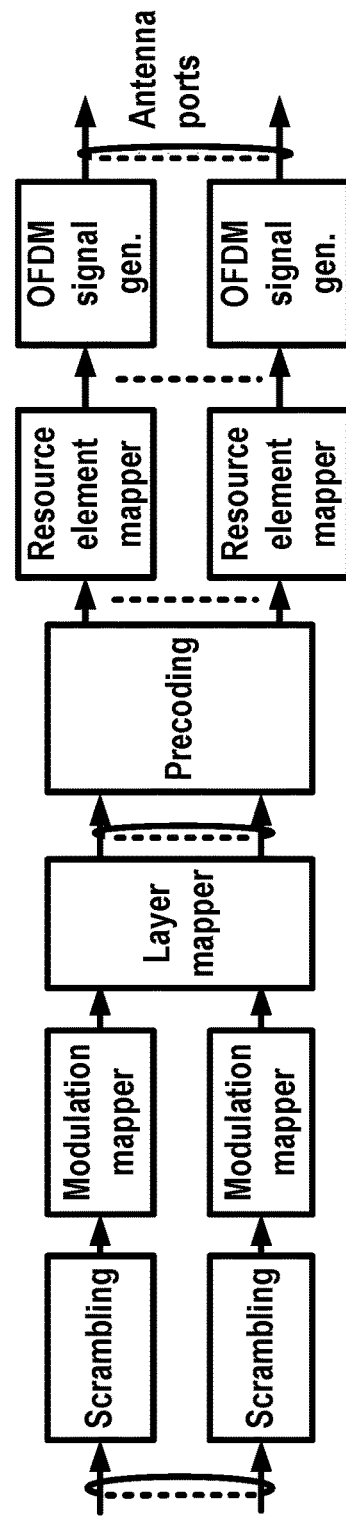
FIG. 4C

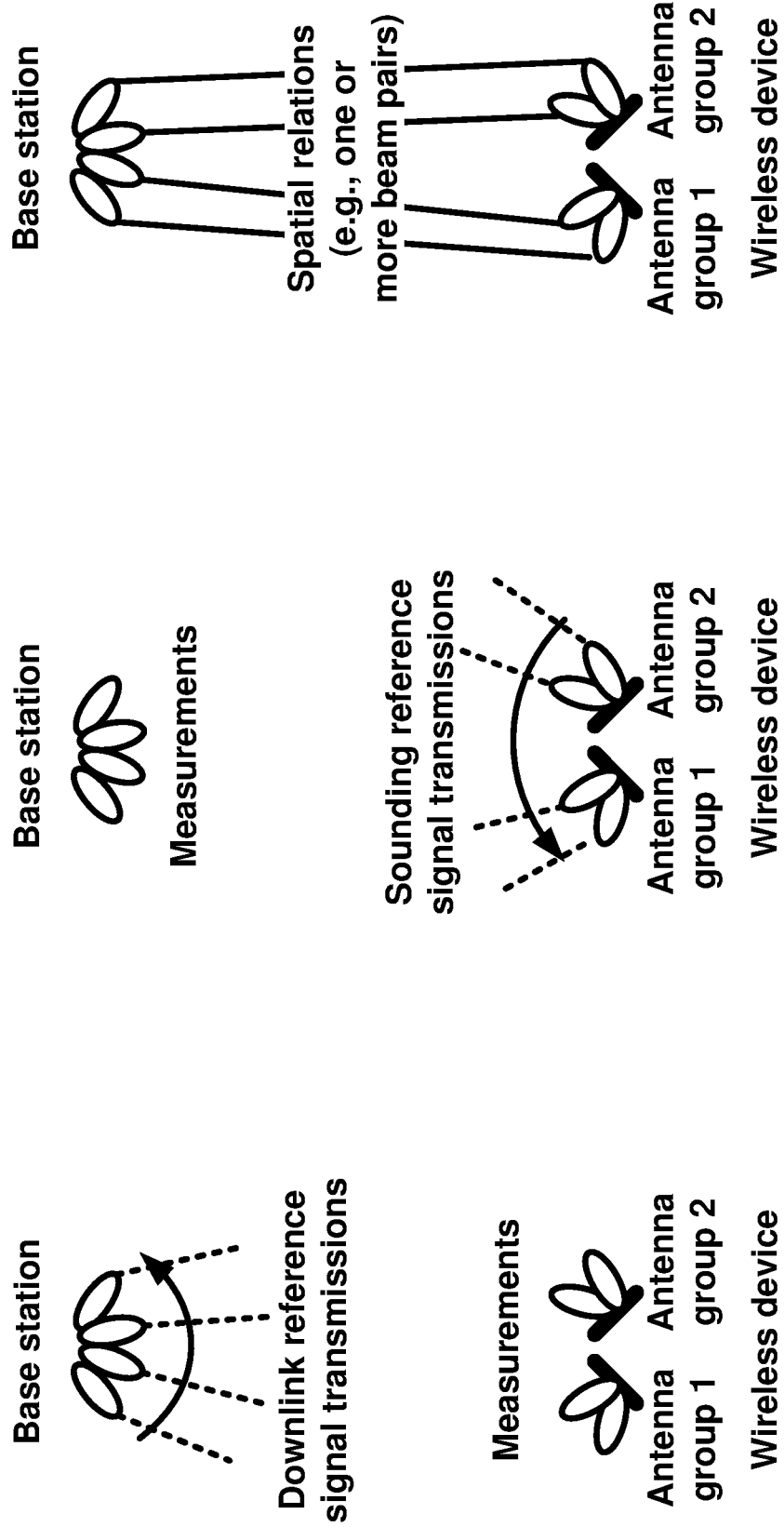

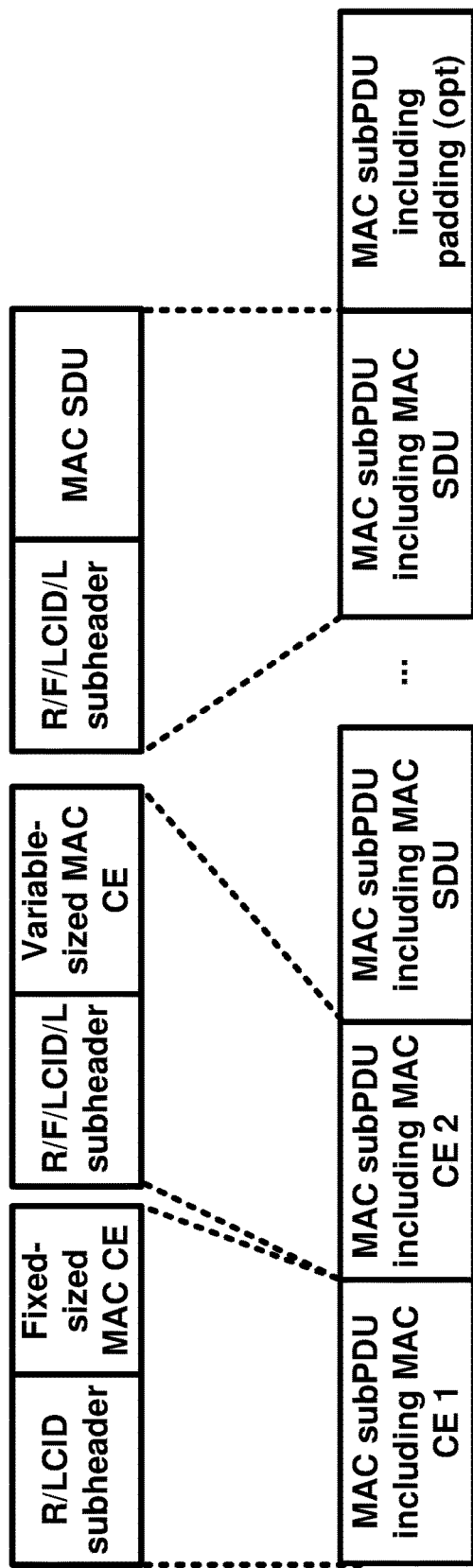
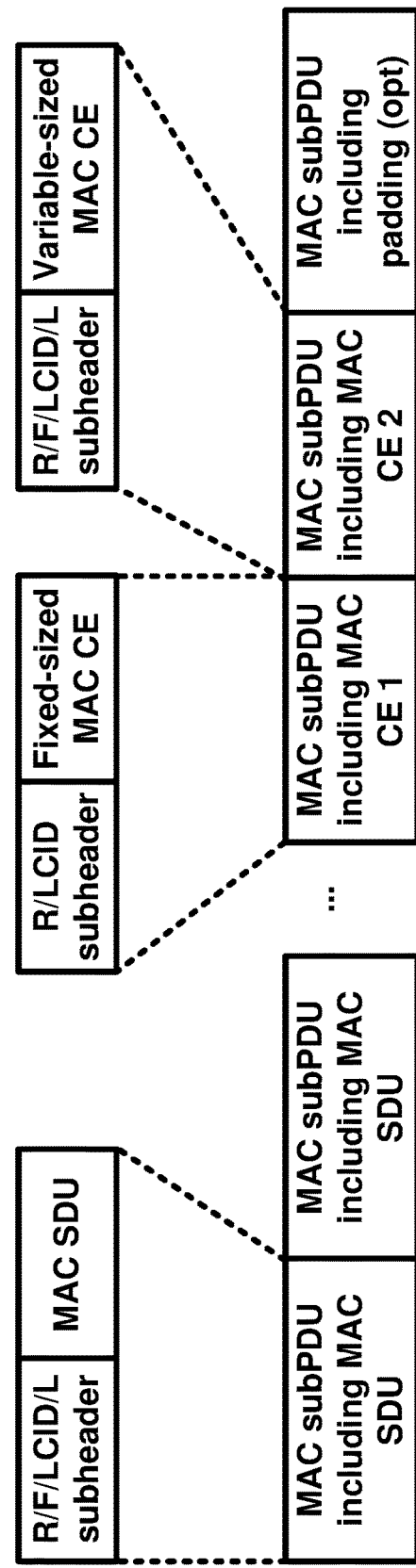
FIG. 19A
FIG. 19B

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

| | | | | | | | |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, SpCell of other MAC entity) ||||||
| R | R | $P_{CMAX,f,c}$ 1 ||||||
| P | V | PH (Type 1, PCell) ||||||
| R | R | $P_{CMAX,f,c}$ 2 ||||||
| P | V | PH (Type X, Cell 1) ||||||
| R | R | $P_{CMAX,f,c}$ 3 ||||||

...

| | | |
|---|---|---|
| P | V | PH (Type X, Cell n) |
| R | R | $P_{CMAX,f,c}$ m |

FIG. 24 ial Application No. 62/805,898, filed

POWER HEADROOM REPORT FOR MULTIPLE SOUNDING REFERENCE SIGNAL RESOURCE SETS

CROSS-REFERENCE TO RELATED APPLICATIONS

This application is a continuation application of U.S. patent application Ser. No. 17/401,675, filed Aug. 13, 2021, which is a continuation of International Application No. PCT/US2020/018439, filed Feb. 14, 2020, which claims the benefit of U.S. Provisional Application No. 62/805,898, filed Feb. 14, 2019, all of which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 16A, FIG. 16B, and FIG. 16C show examples of the beam management mechanism as per an aspect of an embodiment of the present disclosure.

FIG. 19A and FIG. 19B are examples of a DL MAC PDU and a UL MAC PDU as per an aspect of an embodiment of the present disclosure.

FIG. 24 shows an examples of a multiple entry PHR MAC CE as per an aspect of an embodiment of the present disclosure.

DETAILED DESCRIPTION OF EMBODIMENTS

Figure 1:
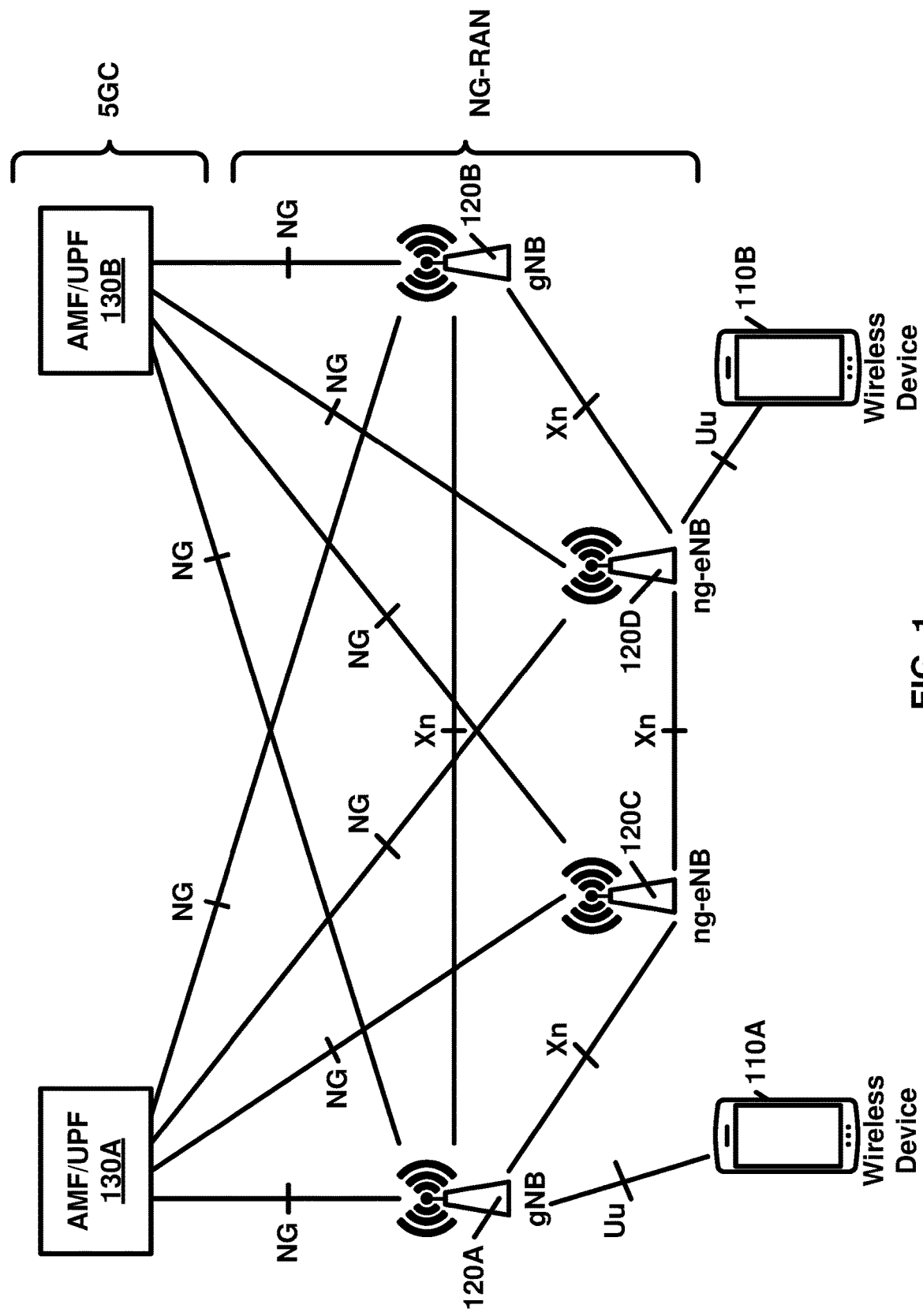
FIG. 1 is a diagram of an example RAN architecture as per an aspect of an embodiment of the present disclosure.

Example embodiments of the present disclosure enable operation of random access. Embodiments of the technology disclosed herein may be employed in the technical field of multicarrier communication systems. More particularly, the embodiments of the technology disclosed herein may relate to one or more random access procedures in multicarrier communication systems.

The following Acronyms are used throughout the present disclosure:
3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may comprise, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes comprise, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
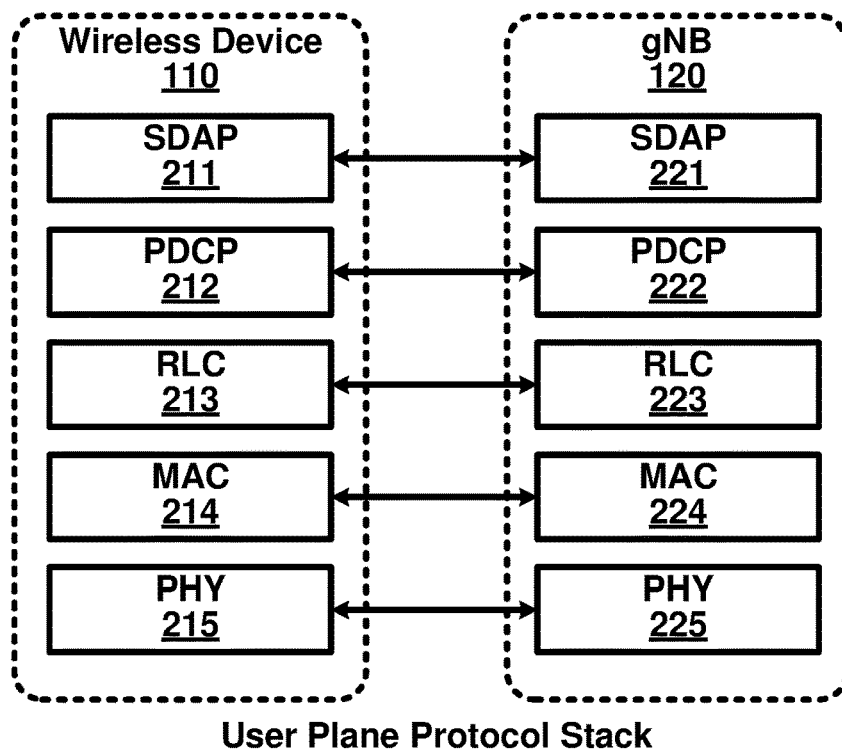
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM)

transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
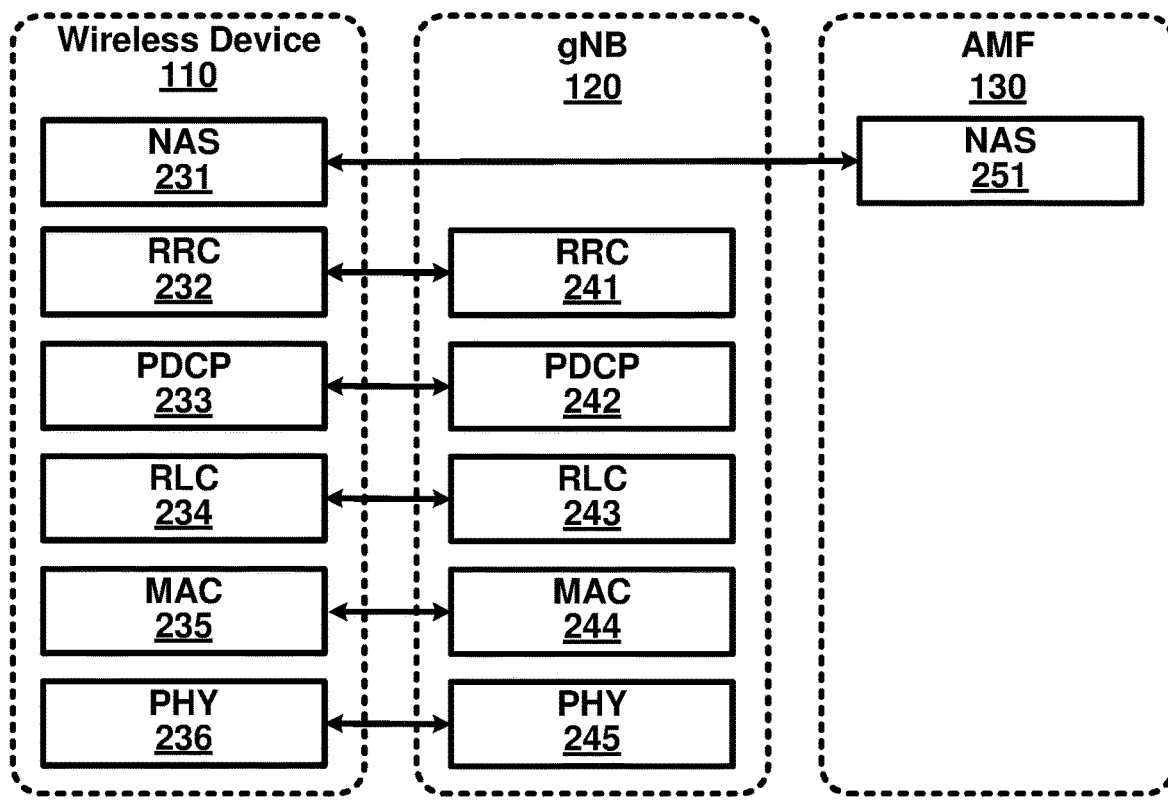
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
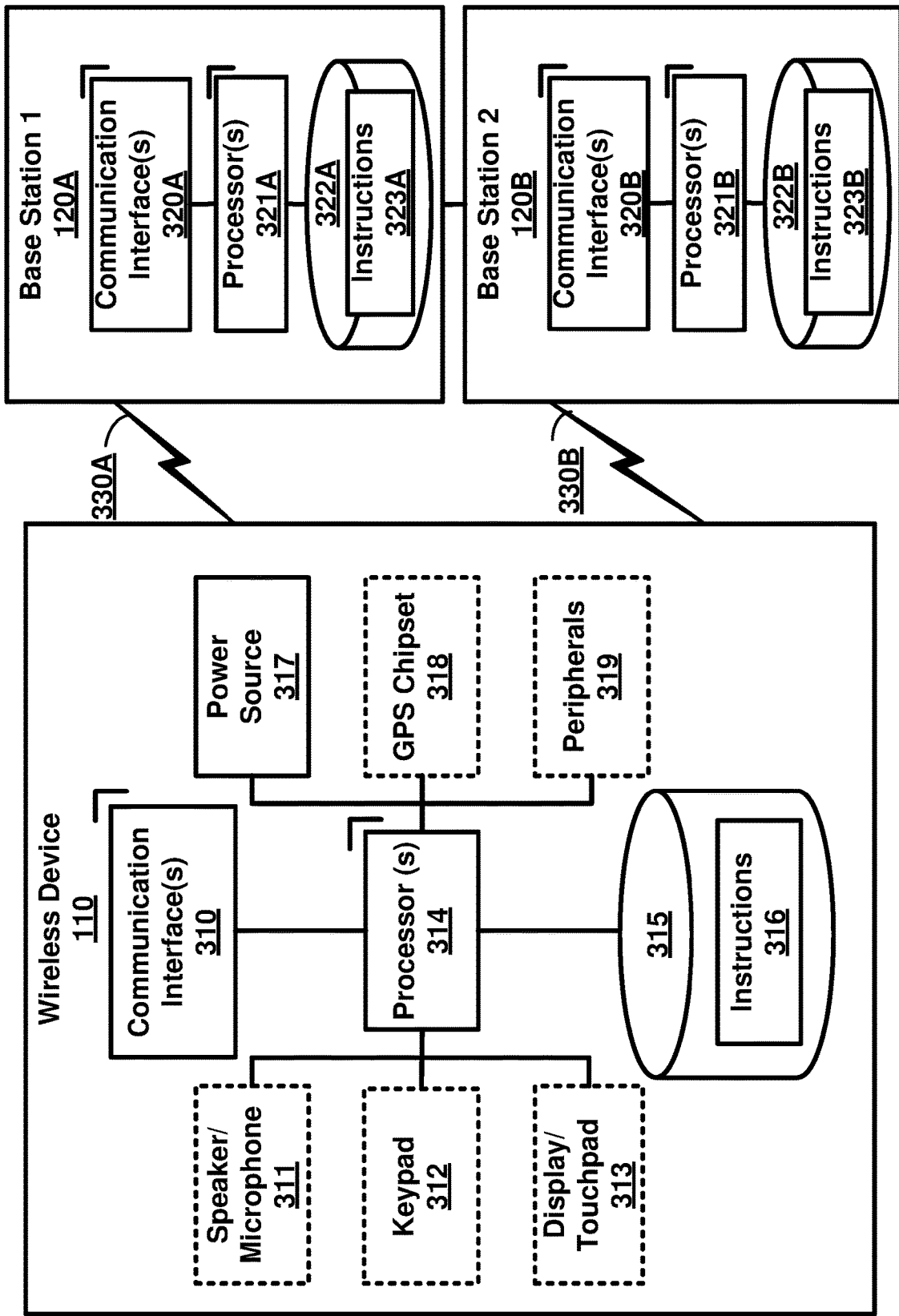
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message comprises the sCellToReleaseList, the wireless device may perform an SCell release. If the received RRC Connection Reconfiguration message comprises the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may comprise processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a base station may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
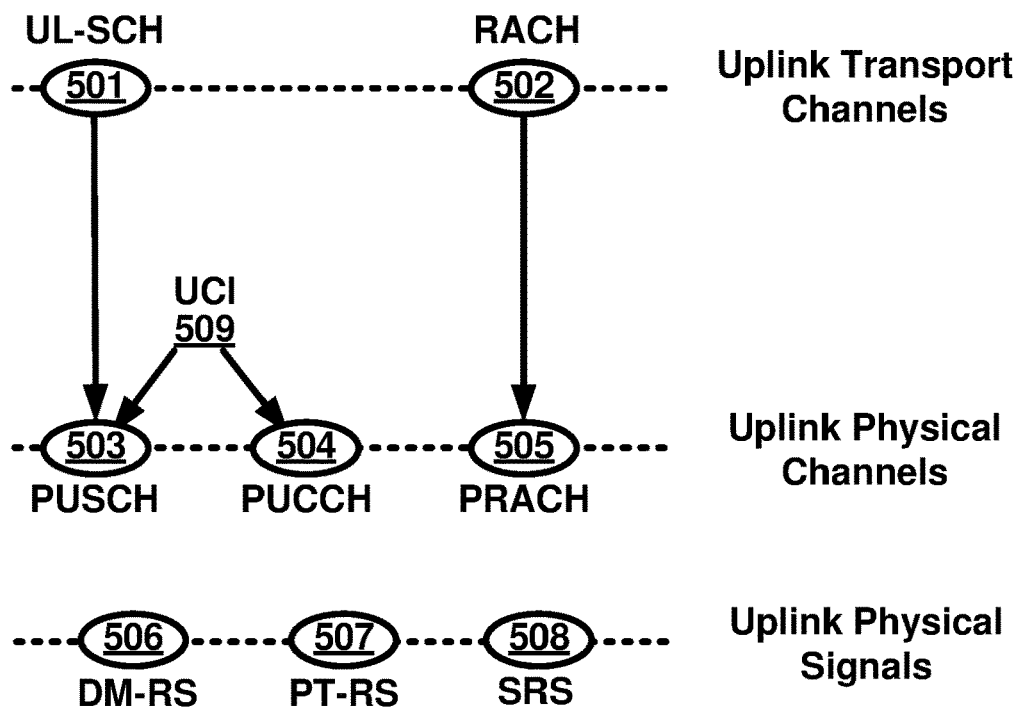
FIG. 5A is a diagram of an example uplink channel mapping and example uplink physical signals as per an aspect of an embodiment of the present disclosure.
Figure 5B:
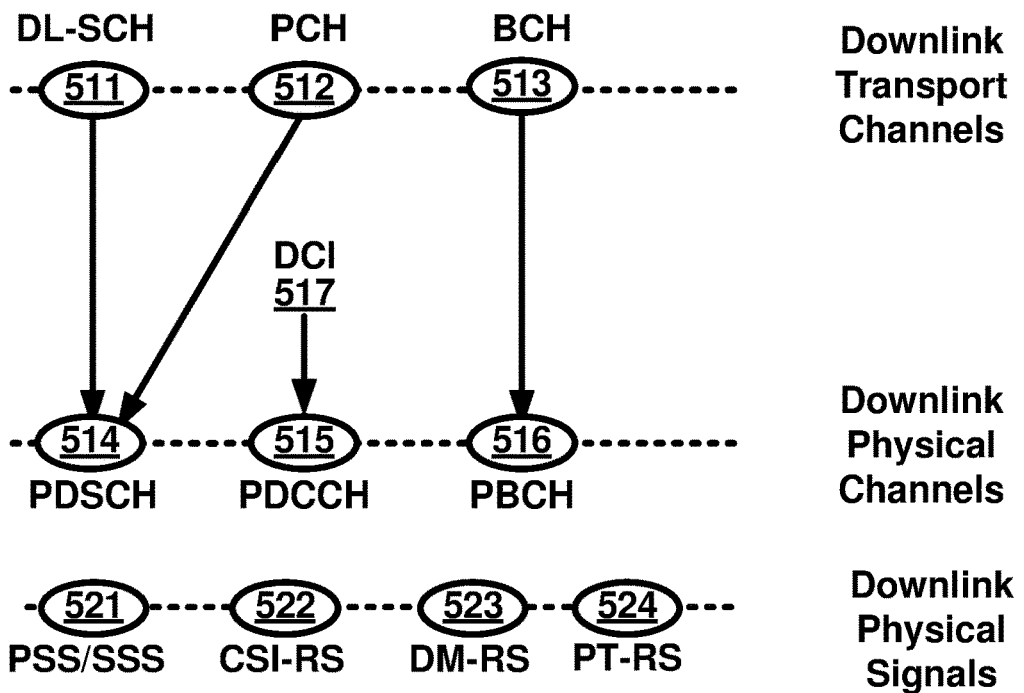
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on an RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, an SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block (SSB) may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statically configure a UE with one or more CSI-RS resource sets. One or more CSI-RS resources may be allocated from one or more CSI-RS resource sets to one or more UEs. For example, a base station may semi-statically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on an RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
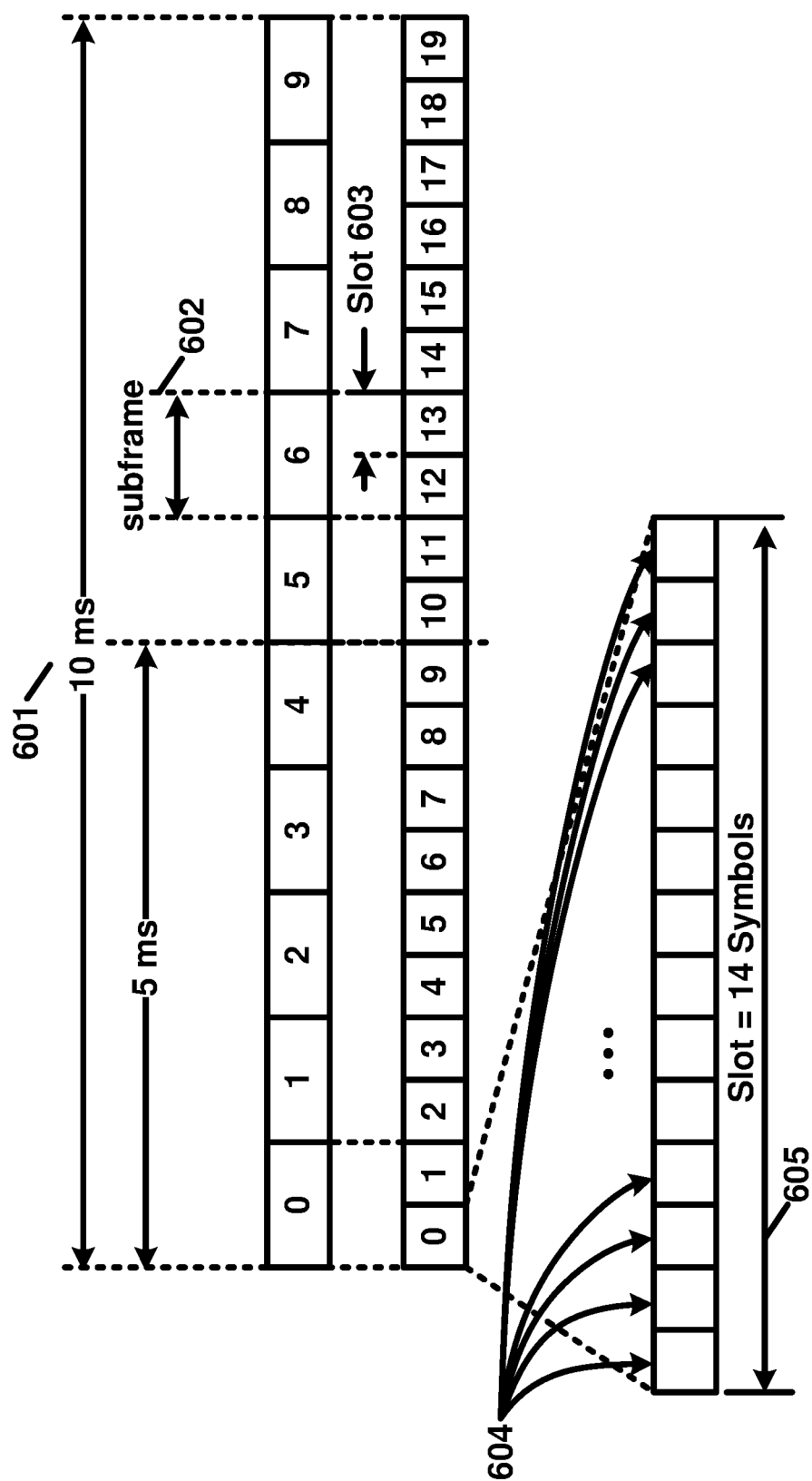
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may comprise one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may comprise a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
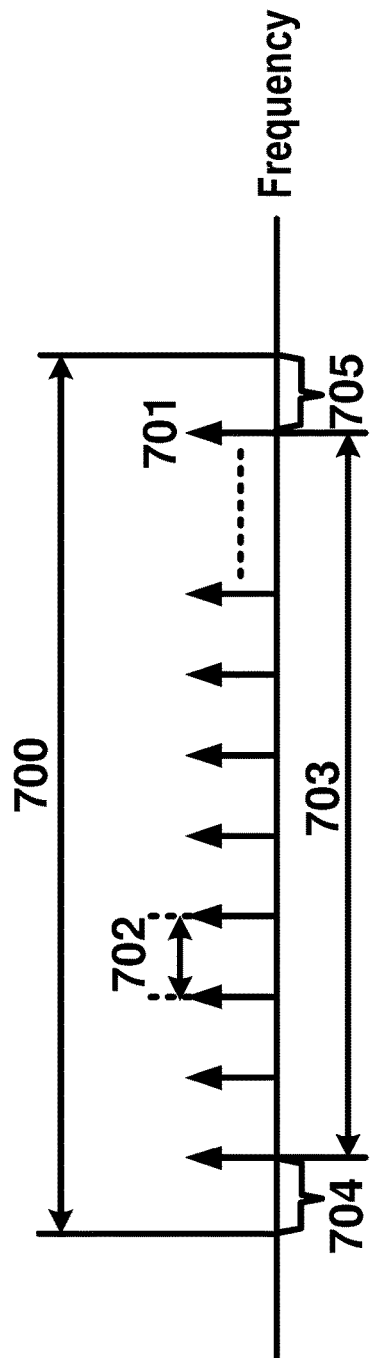
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
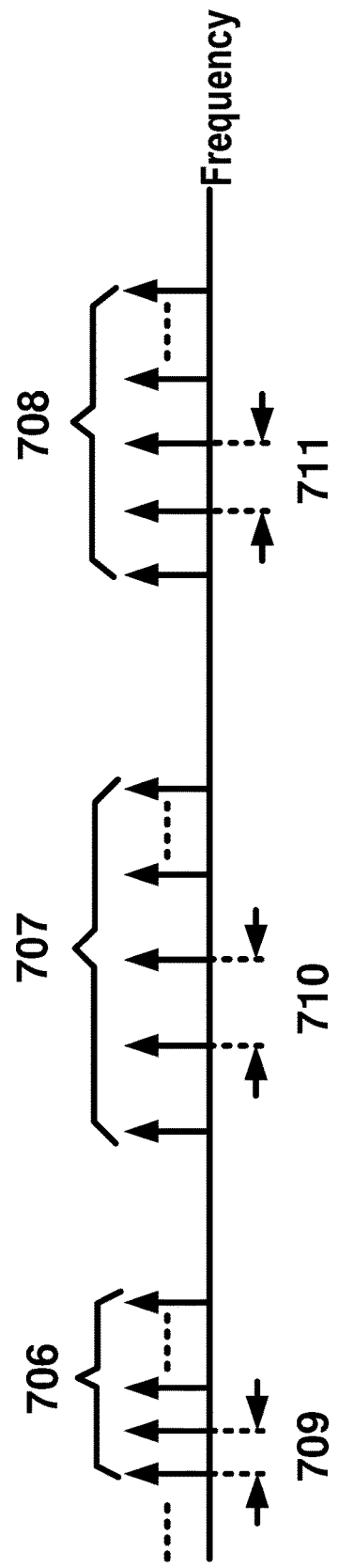

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The base station may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
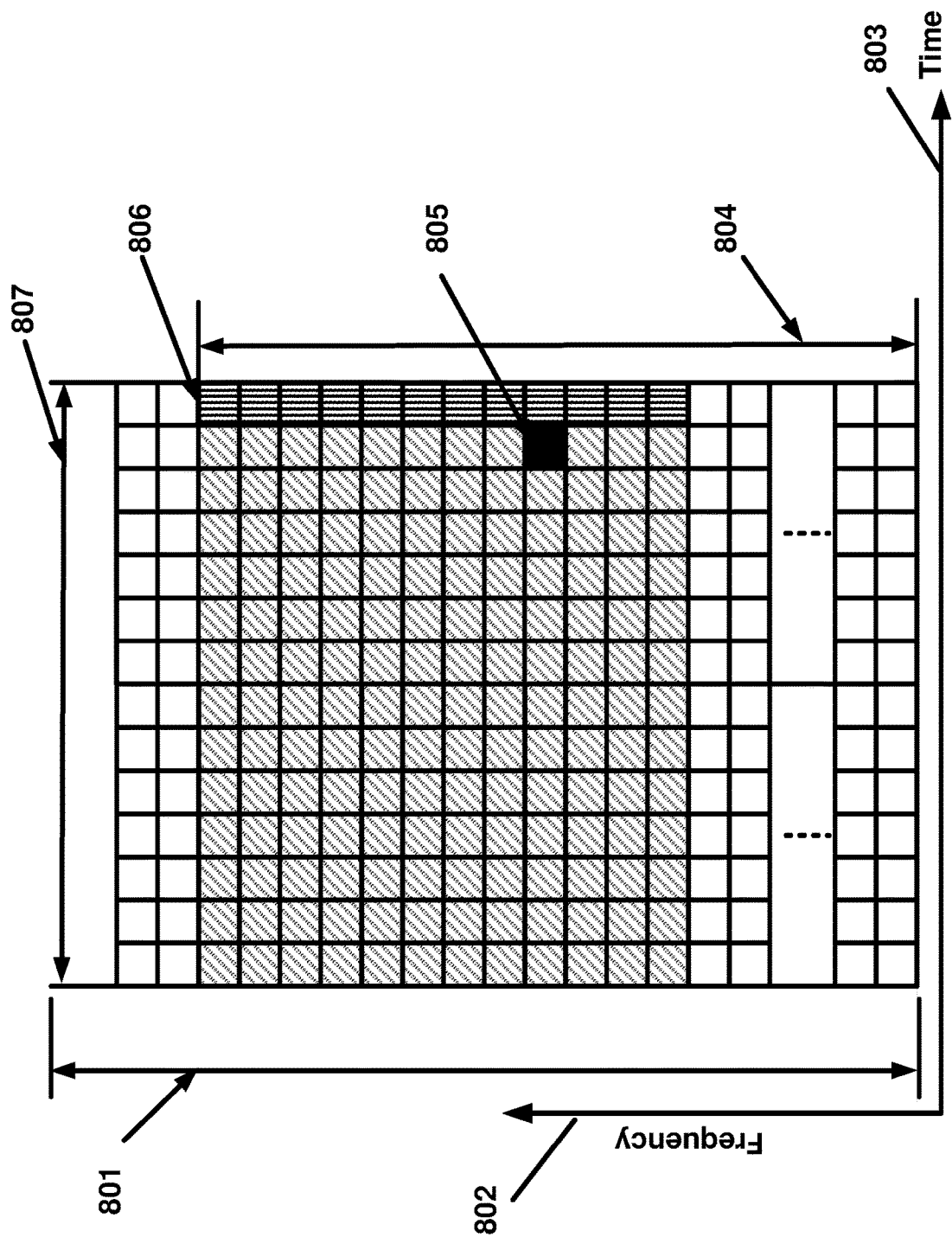
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of an RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The base station may transmit one or more RRC messages indicating a periodicity of the CS grant. The base station may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The base station may transmit one or more RRC messages indicating a periodicity of the CS grant. The base station may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
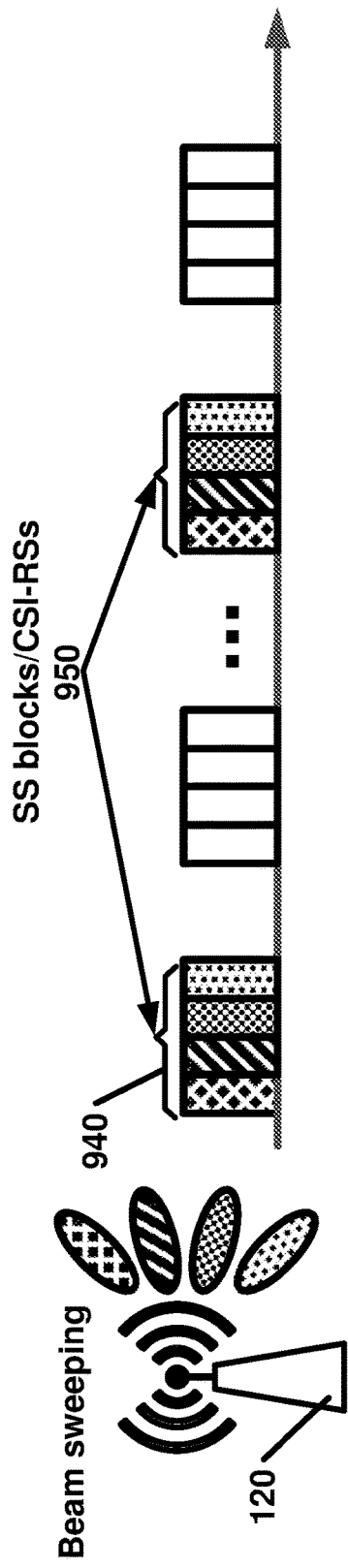
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
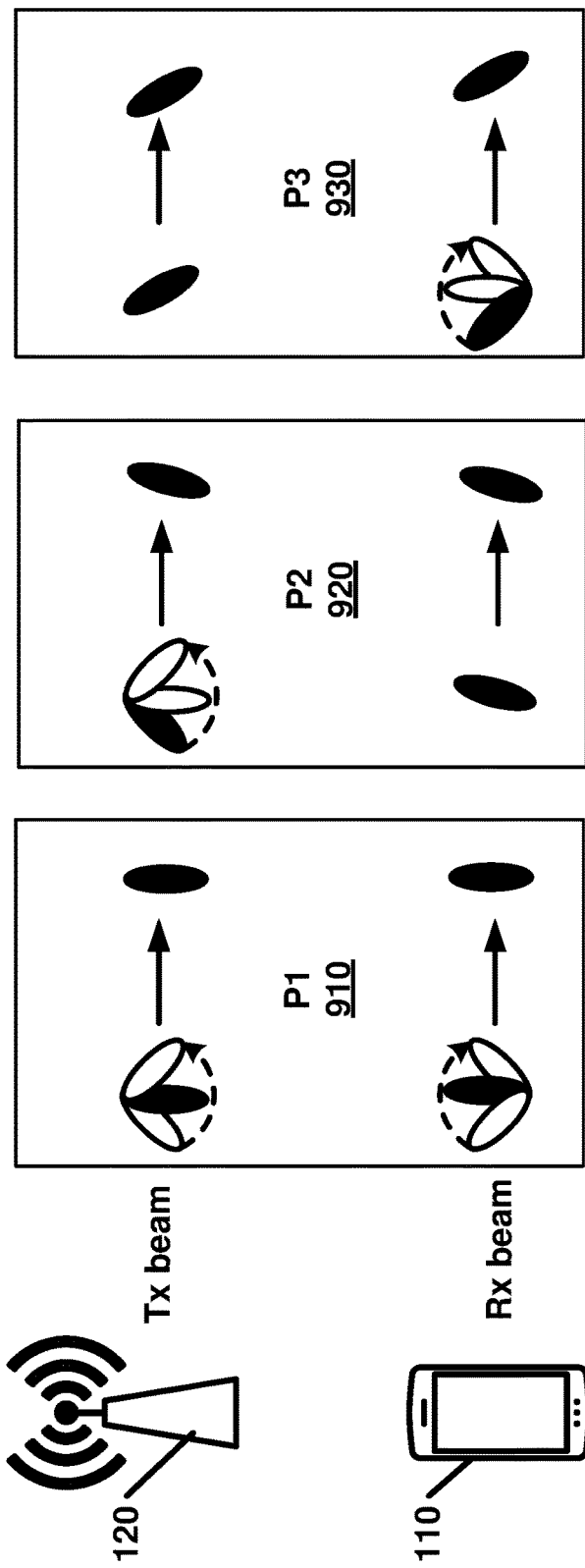
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by a UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
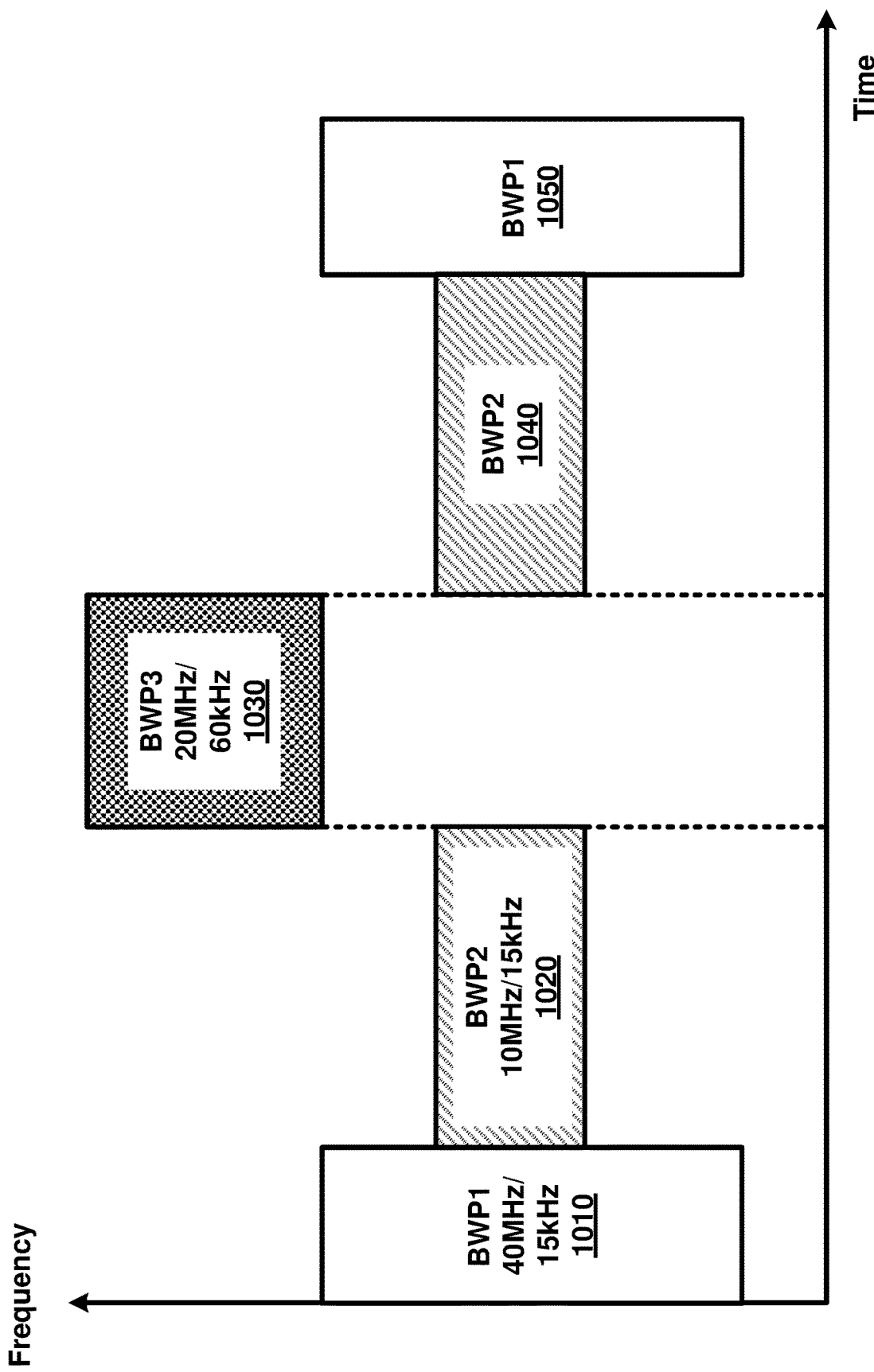
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
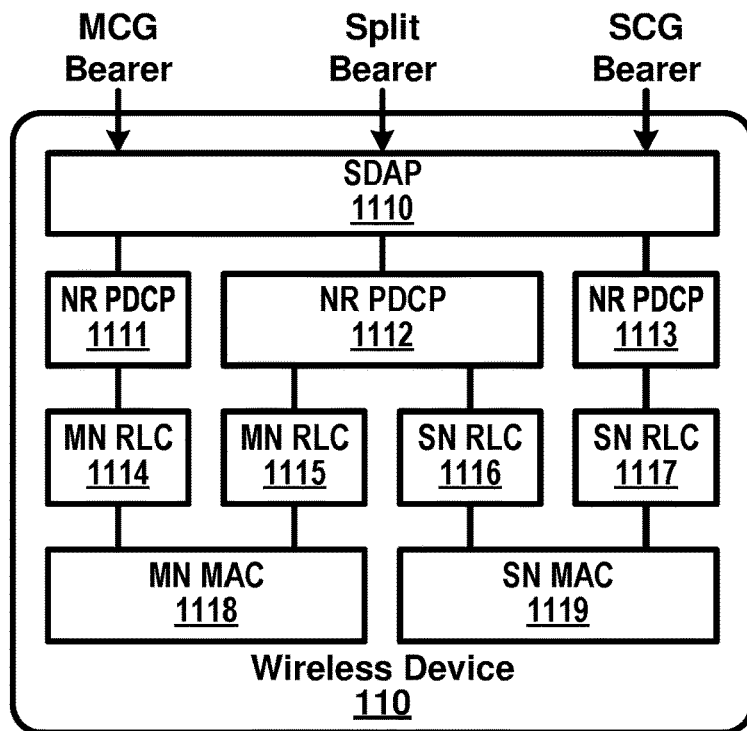
FIG. 11A and FIG. 11B are diagrams of an example multi connectivity as per an aspect of an embodiment of the present disclosure.
Figure 11B:
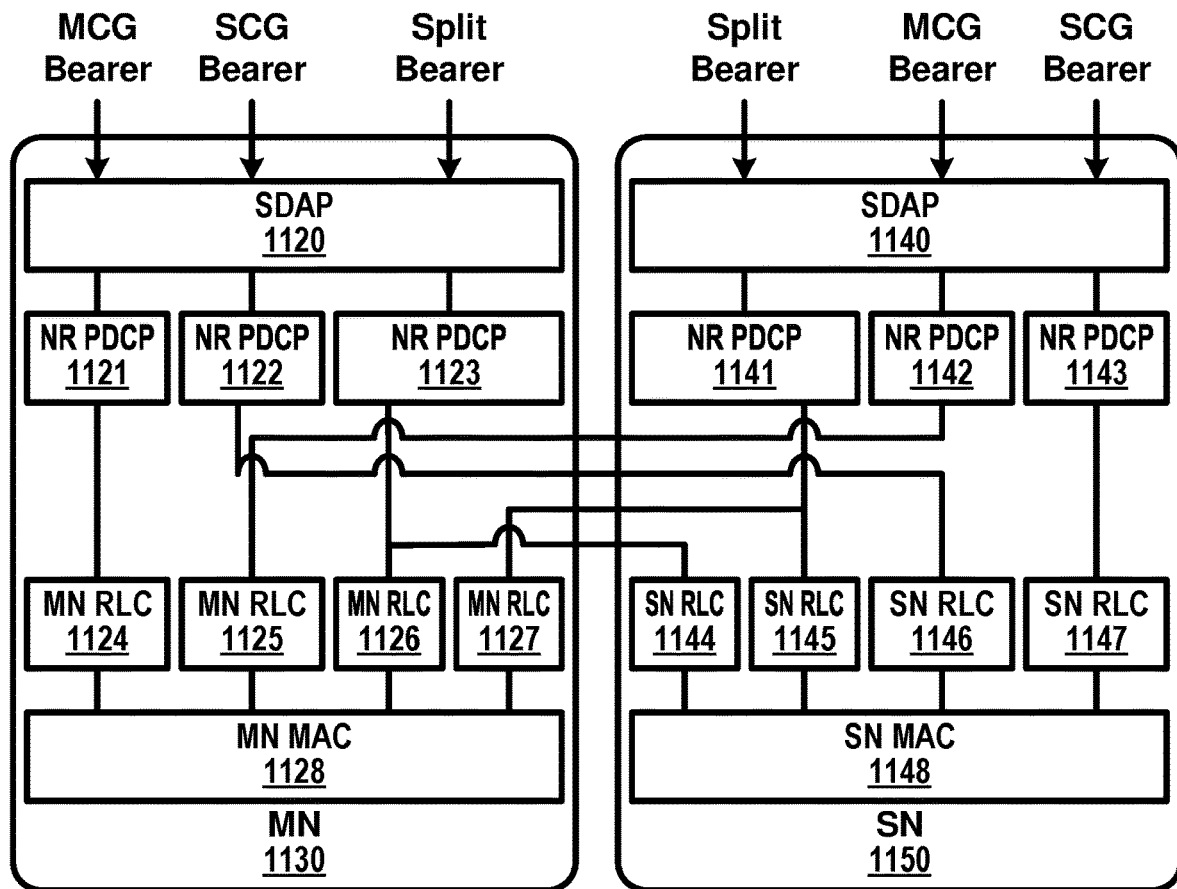

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for an SFN acquired from a MIB of a PSCell of a SCG.

Figure 12:
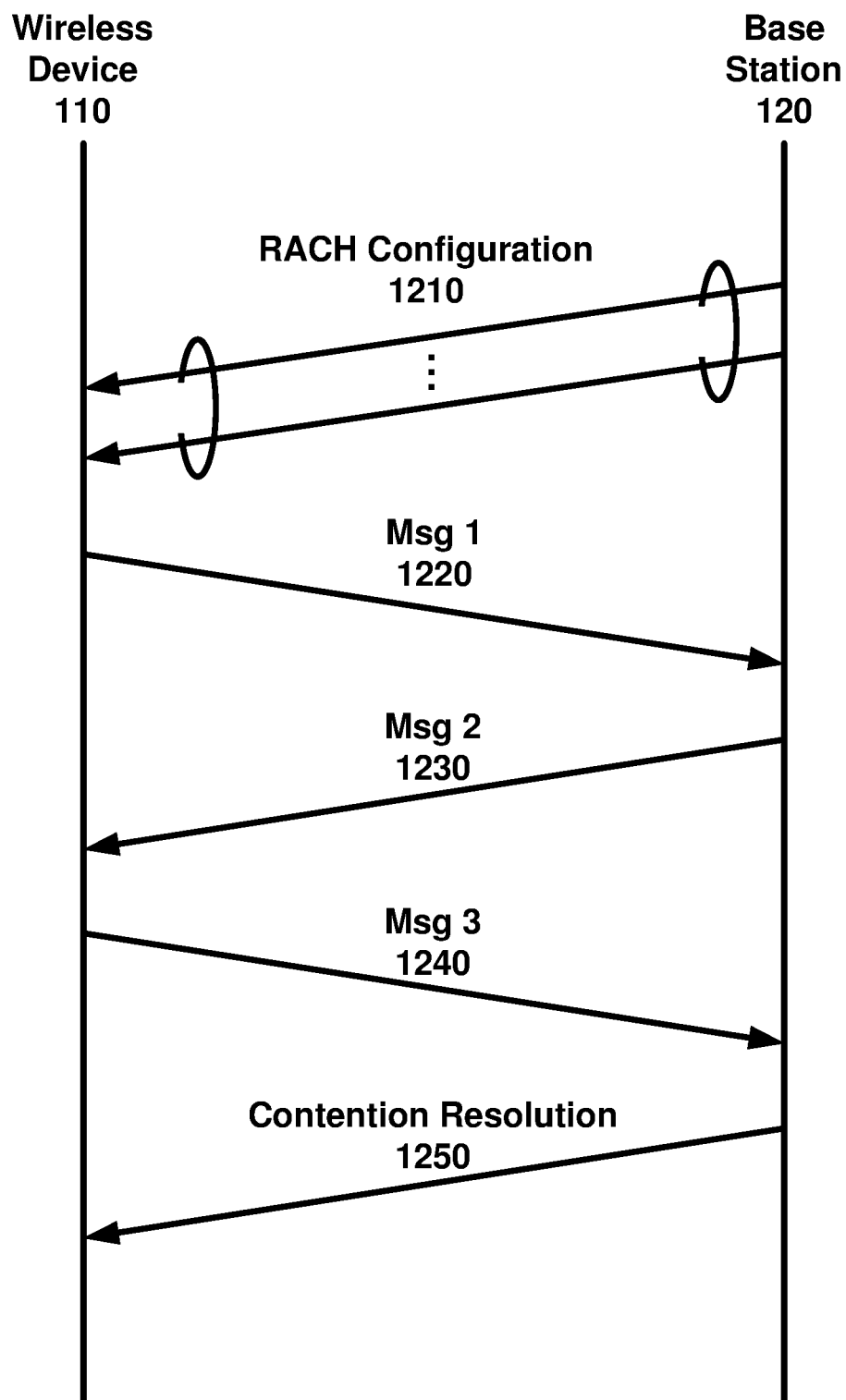
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor random access response(s) (RARs), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
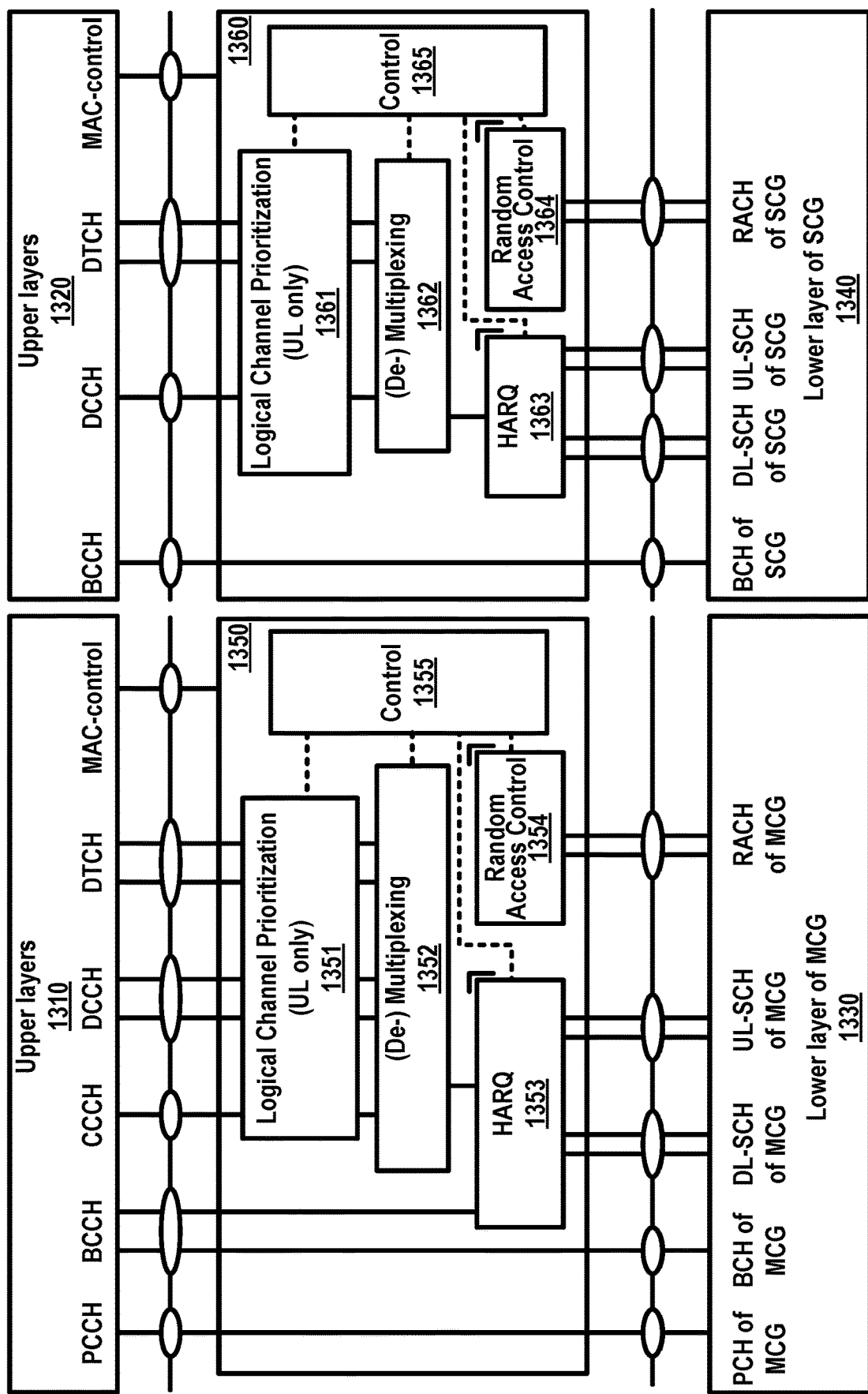
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
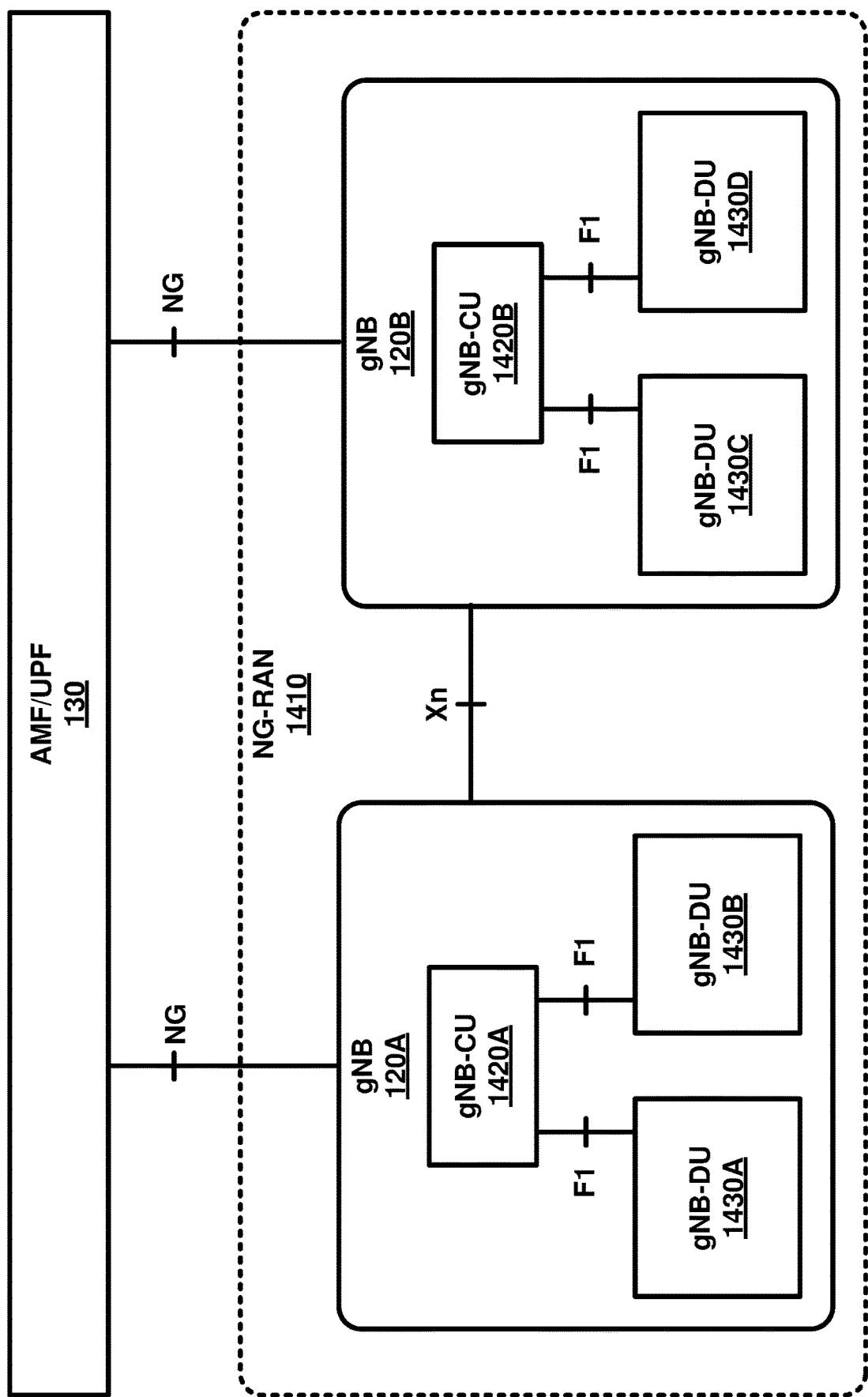
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
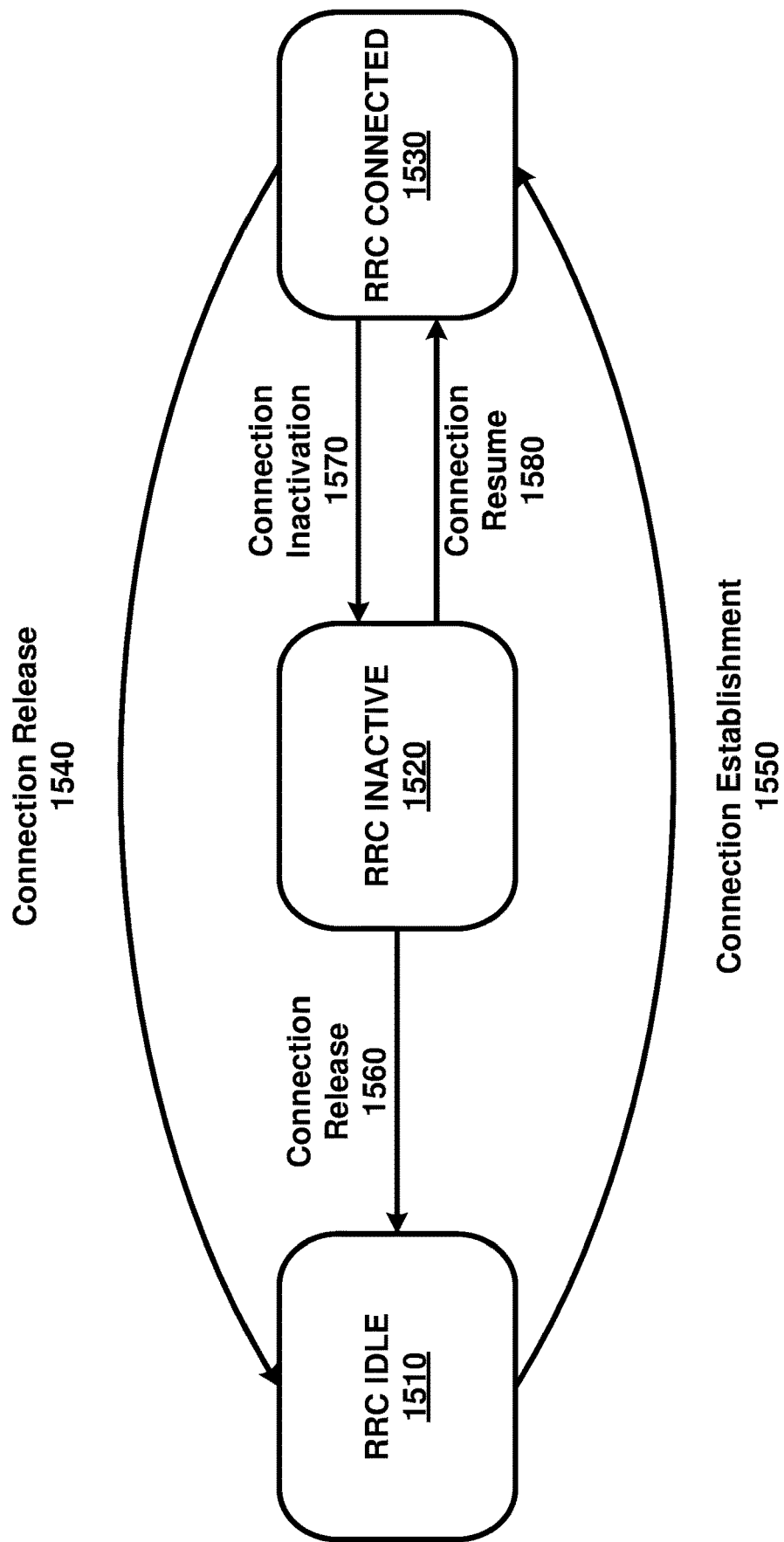
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A use of multiple antenna for a transmission and/or a reception may provide substantial benefits in a radio access technology (e.g., 4G, 5G, and/or etc.). The multiple antenna at a transmitter side and/or a receiver side may be used to provide diversity against fading. For example, one or more channels experienced by different antenna may be at least partly uncorrelated due to sufficient inter-antenna distance and/or due to different polarization between the multiple antennas.

In a radio access technology (e.g., 4G, 5G, and/or etc.), there may be a plurality of wireless devices located in one or more different directions relative to a base station. Multiple antennas with a fixed directivity may not be efficient for this case. For example, the fixed directivity may not cover the one or more different directions of the plurality of wireless devices. In this case, a use of one or more antenna panels (e.g., antenna groups) may be beneficial. For example, at least one antenna panel of the one or more antenna panels (e.g., antenna groups) may be steered toward a desired direction with a certain level of directivity. An antenna panel (e.g., antenna group) may comprise one or more antenna elements. In general, as a frequency increases, a size of each antenna element and/or mutual distance between antenna elements may be reduced. In an example implementation, with a fixed size of an antenna panel (e.g., antenna configuration), a number of antenna elements may increase to compensate the mutual distance reduced in a high frequency. For example, over an ultra-high frequency band (e.g., over 28 GHz), an antenna panel may comprise tens of or hundreds of antenna elements in each antenna panel (e.g., each antenna group).

A benefit of using an antenna panel (e.g., antenna group) with a number of antenna elements may be that a direction of a transmission beam is adjustable by separately adjusting an antenna phase of signals applied to each antenna element. A similar effect may be accomplished, for example, when a multi-antenna panels are used on a receiver side. For example, a receiver beam direction may be adjusted by separately adjusting an antenna phase of signals received at each antenna element.

A capability of multi-antenna transmission and/or reception may be implemented. For example, the multi-antenna transmission and/or reception may be implemented based on an analog processing and/or a digital processing at a transmitter and/or a receiver. In a case of the analog processing implementation at a transmitter, a multi-antenna processing may be applied within an analog part of the transmitter antenna chain after a digital-to-analog conversion (DAC). For the digital processing implementation at a transmitter, the multi-antenna processing may be applied within a digital part of the transmitter antenna chain before the DAC. The digital processing implementation may provide flexibility, e.g., transmission of multiple layers in parallel and simultaneous beamformed transmission of multiple signals in different directions, at the cost of high complexity/cost in implementation (e.g., a need for one DAC per antenna element). For the analog processing implementation at a transmitter, the implementation complexity/cost may be alleviated comparing with the digital processing implementation. The analog processing implementation may limit a transmitter to form a beam per a carrier. For example, with the analog processing implementation, the transmitter may not be able to schedule frequency multiplex beam-formed transmissions to devices located in different directions. The beam-formed transmissions to different devices located in different directions may be separated in time. At a receiver side, a difference in capabilities between analog and signal processing may be similar. In an example, in a case of the analog processing at the receiver side, the multi-antenna processing may be applied in an analog domain before analog-to-digital conversions. In this case, a receiver beam may be directed in a limited number of direction (e.g., one direction) at a time. For example, a reception from a plurality of different directions may take place at different time instances.

In a radio access technology (e.g., 4G, 5G, etc.), one or more panels of a wireless device may be maintained based on a beam management mechanism. FIG. 16A, FIG. 16B, and FIG. 16C shows examples of the beam management mechanism. The beam management mechanism may comprise one or more procedures for transmitting, by a base station to a wireless device, one or more downlink reference signals (SSBs and/or CSI-RSs) as shown in FIG. 16A. The wireless device may measure the received signal strength of the transmitted one or more downlink reference signals and may report measurement results to the base station. The beam management mechanism may comprise one or more procedures for transmitting, by the wireless device to the base station to a wireless device, one or more SRSs as shown in FIG. 16B. The base station may measure the received signal strength of the transmitted one or more SRSs. The measurements of DL reference signals and/or SRSs may be used to configure one or more spatial relations (e.g., associations) between configured first beam(s) of a base station and configured second beam(s) of a wireless device as shown in FIG. 16C. A spatial relation of the one or more spatial relations may indicate a beam pair link between a first beam (e.g., associated with a particular DL reference signal) of a base station and a second beam (e.g., associated with a particular SRS) of a wireless device. For example, based on the measurements (e.g., based on DL reference signals and/or SRSs), a base station and/or a wireless device may determine which uplink spatial filter needs to be used for a reception of a DL transmission transmitted based on a DMRS QCLed with a particular DL reference signal. A base station may configure separate spatial relations for PUSCH, PUCCH, and/or SRS transmissions.

A wireless device may be configured in two different modes for a PUSCH multi-antenna transmission, a codebook-based transmission and a non-codebook-based transmission. A selection between two transmission modes may be based on an uplink/downlink channel reciprocity. A base station may transmit, to the wireless device, an RRC message indicating a PUSCH transmission mode. In an example, the wireless device may be configured with codebook-based transmission, for example, when the higher layer parameter txConfig in pusch-Config is set to 'codebook.' The wireless device may be configured with non-codebook based transmission, for example, when the higher layer parameter txConfig is set to 'nonCodebook.' A particular DCI format (e.g., DCI format 0_1) may be used for a codebook-based transmission. The wireless device may not receive, from the base station, an uplink grant for a PUSCH transmission scheduled by a particular DCI (e.g., DCI format 0_1), e.g., if the higher layer parameter txConfig is not configured. The wireless device may determine that a PUSCH transmission is based on a single antenna port, for example, if the PUSCH transmission is scheduled by a particular DCI (e.g., DCI format 0_0). The wireless device may use a PUCCH spatial relation (e.g., PUCCH-SpatialRelationInfor) for a PUSCH transmission, for a single antenna port case. For example, the wireless device may not receive, from the base station, an uplink grant for a PUSCH transmission scheduled by a particular DCI (e.g., DCI format 0_0) in a BWP without configured PUCCH resource with a PUCCH spatial relation (e.g., PUCCH-SpatialRelationInfo).

For a codebook-based transmission of a PUSCH transmission, a base station may determine an uplink transmission rank (e.g., a number of layers to be transmitted) and/or a corresponding precoder matrix to use for the PUSCH transmission. The base station may transmit, to the wireless device, a control signal (e.g., DCI) and/or an RRC message indicating a selected uplink transmission rank and corresponding precoder matrix. For example, the wireless device receives the control signal and/or the RRC message indicating the selected uplink transmission rank and corresponding precoder matrix as a part of an uplink grant (e.g., dynamic UL grant and/or a configured grant Type 1 and/or Type 2). The wireless device may determine that the precoder matrix indicated by the uplink grant is applied for a PUSCH transmission scheduled by the uplink grant, e.g., mapping the indicated number of layers to one or more antenna ports. the base station may measure the channel condition between one or more antenna ports of the wireless device and one or more receive antennas of the base station to determine the uplink transmission rank and/or the corresponding precoder matrix. The base station may determine the precoder matrix from a set of one or more precoders (e.g., uplink codebook) for a combination of a number of antenna ports and/or a number of transmission ranks (e.g., a number of antenna ports may be less than or equal to a number of transmission ranks).

In an example, for a codebook-based transmission, a PUSCH transmission may be scheduled to a wireless device dynamically based on a DCI (e.g., DCI format 0_0, DCI format 0_1) and/or semi-statically configured with the wireless device via an RRC signaling. The wireless device may determine the PUSCH transmission precoder based on an SRS resource, a transmission rank and/or a precoding matrix indicated by a DCI and/or an RRC message. For example, for a PUSCH transmission scheduled based on a DCI (e.g., DCI format 0_0 and/or DCI format 0_1), the DCI transmitted by a base station to a wireless device may comprise a first field (e.g., an SRS resource indicator (SRI) field) indicating a particular SRS resource and a second field (e.g., a precoding information and number of layers field) indicating a particular precoding matrix (e.g., a transmitted precoding matrix indicator (TPMI)) and/or a transmission rank. For a PUSCH transmission scheduled based on an RRC signaling (e.g., configured grant Type 1 and/or Type 2), the SRI (e.g., the particular SRS resource), the particular precoding matrix (e.g., a TPMI), and/or the transmission rank are indicated by one or more higher layer parameters (e.g., srs-ResourceIndicator and/or precodingAndNumberOfLayers). The wireless device may use a TPMI to determine a precoder to be applied over one or more layers {0 . . . v−1} and that corresponds to an SRS resource selected by the SRI, for example, when a plurality of SRS resources, comprising the SRS resource, are configured by the base station. The wireless device may use a TPMI to determine a precoder to be applied over one or more layers {0 . . . v−1} and that corresponds to an SRS resource, for example, if the SRS resource is a single SRS resource configured to the wireless device. The wireless device may select a transmission precoder from an uplink codebook. A base station may configure a wireless device with at least one SRS resource for a codebook-based PUSCH transmission. A wireless device may be configured with at least one SRS resource, for example, if the wireless device is configured with a higher layer parameter (e.g., txConfig) indicating a codebook-based PUSCH transmission (e.g., txConfig sets to 'codebook'). A wireless device may be configured with one or more SRS resource sets (e.g., an example information element, SRS-ResourceSet), and each of the one or more SRS resource sets may comprise one or more SRS resources (e.g., SRS configurations are described more in detail elsewhere in this specification).

A base station may configure the wireless device with at least one of the one or more SRS resource set for the codebook-based transmission. For example, a single SRS resource set may be configured for a codebook-based transmission (e.g., the respective single SRS resource set may comprise a higher layer parameter, usage, setting to 'codebook'). For example, one or more SRS resource sets may be configured for a codebook-based transmission (e.g., each of the one or more SRS resource sets may comprise a higher layer parameter indicating that the respective SRS resource set is configured for a codebook-based transmission, e.g., a parameter, usage, in the respective SRS resource set may set to 'codebook'). For example, a plurality of SRS resource sets configured for a codebook-based transmission may be used for a UL transmission via multiple antenna groups (e.g., panels). Each of the plurality of SRS resource sets may indicate (e.g., correspond to and/or be associated with) one of the multiple antenna groups (e.g., panels). An SRI in a DCI and/or an RRC message may indicate an SRS resource in a SRS resource set configured for a codebook-based transmission. For a single SRS resource set configured for a codebook-based transmission, the SRI may indicate one of SRS resources within the single SRS resource set. For a plurality of SRS resource sets configured for a codebook-based transmission, there may be one or more fields in a DCI and/or an RRC message that indicate a particular SRS resource set and/or a particular SRS resource within the particular SRS resource set. For example, a first field of the one or more fields may indicate a particular SRS resource set and a second field of the one or more fields may indicate a particular SRS resource within the particular SRS resource set. The first field may indicate a particular antenna group (e.g., panel), and there may be at least one SRS resource set configured for the particular antenna group (e.g., panel). The first field and the second field may be implemented as separate two fields. For example, an SRI field may comprise the first field and the second field (e.g., the SRI field may indicate which SRS resource in which SRS resource set).

Figures 17A, 17B:
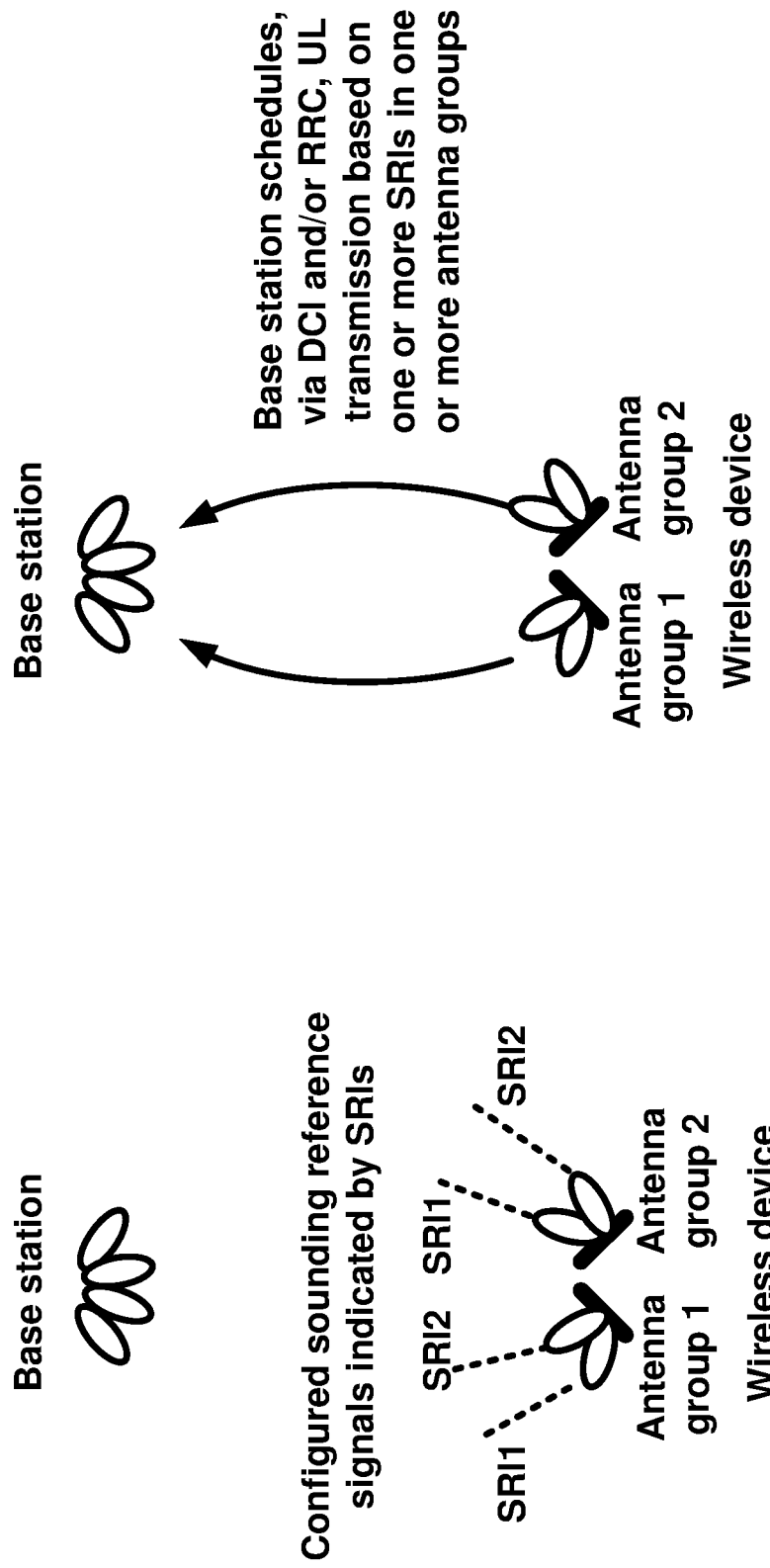
FIG. 17A and FIG. 17B show examples of codebook-based transmission as per an aspect of an embodiment of the present disclosure.

FIG. 17A and FIG. 17B show examples of codebook-based transmission. A wireless device may have one or more antenna groups (e.g., panels). In FIG. 17A, the wireless device has two antenna groups, each of two antenna groups is configured with two SRS resources (e.g., UL transmitting beams). A codebook-based transmission may be scheduled for the wireless device. A base station may transmit a DCI (e.g., DCI format 0_0 and/or DCI format 0_1) comprising an UL grant for the codebook-based transmission. The base station may configure the wireless device with one or more configured grant (Type 1 and/or Type 2) via RRC signaling. For example, the DCI and/or the RRC signaling may indicate at least one SRS resource set (e.g., an antenna group and/or panel) and/or at least one SRS resource within the at least one SRS resource for the codebook-based transmission. The wireless device may transmit one or more transport block via a spatial filter associated with the at least one SRS resource of the at least one SRS resource set. The DCI and/or the RRC signaling may indicate one or more SRS resource sets (e.g., antenna groups and/or panels) and their respective one or more SRS resources, for example, for a multi-panel uplink transmission. FIG. 17B shows that a base station may a UL transmission for a wireless device based on multiple antenna groups (e.g., panels).

For a non-codebook-based transmission, a wireless device may select, e.g., based on DL measurements of one or more configured reference signals (CSI-RSs), an uplink precoder. For example, based on a channel reciprocity, the wireless device may use the DL measurement of one or more configured reference signals to select the uplink precoder. The uplink precoder may be implemented as a precoder matrix. For example, each column of the precoder matrix may indicate (and/or control) a beam of a corresponding layer. For example, each beam may correspond to one possible layer. For example, the wireless device may select one or more different beam directions by selecting one or more layers in the precoder matrix. A precoder selected by the wireless device may be adjusted by the base station. For example, the wireless device may select a precoder, e.g., based on the DL measurements, and apply the selected precoder to a set of one or more configured SRSs with one SRS transmitted on each layer (or beam) indicated by the selected precoder. The base station may measure the SRS transmitted by the wireless device based on the selected precoder. The base station may transmit, to a wireless device, a control signal (e.g., a DCI) indicating a subset of the one or more configured SRSs within an SRI indicated by the control signal (e.g., a DCI). The wireless device may transmit, to the base station, one or more transport blocks using a precoder matrix that comprises one or more columns corresponding to the SRSs indicated by the base station within the SRI.

For a non-codebook based transmission, a wireless device may be scheduled with a PUSCH transmission based on a DCI (e.g., DCI format 0_0 and/or DCI format 0_1) or semi-statically configured grant (e.g., configured grant Type 1 and/or Type 2). The wireless device may determine, for the PUSCH transmission, a precoder and transmission rank based on an SRI indicated by a DCI or the SRI indicated by a higher layer parameter (e.g., srs-ResourceIndicator) for example, when multiple SRS resources are configured. The wireless device may use one or multiple SRS resources for an SRS transmission. For example, one SRS port for each SRS resource may be configured. For example, one SRS resource set may be configured with higher layer parameter usage in SRS-ResourceSet set to 'nonCodebook.' For the non-codebook-based transmission, the wireless device may determine the precoder used for an SRS transmission based on measurements of an associated CSI-RS resource. The wireless device may be configured with one or more (e.g., only one) CSI-RS resource for an SRS resource set. For example, the SRS resource set may be configured for a non-codebook-based transmission. For example, a higher layer parameter, usage, in SRS-ResourceSet may be set to 'nonCodebook.' The wireless device may transmit PUSCH using the same antenna ports as SRS port(s) in the SRS resource(s) indicated by SRI(s) of a DCI (e.g., DCI format 0_1). For a non-codebook-based transmission, the wireless device may be scheduled with DCI format 0_1 when at least one SRS resource is configured in SRS-ResourceSet with usage set to 'nonCodebook.'

A wireless device may be configured, by a base station, with a PUCCH for a transmission of uplink control. For example, the wireless device may transmit a UCI on the PUCCH. For a beamformed PUCCH transmission, the wireless device may be configured with one or more spatial relations between the PUCCH and DL reference signals (e.g., CSI-RS and/or SSB). For example, based on a configured spatial relation, the wireless device may perform a PUCCH transmission using a same beam as it used for receiving a corresponding downlink reference signal. For example, the wireless device may perform a PUCCH transmission using a same beam as it used for receiving a particular SSB (or CSI-RS), for example, if a spatial relation between a PUCCH and the particular SSB (or CSI-RS) is configured. The base station may configure the wireless device with a plurality of spatial relations for a PUCCH transmission. An MAC CE may be used to activate at least one of the plurality of spatial relations. For example, the MAC CE may comprise at least one of: a service cell identifier field indicating a cell for which the MAC CE applies; a BWP identifier field indicating a UL BWP for which the MAC CE applies as a codepoint of a DCI BWP indicator field; a PUCCH resource identifier field indicating a PUCCH resource ID of RRC-configured PUCCH resource (e.g., identified by PUCCH-ResourceId); and/or one or more fields indicating activation/deactivation states of one or more PUCCH spatial relations configured, by RRC signaling, for a UP BWP indicated by the BWP identifier field (e.g., the i-th field of the one or more fields may indicate an activation status of the i-th PUCCH spatial relation of the one or more PUCCH spatial relations. The i-th field set to '1' (or '0') may indicate that the i-th PUCCH spatial relation is activated (resp. deactivated). For example, the i-th PUCCH spatial relation may correspond to (or associated with) PUCCH-SpatialRelationInforId i in an RRC message). The wireless device may receive, from the base station, the MAC CE indicating at least one spatial relation of the plurality of spatial relations to use.

Figure 18A:
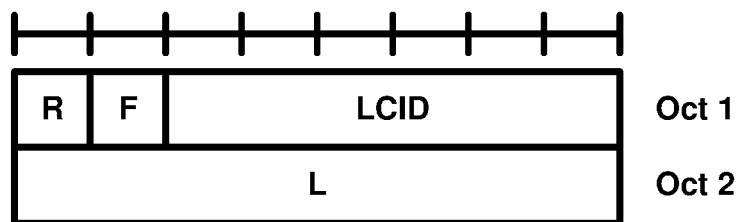
FIG. 18A, FIG. 18B, and FIG. 18C show examples of MAC subheaders as per an aspect of an embodiment of the present disclosure.
Figure 18B:
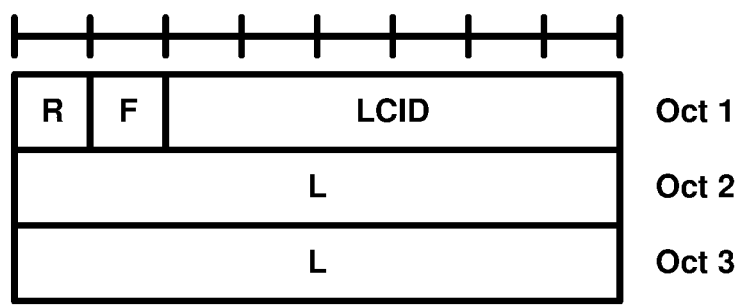
Figure 18C:
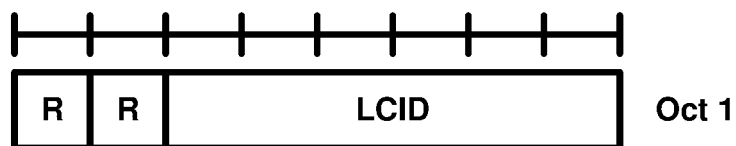

A MAC CE may be transmitted as a part of a MAC PDU. A MAC PDU may, for example, be a bit string that may be byte aligned based on any length (e.g., 8 bits). The MAC PDU may comprise at least one of: at least one MAC subheader, at least one MAC SDU, or at least one MAC CE. FIG. 18A, FIG. 18B, and FIG. 18C show examples of MAC subheaders. FIG. 18A, FIG. 18B, and FIG. 18C may be respective examples of a first type of R/F/LCID/L MAC subheader with 8-bit L field, a second type of R/F/LCID/L MAC subheader with 16-bit L field, and an R/LCID MAC subheader. FIG. 18A and FIG. 18B show examples of MAC PDU for a DL MAC PDU (e.g., FIG. 18A) and for an UL MAC PDU (e.g., FIG. 18B). A bit order of one or more parameter fields within a MAC PDU may be represented with the first and most significant bit in the leftmost bit and the last and least significant bit in the rightmost bit.

A MAC SDU may be a bit string that may be byte aligned based on any length (e.g., 8 bits). A MAC PDU may comprise a MAC SDU from the first bit onward. A MAC CE may be a bit string that may be byte aligned based on any length (e.g., 8 bits). A MAC subheader may be a bit string that may be byte aligned based on any length (e.g., 8 bits). A MAC subheader may be placed in front of a corresponding MAC SDU, a corresponding MAC CE, or corresponding padding. A wireless device may ignore a value of the reserved bits in downlink MAC PDUs.

A MAC PDU may comprise one or more MAC subPDUs. At least one of the one or more MAC subPDUs may comprise at least one of the following: a MAC subheader only (including padding), a MAC subheader and a MAC SDU, a MAC subheader and a MAC CE, or a MAC subheader and padding. MAC SDUs may be of variable sizes. A MAC subheader may correspond to either a MAC SDU, a MAC CE, or padding. A MAC subheader may comprise at least four header fields R/F/LCID/L. A MAC subheader for a fixed sized MAC CE and padding may comprise at least two header fields R/LCID. One or more MAC CEs may be placed together.

FIG. 19A and FIG. 19B are examples of a DL MAC PDU and a UL MAC PDU. One or more DL MAC subPDU(s) comprising one or more MAC CE(s) may be placed before a MAC subPDU comprising a MAC SDU, and before a MAC subPDU comprising padding, as shown in FIG. 19A. One or more UL MAC subPDU(s) comprising one or more MAC CE(s) may be placed after one or more MAC subPDU (s) comprising a MAC SDU (e.g., after all the MAC subPDU(s) in the MAC PDU comprising a MAC SDU), and before a MAC subPDU in the MAC PDU comprising padding, as shown in FIG. 19B. The size of padding may be zero.

Figure 20:
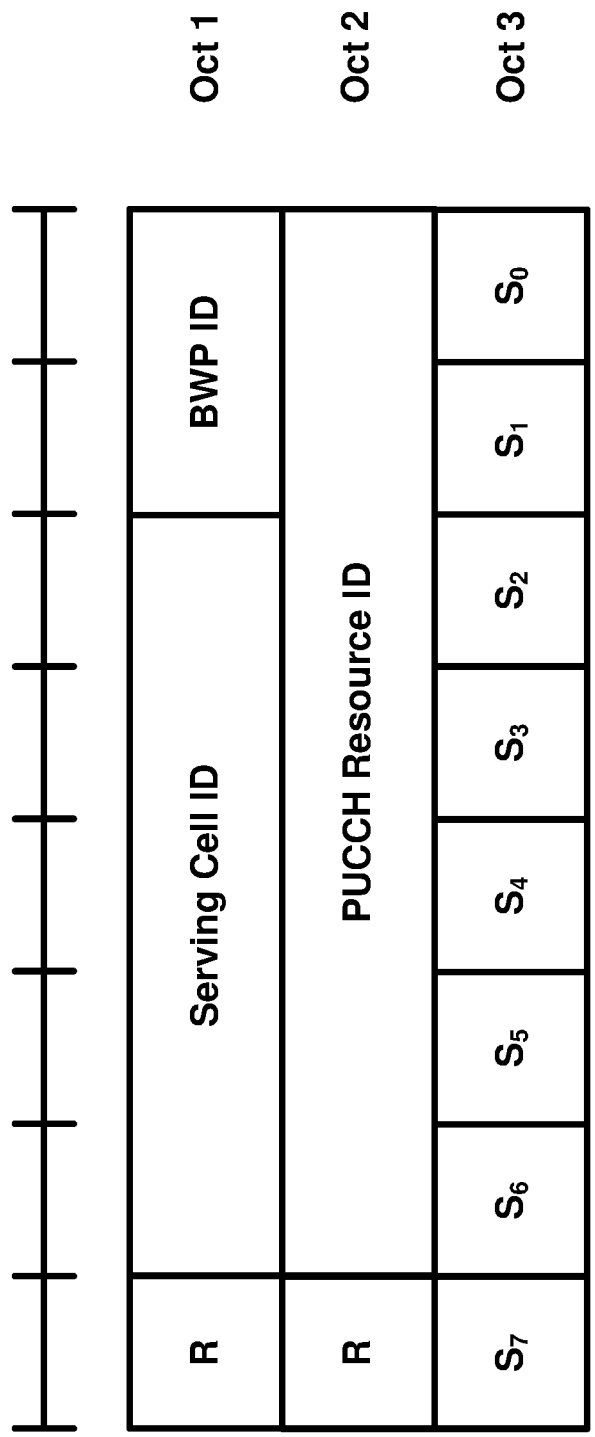
FIG. 20 shows an example of an MAC CE indicating a PUCCH spatial relation activation/deactivation as per an aspect of an embodiment of the present disclosure.

FIG. 20 shows an example of an MAC CE indicating a PUCCH spatial relation activation/deactivation. The MAC CE may be identified by a MAC PDU subheader with an LCID predefined (e.g., specified in a predefined table). The example of the MAC CE in FIG. 20 may comprise: a serving cell ID field indicating an identity of a serving cell for which the MAC CE applies; a BWP ID field indicating a UL BWP for which the MAC CE applies as the codepoint of a bandwidth part indicator field in a DCI; a PUCCH resource ID field indicating an identifier of the PUCCH resource ID identified by a particular PUCCH resource (e.g., PUCCH-ResourceId) configured by RRC signaling; one or more Si fields indicating an activation status of a particular PUCCH spatial relation (e.g., PUCCH Spatial Relation Info with PUCCH-SpatialRelationInfoId i), e.g., an $S_i$ field may be set to "1" to indicate PUCCH Spatial Relation Info with PUCCH-SpatialRelationInfoId i is activated, or may be set to "0" to indicate PUCCH Spatial Relation Info with PUCCH-SpatialRelationInfoId i is deactivated; one or more R fields indicating one or more reserved bits.

A wireless device may be configured with one or more PUCCH resource sets. Each PUCCH resource set may comprise one or more PUCCH resource configurations. Each PUCCH resource configuration may indicate a PUCCH format to use. A PUCCH resource set may be associated with a certain range of UCI feedback to transmit. For example, a PUCCH resource set may carry a limited number of bits. For example, a PUCCH resource set may comprise a particular PUCCH format based on which a wireless device transmits at most fixed number of bits. (e.g., PUCCH format 0 and/or PUCCH format 1 based on which a wireless device may transmit one or two bits). A size of UCI payload may determine a PUCCH resource set, for example, if a wireless device is configured with a plurality of PUCCH resource sets. A PUCCH resource configuration (e.g., a PUCCH format) may be determined by an indicator transmitted by a base station (e.g., acknowledgement resource indicator (ARI) transmitted as a part of a DCI). For example, a wireless device may determine a PUCCH resource set based on a size of a UCI payload to transmit and determine a PUCCH resource configuration within the PUCCH resource set based on an ARI field in a DCI received from a base station.

In an example, a wireless device may be configured with a PUCCH resource set by a parameter (e.g., pucch-ResourceCommon) of a broadcast RRC message based on an index to a row of predefined table, for example, if the wireless device is not configured with a dedicated PUCCH resource configuration, e.g., provided by a parameter (e.g., PUCCH-ResourceSet) of an RRC message (e.g., PUCCH-Config). The PUCCH resource set comprise one or more resources (e.g., sixteen resources). Each of the one or more resources may indicate a PUCCH format, a first symbol, a duration, a PRB offset, and/or a cyclic shift index set for a PUCCH transmission.

In an example, a wireless device may receive, from a base station, configuration parameter(s) (e.g., PUCCH-SpatialRelationInfo) indicating a spatial setting of a PUCCH transmission, for example, if the UE is configured with one PUCCH spatial relation (e.g., a single value for pucch-SpatialRelationInfoId). The wireless device may determine a spatial setting for a PUCCH transmission based on an MAC CE if the wireless dive is configured with a plurality of PUCCH spatial relations. For example, the wireless device may receive, from the base station, a PUCCH spatial relation activation/deactivation MAC CE (e.g., FIG. 20) that indicates an activation of at least one spatial relation (e.g., a spatial relation associated with $S_i$ that is set to '1'). The wireless device may apply a spatial setting corresponding to the indicated spatial relation for a spatial domain filter to transmit PUCCH. The wireless device may apply the spatial setting with a time offset (e.g., 3 msec after the slot where the UE transmits HARQ-ACK information with ACK value corresponding to a PDSCH reception providing the PUCCH-SpatialRelationInfo).

A PUCCH spatial relation configured to a wireless device may indicate (and/or associated with) one of a particular SSB, a particular CSI-RS, and/or a particular SRS. For example, if a PUCCH spatial relation is associated with a particular SSB (e.g., if PUCCH-SpatialRelationInfo indicates ssb-Index), a wireless device may transmit a PUCCH using a same spatial domain filter as for a reception of an SSB with index (e.g., ssb-Index) indicated by (and/or associated with) the PUCCH spatial relation for a same serving cell (or for a particular serving cell if the particular cell (e.g., servingCellId) is indicated). For example, a wireless device may For example, if a PUCCH spatial relation is associated with a particular CSI-RS (e.g., if PUCCH-SpatialRelation-Info indicates csi-RS-Index), a wireless device may transmit a PUCCH using a same spatial domain filter as for a reception of a CSI-RS with a resource index (e.g., csi-RS-Index) indicated by the PUCCH spatial relation for a same serving cell (or for a particular serving cell if the particular serving (e.g., servingCellId) is indicated). For example, if a PUCCH spatial relation is associated with a particular SRS (e.g., if PUCCH-SpatialRelationInfo indicates srs), a wireless device may transmits a PUCCH using a same spatial domain filter as for a transmission of an SRS with resource index provided by resource for a same serving cell and/or active UL BWP (or for a particular serving cell indicated by a cell ID (e.g., servingCellId) and/or for a particular UL BWP indicated by a BWP ID (e.g., uplinkBWP).

A wireless device may be configured, by a base station, with one or more sounding reference signal (SRS) resource sets by a higher layer parameter (e.g., SRS-ResourceSet). For an SRS resource set of the one or more SRS resource sets, the base station may configure the wireless device with one or more SRS resources by a higher layer parameter (e.g., SRS-Resource). An SRS resource may be configured for periodic, semi-persistent (SP), and/or aperiodic transmission. one or more SRS resource within an SRS resource set may be configured with a same type. For example, periodic, semi-persistent, and/or aperiodic transmission may be a type (e.g., property) of an SRS resource set. A wireless device may be configured with one or more SRS resource sets for determining downlink and/or uplink multi-antenna precoders and/or for performing downlink and/or uplink beam management.

In an example, the higher layer parameter SRS-Resource may configure, semi-statically, at least one of: an srs resource index (e.g., provided by a higher layer parameter srs-ResourceId) indicating a configuration of an SRS resource; a time domain behaviour of the configuration of the SRS resource (e.g., indicated by a higher layer parameter resourceType); an SRS sequence ID (e.g., provided by a higher layer parameter sequenceId; and a configuration of a spatial relation between a reference RS and a target SRS. In an example, the base station may configure the wireless device with a higher layer parameter spatialRelationInfo. In an example, the higher layer parameter spatialRelationInfo may comprise an index (ID) of the reference RS. In an example, the domain behaviour of an SRS resource may be a periodic transmission, a semi-persistent transmission, or an aperiodic SRS transmission. In an example, a time domain behavior of an SRS resource may comprise a transmission periodicity, a transmission offset of the SRS resource, etc.

In an example, the wireless device may determine that a higher layer parameter servingCellId indicating a serving cell may be present in the higher layer parameter spatialRelationInfo. In response to the determining, the wireless device may determine that the reference RS may be a first RS (e.g., SSB and/or CSI-RS) configured on the serving cell.

In an example, the wireless device may determine that a higher layer parameter uplinkBWP indicating an uplink BWP and a higher layer parameter servingCellId indicating a serving cell may be present in the higher layer parameter spatialRelationInfo. In an example, in response to the determining, the wireless device may determine that the reference RS may be a first RS (e.g., SRS) configured on the uplink BWP of the serving cell.

In an example, the base station may configure the target SRS on a serving cell. In an example, the wireless device may determine that a higher layer parameter servingCellId may be absent in the higher layer parameter spatialRelationInfo. In response to the determining, the wireless device may determine that the reference RS may be a first RS (e.g., SSB and/or CSI-RS) configured on the serving cell.

In an example, the base station may configure the target SRS on a serving cell. In an example, the wireless device may determine that a higher layer parameter servingCellId is absent and a higher layer parameter uplinkBWP indicating an uplink BWP is present in the higher layer parameter spatialRelationInfo. In response to the determining, the wireless device may determine that the reference RS may be a first RS (e.g., SRS) configured on the uplink BWP the serving cell.

In an example, a wireless device may transmit PUSCH and SRS in a same slot. In response to the transmitting the PUSCH and SRS in the same slot, the base station may configure the wireless device to transmit the SRS after the transmission of the PUSCH (and the corresponding DM-RS).

In an example, a base station may configure a wireless device with one or more SRS resource configurations. In an example, a higher layer parameter resourceType in a higher layer parameter SRS-Resource may be set to "periodic".

In an example, the base station may configure the wireless device with a higher layer parameter spatialRelationInfo. The higher layer parameter spatialRelationInfo may comprise an ID of a reference RS (e.g., ssb-Index, csi-RS-Index, and/or srs).

In an example, the reference RS may be an SSB. In an example, the reference RS may be a CSI-RS (e.g., periodic CSI-RS, semi-persistent CSI-RS, aperiodic CSI-RS). In an example, the wireless device may use a spatial domain receiving filter to receive the reference RS. In an example, in response to the higher layer parameter spatialRelationInfo indicating the reference RS (e.g., by the ID of the reference RS) being the SSB or the CSI-RS, the wireless device may transmit a target SRS resource with a spatial domain transmission filter same as the spatial domain receiving filter. In an example, in response to the higher layer parameter spatialRelationInfo indicating the reference RS (e.g., by the ID of the reference RS), the wireless device may transmit a target SRS resource with the spatial domain receiving filter.

In an example, the reference RS may be an SRS (e.g., periodic SRS, semi-persistent SRS, aperiodic SRS). In an example, the wireless device may use a spatial domain transmission filter to transmit the reference RS. In an example, in response to the higher layer parameter spatialRelationInfo indicating the reference RS (e.g., by the ID of the reference RS) being the SRS, the wireless device may transmit a target SRS resource with the spatial domain transmission filter.

In an example, the base station may activate and deactivate one or more configured SRS resource sets (e.g., semi-persistent SRS resource sets) of a serving cell by sending a semi-persistent SRS Activation/Deactivation MAC CE. In an example, the one or more configured SRS resource sets may be initially deactivated upon configuration. In an example, the one or more configured SRS resource sets may be deactivated after a handover.

In an example, a base station may configure a wireless device with one or more SRS resource sets (e.g., semi-persistent SRS resource sets). In an example, a higher layer parameter resourceType in a higher layer parameter SRS-Resource may be set to "semi-persistent". In an example, the wireless device may receive, from the base station, an activation command (e.g., a semi-persistent SRS Activation/Deactivation MAC CE) for an SRS resource set of the one or more SRS resource sets. In an example, a PDSCH may carry the activation command. In an example, the wireless device may transmit an HARQ-ACK for the PDSCH in a slot n. In an example, in response to the transmitting the HARQ-ACK for the PDSCH in the slot n, the wireless device may apply one or more assumptions/actions for an SRS transmission of the SRS resource set with a time offset (e.g., starting from the slot $n+3N_{slot}^{subframe,\mu}+1$). In an example, the activation command may comprise one or more spatial relation assumptions for one or more SRS resources of the SRS resource set. In an example, a first field (e.g., Resource ID) in the activation command may comprise an identifier of a resource (e.g., SSB, CSI-RS, and/or SRS) used for spatial relationship derivation for an SRS resource of the one or more SRS resources. In an example, the one or more spatial relation assumptions may be provided by a list of references to one or more reference signal IDs (e.g., SSB-Index, SRS-ResourceId, etc.), one per an SRS resource of the (activated) SRS resource set. In an example, a spatial relation assumption of the one or more spatial relation assumption may be provided by a reference to an ID of a reference RS. In an example, the reference RS may be an SSB, a CSI-RS resource, or an SRS.

In an example, a Resource Serving Cell ID field indicating a serving cell may be present in the activation command. In an example, the reference RS may be an SSB resource or a CSI-RS resource. In response to the Resource Serving Cell ID field being present and the reference RS being the SSB block resource or the CSI-RS resource, the reference RS (e.g., SSB and/or CSI-RS resource) may be configured on the serving cell.

In an example, the base station may configure the (activated) SRS resource set on a serving cell. In an example, a Resource Serving Cell ID field may be absent in the activation command. In response to the Resource Serving Cell ID field being absent and the base station configuring the SRS resource set on the serving cell, the reference RS (e.g., SSB and/or CSI-RS resource) may be configured on the serving cell.

In an example, a Resource Serving Cell ID field indicating a serving cell and a Resource BWP ID field indicating an uplink BWP may be present in the activation command. In response to the Resource Serving Cell ID field and the Resource BWP ID field being present, the reference RS (e.g., SRS resource) may be configured on the uplink BWP of the serving cell.

In an example, the base station may configure the SRS resource set on an uplink BWP of a serving cell. In an example, a Resource Serving Cell ID field and a Resource BWP ID field may be absent in the activation command. In response to the Resource Serving Cell ID field and the Resource BWP ID field being absent and the SRS resource set being configured on the uplink BWP of the serving cell, the reference RS (e.g., SRS resource) may be configured on the uplink BWP of the serving cell.

In an example, the base station may configure an SRS resource in the (activated) SRS resource set with a higher layer parameter spatialRelationInfo. In response to the SRS resource, in the (activated) SRS resource set, being configured with the higher layer parameter spatialRelationInfo, the wireless device may assume that a reference RS (e.g., indicated by an ID of the reference RS) in the activation command overrides a second reference RS configured in the higher layer parameter spatialRelationInfo.

In an example, the wireless device may receive, from the base station, a deactivation command (e.g., semi-persistent SRS Activation/Deactivation MAC CE) for an (activated) SRS resource set of the one or more SRS resource sets. In an example, a PDSCH may carry the deactivation command. In an example, the wireless device may transmit an HARQ-ACK for the PDSCH in a slot n. In an example, in response to the transmitting the HARQ-ACK for the PDSCH in the slot n, the wireless device may apply one or more assumptions/actions for a cessation of an SRS transmission of the (deactivated) SRS resource set with a time offset (e.g., starting from the slot $n+3N_{slot}^{subframe,\mu}+1$).

In an example, a wireless device may activate a semi-persistent SRS resource configuration on an uplink BWP of a serving cell in response to receiving, from a base station, an activation command for the semi-persistent SRS resource configuration. In an example, the wireless device may not receive, from the base station, a deactivation command for the semi-persistent SRS resource configuration.

In an example, the uplink BWP may be an active uplink BWP of the serving cell. In an example, in response to the uplink BWP being the active uplink BWP of the serving cell and not receiving the deactivation command for the semi-persistent SRS resource configuration, the wireless device may consider the semi-persistent SRS resource configuration active. In an example, in response to the considering, the wireless device may transmit an SRS transmission, via the uplink BWP of the serving cell, according to the semi-persistent SRS resource configuration.

In an example, the uplink BWP may not be an active uplink BWP of the serving cell. In an example, the uplink BWP not being the active uplink BWP may comprise the uplink BWP being deactivated in the serving cell. In response to not receiving the deactivation command for the semi-persistent SRS resource configuration and the uplink BWP being deactivated, the wireless device may assume that the semi-persistent SRS configuration is suspended in the UL BWP of the serving cell. In an example, the semi-persistent SRS configuration being suspended in the UL BWP may comprise that the wireless device may reactivate the semi-persistent SRS configuration when the UL BWP becomes an active UL BWP of the serving cell.

In an example, a first SRS resource of an SRS resource set may have a first time domain behavior (e.g., periodic, semi-persistent, aperiodic). In an example, a second SRS resource of the SRS resource set may have a second time domain behavior (e.g., periodic, semi-persistent, aperiodic). In an example, in response to the first SRS resource and the second SRS resource being in the (same) SRS resource set, the wireless device may expect that the first time domain behavior and the second time behavior are the same. In an example, in response to the first SRS resource and the second SRS resource being in the (same) SRS resource set, the wireless device may not expect that the first time domain behavior and the second time behavior are different.

In an example, an SRS resource of an SRS resource set may have a first time domain behavior (e.g., periodic, semi-persistent, aperiodic). In an example, the SRS resource set may have a second time domain behavior (e.g., periodic, semi-persistent, aperiodic). In an example, in response to the SRS resource being associated with the SRS resource set, the wireless device may expect that the first time domain behavior and the second time behavior are the same. In an example, in response to the SRS resource and the SRS resource set being associated, the wireless device may not expect that the first time domain behavior and the second time behavior are different. In an example, the SRS resource being associated with the SRS resource set may comprise that the SRS resource set comprises the SRS resource. In an example, the SRS resource being associated with the SRS resource set may comprise that the SRS resource is an element of the SRS resource set.

In a radio access technology (e.g., 4G, 5G, etc.), a wireless device may be configured, by a base station, with at least one identifier (e.g., ID) indicating at least one antenna group, at least one antenna panel, and/or at least one antenna group (e.g., panel)-specific UL transmission. There may be one or more ways to represent an identifier of an antenna group (e.g., panel). For example, an SRS resource set ID may be used to indicate a particular antenna group (e.g., panel). A wireless device may be configured one or more SRS resources in an SRS resource set. The wireless device may transmit only one (or one or more) SRS resource in each of one or more SRS resource sets at a given time instant. The wireless device may transmit one or more SRS resources in different SRS resource sets simultaneously. There may be an antenna group ID that represents a particular antenna group (e.g., panel). For example, a wireless device may not transmit different UL RS resources, that may have different spatial relations and be associated with a same antenna group ID, simultaneously. The wireless device may transmit different UL RS resources associated with different antenna group IDs simultaneously.

A wireless device may be configured with a plurality of SRS resources within an SRS resource set. For example, the plurality of SRS resources may be for a plurality of antenna groups (e.g., for a multi-panel operation). The plurality of SRS resources may be configured with different higher layer parameters, e.g., spatialRelationInfo. A base station may transmit a DCI comprising at least one SRI codepoint indicating one or more SRS resources for one UL (e.g., PUSCH, PUCCH, and/or SRS) transmission for a plurality of antenna groups (e.g., multi-panel operation). For example, if a wireless device is configured with two antenna groups (e.g., panels) for a UL (e.g., PUSCH, PUCCH, and/or SRS) transmission, the UL transmission may be performed via the two antenna groups (e.g., panels) simultaneously based on at least one SRI codepoint, in DCI, that may be associated with two different SRS resources with different spatial relations. The SRS resource(s) used for the UL transmission may be associated with one antenna group ID (e.g., a panel ID, an SRS resource set ID and/or) besides spatialRelationInfo. An MAC CE may indicate (and/or activate) one or more SRS resource sets. For example, a number of spatial relations for one or more SRS resources of one or more SRS resource sets may be configured by an RRC message transmitted by a base station. The base station may transmit the MAC CE to indicate indicated by a DCI may be limited by a size of the DCI. The base station may group the one or more SRS resources and/or the one or more SRS resource sets into one or more groups. The MAC CE, transmitted by the base station to the wireless device, may indicate at least one group of the one or more groups. The base station may transmit a DCI that indicates at least one SRS resource within the at least one group selected by the MAC CE. The MAC CE may comprise at least one of: a serving cell identifier, an uplink BWP identifier of the serving cell indicated by the serving cell identifier, one or more fields indicating activation status of one or more groups configured by RRC signaling. For example, the base station may determine one or more SRS resources in a same SRS resource set (e.g., same antenna group and/or same antenna panel) as a group, e.g., an antenna group ID (e.g. panel ID) may be a group ID used in the MAC CE. The MAC CE may activate a plurality of groups. Similarly, as described elsewhere in this specification, a base station may activate a plurality of antenna groups (e.g., panels and/or SRS resource sets) by configuring a parameter, e.g., usage, of each of the antenna groups to a particular state. For example, for a codebook-based transmission (or a non-codebook transmission), configuring a parameter of each of SRS resource sets (e.g., antenna groups and/or panels) with 'codebook' (resp. 'non-codebook') may indicate an activation (and/or a use) of the SRS resource sets (e.g., antenna groups and/or panels) for a UL transmission. a DCI may comprise at least one field indicating at least one particular SRS resource within one or more SRS resource sets (e.g., antenna groups and/or panels) activated by the MAC CE or RRC signaling.

A wireless device may determine an uplink power for PUSCH, PUCCH, and/or SRS transmissions based on one or more spatial relations indicated by a base station. The spatial relation may indicate a particular beam pair link. The spatial relation may be associated with a set of power control parameters comprising a reference transmission power (e.g., P0), a scaling factor, closed loop power control ID and/or a pathloss measurement reference signal (e.g., SSB and/or CSI-RS). The set of power control parameters may be configured for the particular beam pair link. For example, a spatial relation of the one or more spatial relations may indicate an association between at least one DL reference signal (e.g., SSB and/or CSI-RS) and at least one SRS resource. The wireless device may determine an uplink power based on the set of power control parameters that is associated with at least one spatial relation indicated by a base station (e.g., RRC signaling may configure a mapping between SRIs and power control parameters). The spatial relation may be indicated by an SRI in DCI and/or via RRC signaling.

Figures 21A, 21B:
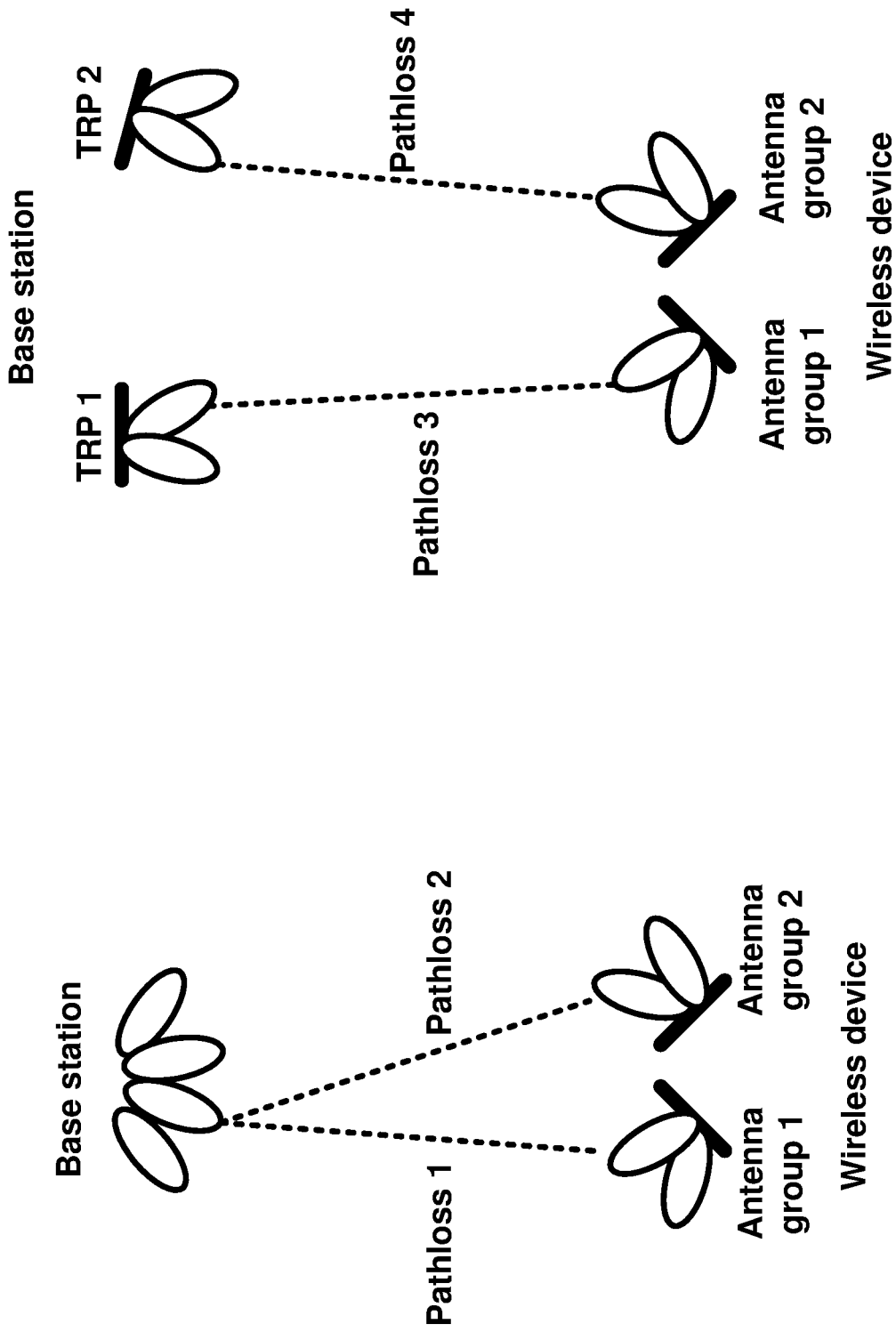
FIG. 21A and FIG. 21B show examples of one or more beam pair links as per an aspect of an embodiment of the present disclosure.

FIG. 21A and FIG. 21B show examples of one or more beam pair links. FIG. 21A shows an example of base station's beam associated with different wireless device's beams in different antenna groups (e.g., panels). A UL transmission of a wireless device may be scheduled antenna group 1 and antenna group 2 simultaneously. For a multi-antenna groups (panels), a channel condition that one antenna group (e.g., panel) experiences may be different another channel condition that another antenna group experiences. For example, Pathloss 1 and Pathloss 2 in FIG. 21A may be different. Per-antenna-group power control may be configured to the wireless device for accurate adjustment of uplink transmit power. For example, at least one of a reference power (e.g., P0), a scaling factor (e.g., alpha), a pathloss reference signal, and/or closed loop power control index may be configured per antenna group (e.g., panel). As shown in FIG. 21A, different beams in different antenna groups may be associated with a same DL pathloss reference signals. A wireless device may perform a pathloss measurement per an antenna group (e.g., panel). FIG. 21B shows an example of multi-transmission-reception-point (multi-TRP) and multiple antenna groups. FIG. 21B shows that different antenna groups are associated with different TRPs. Pathloss 3 and Pathloss 4 may be different, for example, different channel and different interference experienced in different TRPs. A base station may configure a wireless device with different power control parameters for different TRP-antenna group (e.g., panel) links such that transmissions on different TRP-antenna group (e.g., panel) may be transmitted at different power. For example, a first power control parameter associated with Pathloss 3 and a second power control parameter associated with Pathloss 4 may be different in FIG. 21B.

For a UL transmission using multiple antenna groups, a base station may configure a wireless device to transmit a power headroom report per an antenna group (and/or TRP-antenna group). The wireless device may transmit a power headroom report comprising a power headroom value per an activated antenna group of an activated cell. The base station may use the power headroom report transmitted by the wireless device, for example, to determine which antenna group is activated and/or deactivated, to determine antenna group switching (e.g., UL transmission is switched from one antenna group to another antenna group), to determine an MCS and/or a value of transmit power control command for a UL transmission via an antenna group.

A wireless device may perform a power headroom reporting procedure to indicate, to a base station, at least one of following information: Type 1 power headroom (PH) indicating a difference between a nominal maximum transmit power and an estimated power for UL-SCH transmission per activated serving cell configured with the wireless device; Type 2 PH indicating a difference between a nominal maximum transmit power and an estimated power for UL-SCH and PUCCH transmission on SpCell of another MAC entity (e.g., E-UTRA MAC entity in EN-DC); Type 3 PH indicating a difference between a nominal maximum transmit power and an estimated power for SRS transmission per activated serving cell.

A wireless device may receive an RRC message indicating one or more parameters for the power headroom reporting procedure. An MAC entity of the wireless device may determine when to transmit, to a base station, a power headroom report (PHR) based on the one or more parameters. The wireless device may determine which cell and/or which type of power headroom need to be reported via the PHR. For example, the one or more parameters may indicate a first value of a PHR periodic timer (e.g., phr-PeriodicTimer), a second value of a PHR prohibit timer (e.g., phr-ProhibitTimer), a PHR pathloss change threshold (e.g., phr-Tx-PowerFactorChange), a presence/absence indicator of a PH value for other cell in the PHR (e.g., phr-Type2OtherCell), a mode (e.g., real or virtual) indicator of a PH (e.g., phr-ModeOtherCG), and/or a multiple PHR indicator (e.g., multiplePHR).

An MAC entity of a wireless device may trigger a PHR based on one or more conditions. For example, the wireless derive may trigger a PHR at least one of following events: a first timer (e.g., phr-PeriodicTimer) expires; upon configuration or reconfiguration of the power headroom reporting functionality by upper layers, which may not be used to disable the function; activation of an SCell of any MAC entity with configured uplink; and/or an addition of the PSCell (e.g., a PSCell may be added or changed).

An MAC entity of a wireless device may, for example, if the wireless device has UL resources allocated for a new transmission, start a PHR periodic timer if a first UL resource is firstly allocated for a new transmission since a last MAC reset. A wireless device may transmit, for example, if a PHR procedure determines that at least one PHR has been triggered and not cancelled and/or if allocated UL resources accommodate at least one PHR (e.g., a MAC CE for the PHR which the MAC entity is configured to transmit, plus its subheader, as a result of logical channel prioritization), at least one PHR to a base station. A PHR procedure and/or a PHR format may be determined, for example on whether a base station configures a wireless device with a single entry PHR format (e.g., a multiple PHR indicator (e.g., multiplePHR) is not configured) or a multiple entry PHR format (e.g., a multiple PHR indicator (e.g., multiplePHR) is configured).

If a base station configures a wireless device with a multiple PHR indicator (e.g., by transmitting an RRC configuration parameter indicating the multiple entry PHR format (e.g., multiplePHR)), an MAC entity of the wireless device may determine, for each of one or more activated cells with configured uplink(s) associated with the wireless device, a first value of a first type power headroom (PH), e.g., Type 1 PH determined based on a PUSCH transmission, or a third type PH, e.g., Type 3 PH determined based on an SRS transmission. A wireless device may determine, for example, if the wireless device has UL resources allocated for a transmission on the at least one cell, or if one or more other cells of the one or more activated cells have UL resources allocated for transmission on the at least one cell and PHR configuration parameters transmitted for indicating a PHR mode of the one or more cells indicates a real PH value (e.g., a mode (e.g., real or virtual) indicator of a PH (e.g., phr-ModeOtherCG)) indicate a real PH value), a second value corresponding to $P_{CMAX,c}$ (described elsewhere in this specification) and transmit the first value and the second value via corresponding one or more fields in a PHR.

If a presence/absence indicator of a PH value for other cell in the PHR (e.g., phr-Type2OtherCell) is configured to a wireless device, and/or if other MAC entity is a particular radio access technology (e.g., 4G) MAC entity, an MAC entity of the wireless device determines a first value corresponding to a second type PH (e.g., Type 2 PH) for an SpCell of the other MAC entity. If a PHR mode of the one or more cells indicates a real PH value (e.g., a mode (e.g., real or virtual) indicator of a PH (e.g., phr-ModeOtherCG)) indicate a real PH value), a wireless device may a second value corresponding to $P_{CMAX,c}$. The wireless device may transmit the first value and the second value via one or more corresponding fields in a PHR.

An MAC entity of a wireless device may trigger a multiplexing and assembly procedure for generating and transmitting a PHR (e.g., in a form of a PHR MAC CE). The PHR may comprise a first value of a first type PH, a second type PH, and/or a third type PH of at least one cell. The PHR may comprise a second value, corresponding to $P_{CMAX,c}$, for example, based on a configured serving cell index (e.g., ServCellIndex) and/or configured PUCCH(s) for the wireless device. A wireless device may, for example, based on transmitting a PHR, start or restart a PHR periodic timer (e.g., periodicPHR-Timer) and/or a PHR prohibit timer (e.g., prohibitPHR-Timer). A wireless device may, for example, based on transmitting a PHR, cancel one or more triggered PHRs.

If a base station configures a wireless device with a single entry PHR format (e.g., by transmitting a PHR configuration parameter indicating the single entry PHR format, and/or by not configuring a PHR configuration parameter indicating a multiple entry PHR format (e.g., if multiplePHR is absent)), the wireless device may, for example, determine a first value, of a first type PH or of a third type PH, for a corresponding uplink carrier of a cell (e.g., a PCell). The wireless device may, for example, determine a second value corresponding to $P_{CMAX, c}$. The wireless device may, for example, based on determining the first value and the second value, transmit a PHR to a base station (e.g., a gNB). The PHR may comprise one or more fields indicating the first value and the second value. A wireless device may trigger a multiplexing and assembly procedure for generating and transmitting a PHR MAC CE comprising a value of a first type PH or of a third type PH. A wireless device may, for example, based on transmitting a PHR, start or restart a PHR periodic timer (e.g., periodicPHR-Timer) and/or a PHR prohibit timer (e.g., prohibitPHR-Timer). A wireless device may, for example, based on transmitting a PHR, cancel one or more triggered PHRs.

Figures 22A, 22B, 22C:
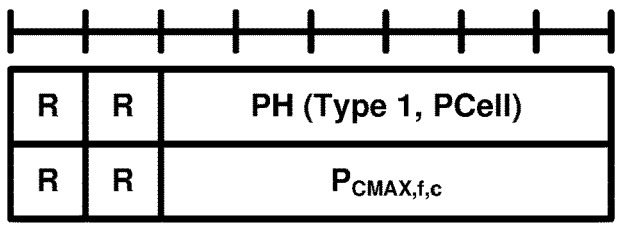
FIG. 22A shows an example of a single entry PHR MAC CE as per an aspect of an embodiment of the present disclosure.
FIG. 22B shows an example reported PH and corresponding example power headroom levels as per an aspect of an embodiment of the present disclosure.
FIG. 22C shows an example reported $P_{CMAX,f,c}$ and corresponding example nominal wireless device transmit power levels as per an aspect of an embodiment of the present disclosure.

FIG. 22A shows an example of a single entry PHR MAC CE. The single entry PHR MAC CE maybe identified by a MAC PDU subheader with a particular LCID assigned for the single entry PHR MAC CE. The single entry PHR MAC CE may have a fixed size and comprise one or more octets (e.g., two octets) as shown in FIG. 22A. The single entry PHR MAC CE may comprise one or more fields to reserve one or more bits (e.g., an R field in FIG. 22A: reserved bit may be set to "0"); a value of PH indicating a power headroom level (e.g., a PH field in FIG. 22A); and/or a $P_{CMAX,f,c}$ indicating a particular $P_{CMAX,f,c}$ used for determining of the preceding PH field in FIG. 22A. Example reported PH and corresponding example power headroom levels (e.g., the corresponding measured values in dB may be predefined) are shown in FIG. 22B. Example reported $P_{CMAX,f,c}$ and corresponding example nominal wireless device transmit power levels (e.g., the corresponding measured values in dBm may be predefined) are shown in FIG. 22C.

Figure 23:
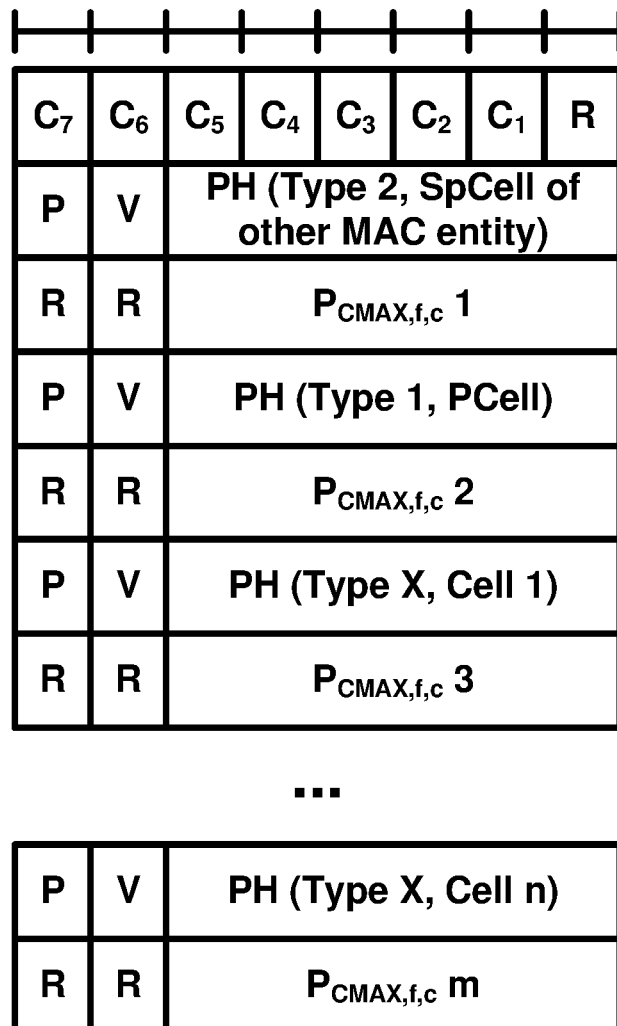
FIG. 23 shows an examples of a multiple entry PHR MAC CE as per an aspect of an embodiment of the present disclosure.

FIG. 23 and FIG. 24 show example of multiple entry PHR MAC CE. The multiple entry PHR MAC CE may be identified by a MAC PDU subheader with a particular LCID assigned for the multiple entry PHR MAC CE. The multiple entry PHR MAC CE may have a variable size, and comprise a bitmap, a Type 2 PH field and an octet comprising an associated $P_{CMAX,f,c}$ field (e.g., if reported) for SpCell of the other MAC entity, a Type 1 PH field and an octet comprising an associated $P_{CMAX,f,c}$ field (e.g., if reported) for a PCell. The multiple entry PHR MAC CE may further comprise, e.g., in ascending order based on a cell ID (e.g., ServCellIndex), one or more of Type X PH fields and octets comprising an associated $P_{CMAX,f,c}$ fields (e.g., if reported) for a serving cells other than a PCell indicated in the bitmap (e.g., X may be either 1 or 3). A presence of Type 2 PH field for SpCell of the other MAC entity may be configured by a presence/absence indicator of a PH value for other cell in the PHR (e.g., phr-Type2OtherCell with value true). A single octet bitmap may be used for indicating the presence of PH per a serving cell, e.g., when a total number of serving cells and/or a highest cell ID (e.g., ServCellIndex) of a serving cell with configured uplink is less than 8, otherwise four octets are used. The MAC entity determines whether PH value for an activated serving cell is based on real transmission or a reference format based on configured grant(s) and downlink control information that may have been received until and including the PDCCH occasion in which a first UL grant for a new transmission is received since a PHR has been triggered if a PHR MAC CE is reported on an uplink grant received on the PDCCH or until the first uplink symbol of PUSCH transmission minus PUSCH reparation time predefined, e.g., if the PHR MAC CE is reported on a configured grant.

As shown in FIG. 23 and FIG. 24, the PHR MAC CEs may comprise at least one of:
- a presence/absence indication field (e.g., $C_i$ in FIG. 23 and/or FIG. 24) that indicates a presence of a PH field for a serving cell with a cell ID i (e.g., ServCellIndex i). The $C_i$ field set to "1" may indicate that a PH field for the serving cell with the cell ID i (e.g., ServCellIndex i) is reported. The $C_i$ field set to "0" may indicate that a PH field for the serving cell with a cell ID i (e.g., ServCellIndex i) is not reported;
- a reservation field (e.g., R in FIG. 23 and/or FIG. 24) indicating one or more reserved bit (e.g., R set to "0");
- a PH mode indicator (e.g., V in FIG. 23 and/or FIG. 24) that indicate if the PH value is based on a real transmission or a reference format. For Type 1 PH, V=0 may indicates a real transmission on PUSCH and V=1 may indicate that a PUSCH reference format is used. For Type 2 PH, V=0 may indicate a real transmission on PUCCH and V=1 may indicate that a PUCCH reference format is used. For Type 3 PH, V=0 may indicate a real transmission on SRS and V=1 may indicate that an SRS reference format is used. For Type 1, Type 2, and Type 3 PH, V=0 may indicate a presence of an octet comprising an associated $P_{CMAX,f,c}$ field, and V=1 may indicate that the octet comprising the associated $P_{CMAX,f,c}$ field is omitted;
- a PH field (e.g., a PH field in FIG. 23 and FIG. 24) indicating a power headroom level. Example reported PH and example corresponding power headroom levels are shown in FIG. 22B;
- a power backoff indicator file (e.g., a P field in FIG. 23 and FIG. 24) indicating whether the MAC entity applies power backoff due to power management. The MAC entity may set P=1 if a corresponding $P_{CMAX,f,c}$ field have had a different value if no power backoff due to power management had been applied;
- a $P_{CMAX,f,c}$ field. If present, this field may indicate the $P_{CMAX,f,c}$ or $P_{CMAX,f,c}$ (described elsewhere in this specification) for a serving cell used for determining a preceding PH field. Example reported $P_{CMAX,f,c}$ and example corresponding nominal UE transmit power levels are shown in FIG. 22C.

In an example, a wireless device may report a PH per antenna group (e.g., panel) in a PHR. A wireless device may transmit a PH of an activated antenna group (e.g., panel). A wireless device may not transmit a PH of a deactivated antenna group (e.g., panel). For example, for a deactivated antenna group (e.g., panel), a wireless device may power off a hardware unit of an antenna group (e.g., panel), for example, if the antenna group (e.g., panel) is deactivated. A wireless device may deactivate one or more antenna groups (e.g., panels) of a plurality of antenna groups (e.g., panels), for example, for power saving. A wireless device may deactivate one or more antenna groups (e.g., panels) after or in response to receiving, from a base station, a message and/or a signal indicating to deactivate the one or more antenna groups (e.g., panels). A first wireless device may determine a deactivation of one or more first antenna groups (e.g., panels) and transmit, to a first base station, a message and/or a signal indicating the deactivation of the one or more first antenna groups. There may be one or more ways to deactivate the one or more antenna groups (e.g., panels). For example, the first wireless may transmit the message and/or the signal after or in response to the deactivation of the one or more first antenna group (e.g., panels). For example, the first wireless may deactivate the one or more first antenna group (e.g., panels) after or in response to transmitting the message and/or the signal. For example, the first wireless may deactivate the one or more first antenna group (e.g., panels) after or in response to receiving, from the first base station, a response indicating a deactivation of the one or more first antenna group (e.g., panels). For example, the response may indicate a deactivation of one or more second antenna group (e.g., panels) of the one or more first antenna group (e.g., panels). For example, the first wireless may deactivate the one or more second antenna group (e.g., panels) after or in response to receiving, from the first base station, the response indicating the one or more second antenna group (e.g., panels).

A wireless device may report a PH per antenna group (e.g., panel) in a PHR. For an activated serving cell, a wireless device may determine a PH value per antenna group (e.g., panel). For example, if there are two antenna groups (e.g., panel) activated, a wireless device may determine two PH values for an activated serving cell; one for a first activated antenna group (e.g., a first panel) and the other for a second activated antenna group (e.g., a second panel). There may be one or more ways to construct a PHR comprising a PH per antenna group (e.g., panel). For example, if there are a plurality of activated antenna groups (e.g., panels), a PHR for a first activated serving cell may comprise a plurality of PH values (e.g., each of the PH values corresponds to one of the plurality of activated antenna groups (e.g., panels)) in an ascending order or a descending order of IDs of the plurality of activated antenna groups (e.g., panels). For example, if there are an antenna group 1 (e.g., panel ID 1) and an antenna group 2 (e.g., panel ID 2) for a wireless device configured with one or more activated serving cell, for each of the one or more activated serving cells, the wireless device may determine two PH values for the antenna group 1 (e.g., panel ID 1) and the antenna group 2 (e.g., panel ID 2). For example, for a PHR of a first activated serving cell of the one or more activated serving cells, a first PH value (e.g., with corresponding P, V, and/or $P_{CMAX,f,c}$ fields) determined based on the antenna group 1 (e.g., panel ID 1) may be placed first and a second PH value (e.g., with corresponding P, V, and/or $P_{CMAX,f,c}$ fields) determined based on the antenna group 2 (e.g., panel ID 2). The order of the two PH values may be based on ascending or descending orders. For the second activated serving cell of the one or more activated serving cells, another two PH values for the antenna group 1 (e.g., panel ID 1) and the antenna group 2 (e.g., panel ID 2) may be placed in the PHR in a similar way.

For example, a PHR may comprise a field indicating an antenna group ID (e.g., panel ID). One or more R fields in FIG. 22A, FIG. 23, and FIG. 24 may be used to indicate an antenna group ID (e.g., panel ID). For example, there may be an antenna group 1 (e.g., panel ID 1) and an antenna group 2 (e.g., panel ID 2) for a wireless device configured with one or more activated serving cell. For a PHR of a first activated serving cell of the one or more activated serving cell, a first PH value (e.g., with corresponding P, V, and/or $P_{CMAX,f,c}$ fields) determined based on the antenna group 1 (e.g., panel ID 1) may be placed with a first field indicating a first ID of the antenna group 1 and a second PH value (e.g., with corresponding P, V, and/or $P_{CMAX,f,c}$ fields) determined based on the antenna group 2 (e.g., panel ID 2) may be placed with a second field indicating a second ID of the antenna group 2. For example, the first fields may be "00" and the second field may be "01." The order of the first PH value (e.g., with corresponding a P field, a V field, a $P_{CMAX,f,c}$ field, and/or a first field indicating the first ID) and the second PH value (e.g., with corresponding a P field, a V field, a $P_{CMAX,f,c}$ field, and/or a second field indicating the second ID) may be in ascending order and/or a descending order (e.g., similar ordering mechanism may be applied for a case of a plurality of antenna groups). For example, one or more PH fields corresponding to one or more antenna groups (e.g., panels) may be grouped together per an activated serving cell in a PHR. The one or more PH fields may not be ordered in the PHR, for example, if the one or more PH fields are placed with their antenna group IDs. The one or more PH fields may be ordered in the PHR, for example, if the one or more PH fields are placed without their antenna group IDs.

An existing technology (e.g., 4G and/or 5G) may support a beam management mechanism based on multiple antenna groups (e.g., panels). For example, a base station may use an information element to control one or more antenna groups (e.g., panels). For example, one or more SRS resource sets may be used to identify (and/or control) one or more antenna groups (e.g., panels), e.g., configure an SRS resource set per an antenna group (e.g., panel). The base station may schedule DL and/or UL transmission via one or more antenna groups, for example, based on the associated one or more SRS resource sets. For example, two UL transmissions may be scheduled via two different antenna groups (e.g., panels) simultaneously. For example, two UL transmissions may be scheduled in different time instants via two different antenna groups (e.g., panels). For example, a wireless device may switch between two antenna groups for the two UL transmissions, e.g., one UL transmission via one antenna group (e.g., panel) for a first time instant and the other UL transmission via the other antenna group (e.g., panel) for a second time instant.

In an existing technology (e.g., 4G and/or 5G), an MAC entity of a wireless device may trigger a PHR, for example, when a new cell (e.g., SCell and/or PSCell) is added to the wireless device and transmit the PHR using a UL grant to a base station. A PH value of a activated serving cell in the PHR may be determined based on a pathloss measurement of the activated serving cell. The base station may determine (and/or estimate) a channel condition of the activated serving cell based on the PH in the PHR. For example, the base station may use the PHR received from the wireless device to determine one or more parameters of DL and/or UL transmission accurately for the wireless device. For example, an MCS and/or transmitted power control command may be determined based on the PHR.

In a radio access technology, a wireless device may activate and/or deactivate one or more antenna groups (e.g., panels). A wireless device may switch an activate antenna group between a plurality of antenna groups (e.g., panels). For example, to save an energy consumption, a wireless device may keep one or more first antenna groups (e.g., panels), e.g., a minimum number of antenna groups, activated among a plurality of antenna groups (e.g., panels) during a period of time (e.g., during a power saving mode and/or during non-busy hour (e.g., at nighttime)). For example, the wireless device may activate one or more second antenna groups (e.g., panels), for example, to handle a large amount of data/traffic for DL and UL transmissions. For example, the one or more first antenna groups and the one or more second antenna groups may be disjoint (e.g., for a case of antenna group switching) and/or at least partially overlapped (e.g., for a case of activating one or more antenna groups in addition to one or more existing activated antenna groups). The base station may determine to activate the one or more second antenna groups (e.g., panels) and inform the wireless device of the one or more second antenna groups (e.g., panels) based on transmitting, to the wireless device, one or more first messages and/or first signals. The wireless device may determine to activate the one or more second antenna groups (e.g., panels) and inform the base station of the one or more second antenna groups (e.g., panels) based on transmitting, to the base station, one or more second messages and/or second signals. The base station may transmit, to a wireless device, a response corresponding to the one or more second messages and/or second signals. The response may be a confirmation of activating the one or more second antenna groups (e.g., panels). The response may indicate an activation of one or more third antenna groups among the one or more second antenna groups (e.g., panels).

In an example, a base station may schedule a DL and/or UL transmission via one or more newly activated antenna groups (e.g., panels). There is a need for the base station to determine channel condition(s) (e.g., channel state information) associated with the one or more newly activated antenna groups (e.g., panels). A PHR comprising one or more PH values associated with the one or more newly activated antenna groups (e.g., panels) may help the base station to determine one or more parameters for DL and/or UL transmission via the one or more newly activated antenna groups (e.g., panels).

An existing radio access technology (e.g., 4G, 5G, etc.) may not trigger a PHR after or in response to activated at least one antenna group (e.g., panel). For example, 4G (e.g., LTE) and/or 5G (e.g., a new radio (NR)) system support multiple antenna groups (e.g., panels) operation. However, the LTE and/or 5G (e.g., a new radio (NR)) system does not support that a wireless device triggers a PHR, for example, after or in response to a status change of activated antenna groups (e.g., panels), e.g., activating/deactivating/switching one or more antenna groups (e.g. panels). Once an antenna group (e.g., panel) is activated for a use at a wireless device, a base station may allocate a radio resource such that the wireless device transmits or receives a data packet using the antenna group (e.g., panel). In this case, the base station may need a channel state information associated with the antenna group (e.g., panel). For example, the channel state information may be defined per a pair of the antenna group and a cell. For example, if a wireless device is configured with a plurality of cells, a base station may need channel state information between an antenna group and each of the plurality of cells. However, an existing technology may not support a mechanism to provide antenna group (e.g., panel) level channel state information. This may result in inaccurate DL and/or UL transmission parameters for one or more newly activated antenna groups (e.g., panels). Inaccurate DL and/or UL transmission parameters may result in, for example, insufficient transmit power, decreasing throughput/capacity, and/or call drops. Thus, there is a need to improve an existing mechanism such that accurate information (e.g., channel state information, DL and/or UL transmission parameters) associated with one or more newly activated antenna groups (e.g., panels) provided to a wireless device and/or a base station accurately in time.

Example embodiments in this specification may improve a determination of inaccurate DL and/or UL transmission parameters. For example, an MAC entity of a wireless device may trigger at least one PHR, for example, after or in response to activating one or more antenna groups (e.g., panels). The wireless device may transmit the at least on PHR via a UL resource to the base station. The base station may use the at least one PHR to determine DL and/or UL transmission parameters associated with the one or more antenna groups (e.g., panels). The example embodiments may improve a throughput/capacity and/or reduce a power consumption, for example, by reducing a number of retransmissions and/or signaling overhead resulted from an accurate estimate of the DL and/or UL transmission parameters.

Figure 25:
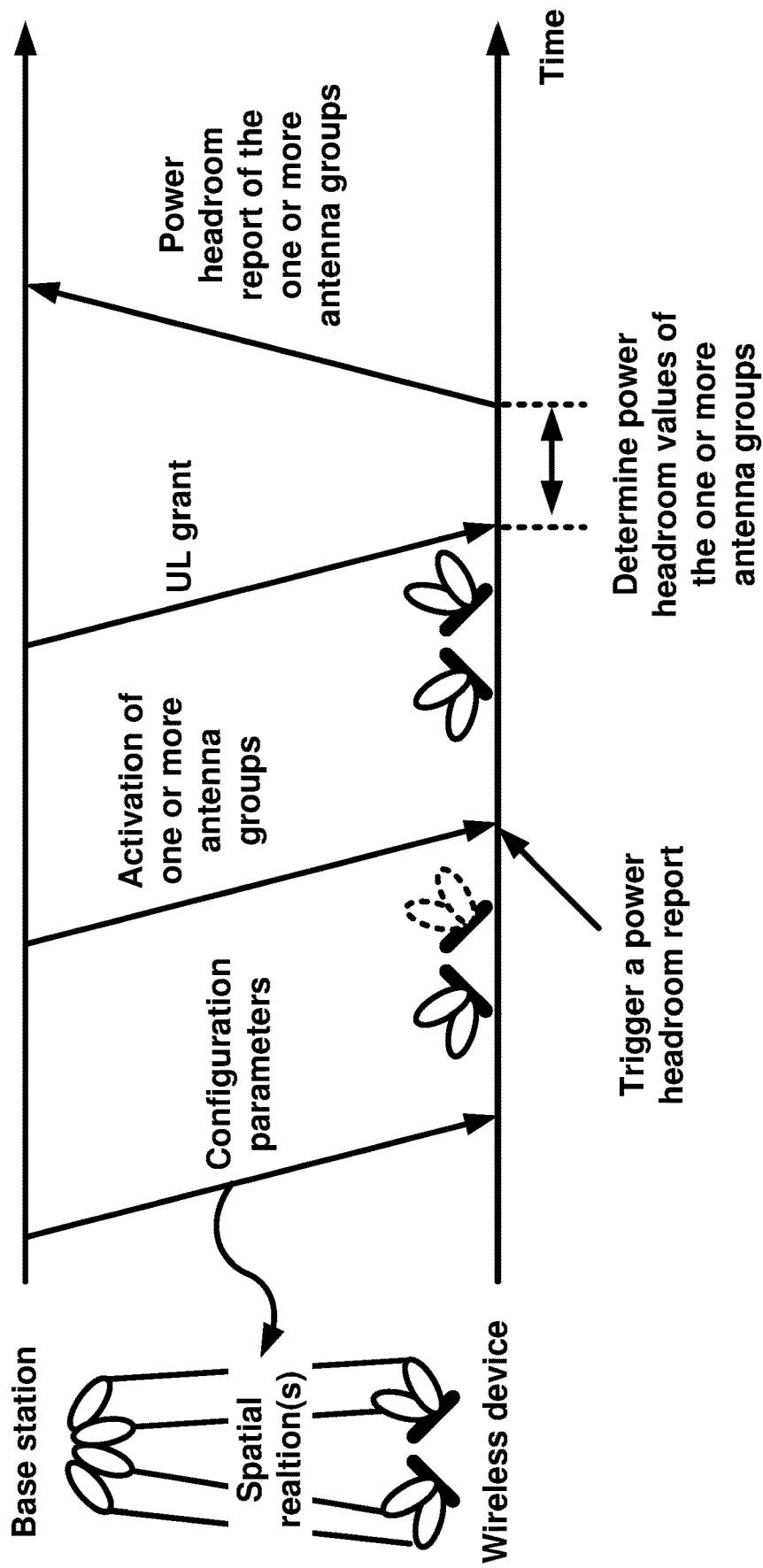
FIG. 25 shows an example of a PHR procedure as per an aspect of an embodiment of the present disclosure.

FIG. 25 shows an example of a PHR procedure. A wireless device may be equipped with a plurality of antenna groups (e.g., panels). One or more antenna groups (e.g., panels) of the plurality of antenna groups (e.g., panels) may be activated and/or deactivated. There may be one or more ways, for example depending on implementation, to activate and/or to deactivate the one or more antenna groups (e.g., panels). FIG. 25 shows that a base station indicates which antenna group(s) (e.g., panel(s)) a wireless device activate and/or deactivate. For example, a base station may transmit, to a wireless device, a message and/or a signal (RRC signaling, MAC CE, and/or DCI) that indicates an activation of one or more antenna groups (e.g., panels). The wireless device may trigger and transmit a PHR comprising one or more PH values for the one or more antenna groups (e.g., panels). Depending on implementation, a wireless device may trigger the PHR differently. For example, the wireless device may trigger the PHR after or in response to receiving the message and/or the signal. For example, the wireless device may activate the one or more antenna groups (e.g., panels) after or in response to receiving, from the base station, an indication of an activation of the one or more antenna groups (e.g., panels). The wireless device may trigger the PHR after or in response to activating the one or more antenna groups (e.g., panels). The wireless device may transmit the triggered PHR (e.g., a PHR MAC CE) via UL resource(s) indicated by a UL grant (e.g., dynamic UL grant and/or configured grant Type 1 and/or Type 2). The wireless device may determine whether a PHR for an activated antenna group (e.g., panel) of an activated serving cell is based on an actual transmission or a reference format based on a downlink control information the wireless device received until and including (e.g., before and/or prior to) a PDCCH monitoring occasion where the wireless device detects a DCI (e.g., a DCI (for example, DCI format 0_0 and/or format DCI 0_1) scheduling a an initial transmission of a transport block since a PHR was triggered).

A PHR triggered and/or transmitted after and/or in response to activating at least one antenna group (e.g., panel) may reduce signaling overhead and/or unnecessary information sharing. A PHR triggered and/or transmitted after and/or in response to activating at least one antenna group (e.g., panel) may be different from a PHR triggered and/or transmitted after and/or in response to a new cell (e.g., SCell and/or PScell) addition and/or activation.

For example, a wireless device may receive configuration message(s), e.g., PSCell configuration parameters, and/or an activation message (or signal), e.g., a secondary cell activation/deactivation MAC CE. The wireless device may add and/or activate a cell (SCell and/or PSCell) based on the received configuration message(s) and/or the activation message. When the wireless device adds and/or activates a new cell, all antenna groups (e.g., panels) may not be activated. In an existing technology, the wireless device may trigger and/or transmit a PHR based on (in response to) adding and/or activating the new cell. For example, if one or more antenna groups among a plurality of antenna groups are activated when the new cell is added or activated, a PHR may comprise one or more PH values of the one or more antenna groups. The PHR may not comprise deactivated antenna group(s) of the plurality of antenna groups. This is because no PH values measured (or determined) on deactivated antenna group(s) is available. In an existing technology, a PHR may be triggered after or in response to activating or adding a cell. However, in an existing technology, a PHR may not be triggered after or in response to activating one or more second antenna groups of an (e.g., already) activated cell. For example, in the existing technology, a PHR comprising one or more PH values of one or more newly activated antenna groups may be triggered, for example, when one or more PHR timers (e.g., a PHR periodic timer and/or a PHR prohibit timer) expire and/or there is a pathloss change larger than or equal to a threshold (e.g., PHR pathloss change threshold), which may cause delay for the base station to obtain channel station information of the one or more newly activated antenna groups. Thus, there may be a need of a PHR triggering mechanism based on a activation/deactivation status change of at least one antenna group (e.g., panel). For example, there is a need to trigger a PHR after or in response to activating and/or deactivating one or more antenna groups for a cell that is already activated. In an example, switching an antenna group from one group to another group may comprise an activation of a new antenna group and/or a deactivation of a current antenna group).

A wireless device may determine at least one pathloss reference signal (e.g., SSB and/or CSI-RS) to determine (or calculate) a PH value of an activated antenna group (e.g., panel). For example, the PH value is determined based on a pathloss measured via the activated antenna group (e.g., panel). The wireless device may use the at least one pathloss reference signal (e.g. SSB and/or CSI-RS) to determine the pathloss for the PH value.

A base station may configure a wireless device with a spatial relation of each antenna group (e.g., panel). For example, the spatial relation may be a mapping between a particular DL reference signal (e.g., SSB and/or CSI-RS) and a particular spatial filer (e.g., a beam of an antenna group (e.g., panel) and/or an SRS resource of an SRS resource set).

A wireless device may use one of one or more DL reference signals (e.g., SSBs and/or CSI-RSs) associated with an antenna group (e.g., panel) as the at least one pathloss reference signal. For example, a pathloss measurement based on the at least one pathloss reference signal may be used to determine a PH value of an activated antenna group (e.g., panel). For example, an SRS resource set may be configured for an activated antenna group (e.g., panel). The SRS resource set may comprise one or more SRS resources. Each of the one or more SRS resources may comprise a particular spatial relation that maps between a particular DL reference signal and a particular spatial filter. For example, the at least one pathloss reference signal may be indicated by a DCI. For example, the DCI may implicitly indicate the at least one pathloss reference signal in a way to explicitly indicate a spatial filter (and/or an SRS resource) associated with the at least one pathloss reference signal. There may be a first pathloss reference signal of an antenna group (e.g., panel). For example, the wireless device may use the first pathloss reference signal to determine a PH value (e.g., virtual PH value) based on a reference format. An ID of the first pathloss reference signal may be predefined (e.g., pathloss reference signal ID=0 or e.g., the lowest ID or the highest ID among the configured one or more pathloss reference signals), for example, within a corresponding antenna group (e.g., panel).

Figure 26:
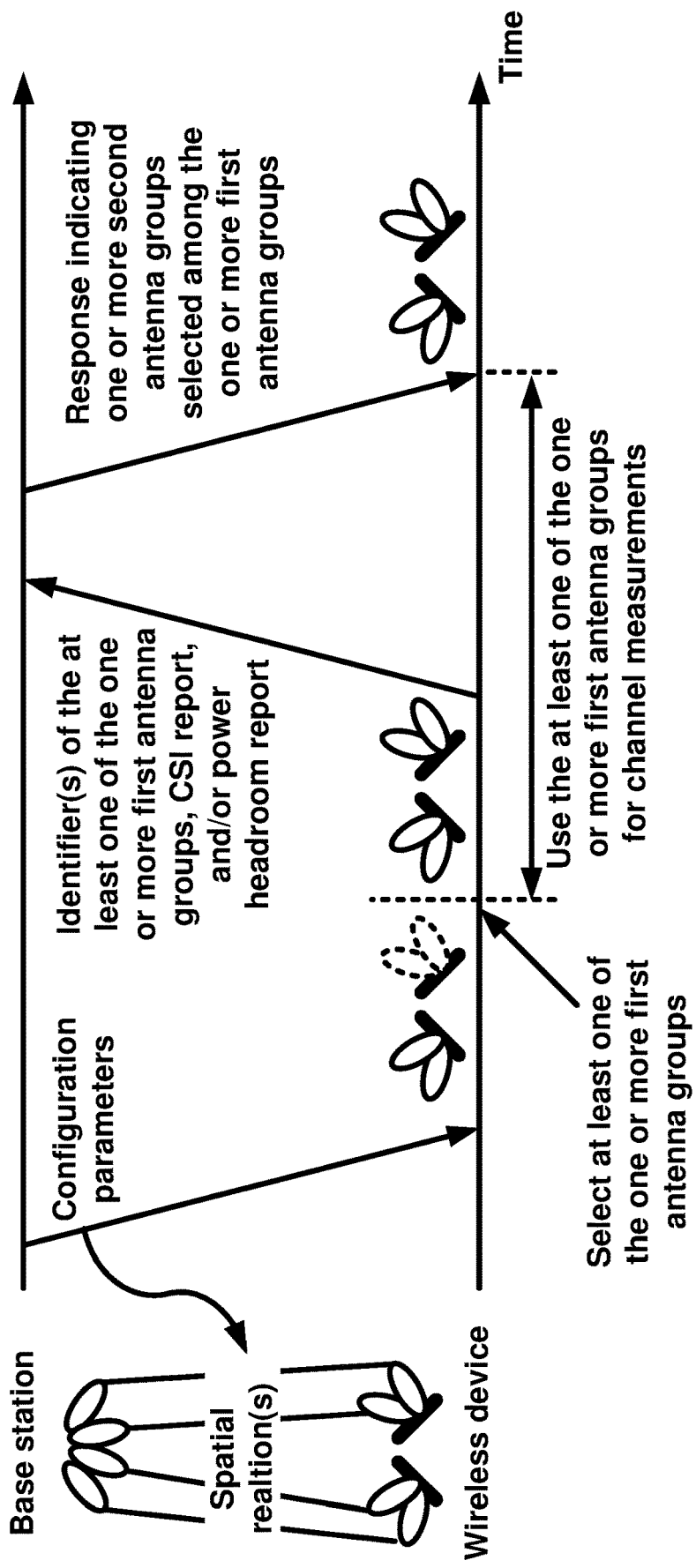
FIG. 26 shows an example of a PHR procedure as per an aspect of an embodiment of the present disclosure.

FIG. 26 shows an example of a PHR procedure. The activation of one or more antenna groups in FIG. 25 may comprise a first step and a second step. For the first step, a wireless device may determine an activation of at least first antenna group among a plurality of antenna groups (e.g., panels) and report (e.g., transmit a control message and/or signal), to a base station, the determination. The wireless device may receive, from the base station, a corresponding response indicating an activation of at least second antenna group among the plurality of antenna groups (e.g., panels). For example, the at least first antenna group and at least second antenna group may be the same (e.g., for a case that the corresponding response confirm the activation). For example, the at least first antenna group and at least second antenna group may be different and/or share one or more antenna groups (e.g., for a case that the corresponding response modifies the one or more first antenna groups).

In FIG. 26, the response transmitted from a base station may indicate which antenna group(s) a wireless device to use for a subsequent DL and/or UL transmission. For example, a wireless device triggers an activation of at least one antenna group. The wireless device may trigger the activation, for example, when to transit from a power saving mode to a normal operation mode. The wireless device may determine better which antenna group(s) need to be activated, for example, based on DL reference signal measurements. If the wireless device activates at least one antenna group after or in response to receiving the response, the wireless device may start DL reference signal measurements after or in response to receiving the response. This may result in delaying for a wireless device to report, to a base station, channel state information associated with the at least one antenna group. Until the base station receives channel state information, parameters, for DL and/or UL transmission via the at least one antenna group, determined by the base station may be in accurate. There may be a need to reduce the delay to report the channel state information associated with the at least one antenna group and/or improve the accuracy of parameters for DL and/or UL transmission via the at least one antenna group.

Example embodiments may allow a wireless device to use at least one antenna group for DL and UL channel measurements until the wireless device receives, from a base station, a response indicating an activation (or allowing to use) of the at least one antenna group. For example, the wireless device determines to activate at least one antenna group. The wireless device may inform, to the base station, of the activation of the at least one antenna group (e.g., by transiting a message and/or a signal indicating an activation of the at least one antenna group). The wireless device may start DL measurements using the at least one antenna group. The wireless device may transmit, to the base station, a channel station information, via PUSCH and/or PUCCH, comprising the DL measurements perform using the at least one antenna group, and/or a PHR comprising at least one PH value determined for the at least one antenna group. The base station may do a better decision on which antenna group the wireless device activates and/or may schedule DL and/or UL transmission via the at least one antenna group accurately.

In an example, a wireless device may receive, from a base station, configuration parameters indicating one or more pathloss reference signals of a first antenna group of a plurality of antenna groups for a cell. The wireless device may activate the cell based on receiving a MAC CE indicating an activation of the cell. The wireless device may activate the first antenna group based on receiving a control signal indicating an activation of the first antenna group. The wireless device may transmit the power headroom report comprising one or more fields indicating the one or more power headroom values for the first antenna group. The wireless device may determine one or more power headroom values of the first antenna group for the cell. Each of the one or more power headroom values may be associated with one of the first antenna groups. Each of the one or more power headroom values may be calculated based on a pathloss measured based on a pathloss reference signal associated with the first antenna group. For example, the configuration parameters may comprise at least one SRS resource set associated with the first antenna group. For example, the one or more pathloss reference signals may be associated with the at least one SRS resource set. For example, the at least one SRS resource set may comprise one or more SRS resources. For example, each of the one or more SRS resources may be associated with at least one spatial filter. For example, the at least one spatial filter may be associated with one of the one or more pathloss reference signals. For example, the wireless device may receive a downlink control information indicating an UL grant and/or the at least one spatial filter. For example, the wireless device may receive a downlink control information indicating a downlink assignment. For example, the power headroom report (PHR) medium access control (MAC) control element (CE) may comprise: a field indicating a presence of the cell; and/or one or more fields indicating the one or more power headroom values. For example, the PHR MAC CE may further comprise an identifier of the first antenna group. For example, the wireless device may determine one or more first antenna groups among the plurality of antenna groups. The wireless device may, in response to the determining, transmit at least one of following: an indication identifying the one or more first antenna groups; channel stat information report comprising downlink channel measurements measured based on one or more reference signals associated with the one or more first antenna groups; and/or a PHR MAC CE comprising: a field indicating a presence of the cell; and/or one or more fields indicating the one or more power headroom values calculated based on the one or more reference signals associated with the one or more first antenna groups. For example, the wireless device may receive the control signal indicating the activation of the first antenna group in response to the transmitting the at least one of following. For example, the one or more first antenna groups may comprise the first antenna group. For example, the wireless device may trigger the power headroom report in response to determining one or more first antenna groups. For example, the wireless device may trigger the power headroom report in response to activating the first antenna group. For example, the cell may be a secondary cell and/or a primary secondary cell (PSCell).

In an example, a wireless device may receive, from a base station, configuration parameters indicating one or more pathloss reference signals of a first antenna group of a plurality of antenna groups for a cell. The wireless device may receive a first MAC CE indicating an activation of one or more antenna groups of the plurality of antenna groups for the cell. The wireless device may trigger a power headroom report in response to receiving a first MAC CE. For example, the wireless device may transmit the power headroom report comprising one or more fields indicating the one or more power headroom values for the one or more antenna groups.

In an example, a wireless device may receive, from a base station, configuration parameters indicating: one or more pathloss reference signals of a plurality of antenna groups for a cell; and/or one or more association between the plurality of pathloss reference signals and the plurality of antenna groups for the cell. The wireless device may receive a control message indicating an activation of one or more antenna groups among the plurality of antenna groups. For example, in response to receiving the control message, the wireless device may activate the one or more antenna groups. The wireless device may trigger a power headroom report in response to receiving the control message. The wireless device may determine one or more power headroom values of the one or more antenna groups for the cell. For example, each of the one or more power headroom values may be associated with one of the one or more antenna groups. For example, each of the one or more power headroom values may be calculated based on a pathloss measured based on a pathloss reference signal associated with the one of the one or more antenna groups. The wireless device may transmit a PHR MAC CE comprising: a field indicating a presence of the one cell; and/or one or more fields indicating the one or more power headroom values.

In an example, a wireless device may receive, from a base station, configuration parameters indicating: a plurality of reference signals of a cell; and/or one or more association between the plurality of reference signals and a plurality of antenna groups for the cell. The wireless device may select one or more first antenna groups among the plurality of antenna groups. The wireless device may, in response to the determining, transmit at least one of following: an indication identifying the one or more first antenna groups; channel stat information report comprising downlink channel measurements measured based on one or more reference signals associated with the one or more first antenna groups; and/or a PHR MAC CE. For example, the PHR MAC CE may comprise a field indicating a presence of the cell and/or one or more fields indicating the one or more power headroom values calculated based on the one or more reference signals associated with the one or more first antenna groups. The wireless device may receive a downlink control information comprising an uplink grant scheduling an uplink transmission via one of the one or more first antenna groups.

Figure 27:
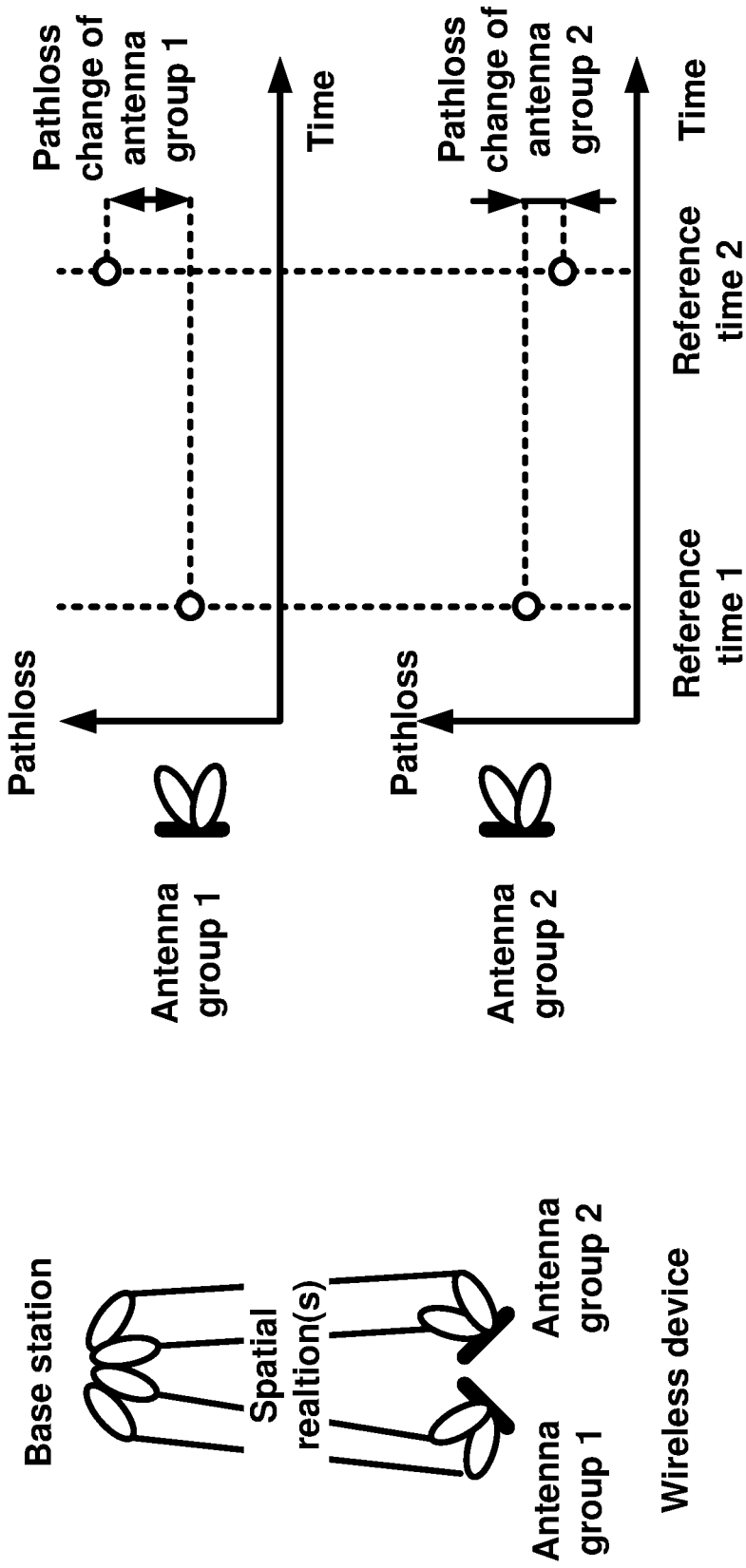
FIG. 27 shows an example of pathloss change determination as per an aspect of an embodiment of the present disclosure.

FIG. 27 shows an example of pathloss change determination. For example, a wireless device may determine a pathloss change per an antenna group (e.g., panel). The wireless device may trigger a PHR based on the pathloss change. The wireless device may trigger a PHR after or in response to an event in the following: a PHR prohibit timer (e.g., phr-ProhibitTimer) expires or has expired and the pathloss has changed more than a PHR pathloss change threshold (e.g., phr-Tx-PowerFactorChange dB). The PHR may be trigger, for example, when a PHR prohibit timer (e.g., phr-ProhibitTimer) expires or has expired and the pathloss has changed more than a PHR pathloss change threshold (e.g., phr-Tx-PowerFactorChange dB) for at least one activated serving cell and/or at least one activated antenna group (e.g. panel) of at least one activated serving cell of any MAC entity which is used as a pathloss reference since the last transmission of a PHR in this MAC entity when the MAC entity has UL resources for new transmission.

An existing radio access technology (e.g., 4G, 5G, etc.) may measure a pathloss change of a first pathloss and a second pathloss for a cell regardless of which antenna group(s) (e.g., panel(s)) are used as reference point(s) to measure the first pathloss and/or the second pathloss. For example, a wireless device may have a first antenna group (e.g., panel) and a second antenna group (e.g., panel) as shown in FIG. 27. In an existing technology, for example, in an existing technology, a pathloss change for one cell may be between a first pathloss measured at a first (e.g., present) time on a first (e.g., current) pathloss reference and a second pathloss measured at a second time (e.g., the transmission time of the last transmission of PHR) on a second pathloss reference in use at that time, irrespective of whether the pathloss reference has changed in between. Determining a pathloss change across multiple antenna groups may by inefficient. For example, each antenna group (e.g., panel) may experience different channel condition (e.g., fading and/or shadowing effect). For example, a PHR may be triggered based on a large pathloss change to adjust MCS and/or to change uplink power control parameter in response to the large pathloss change. For example, if there is the large pathloss change, the base station may determine that a change of channel environment (e.g., channel blocking) and adjust DL and/or UL transmission parameter. Different antenna groups may experience fading and/or showing effect. The base station may not determine an accurate DL and/or UL transmission parameter based on the pathloss change determined between two pathloss measure at different antenna groups. The pathloss change determined between two pathloss measure at different antenna may trigger a PHR unnecessarily too often. There is a need to improve a determination of reference points (e.g., antenna groups) based on which a pathloss change is determined.

In an example, an MAC entity of a wireless device may trigger a PHR after or in response to an event in the following: a PHR prohibit timer (e.g., phr-ProhibitTimer) expires or has expired and at least one of the plurality of pathloss changes is larger than a PHR pathloss change threshold (e.g., phr-Tx-PowerFactorChange dB). The PHR may be trigger, for example, when a PHR prohibit timer (e.g., phr-ProhibitTimer) expires or has expired and at least one of the plurality of pathloss changes is larger than a PHR pathloss change threshold (e.g., phr-Tx-PowerFactorChange dB) for at least one activated antenna group of at least one activated serving cell of any MAC entity which is used as a pathloss reference since the last transmission of a PHR in this MAC entity when the MAC entity has UL resources for new transmission. For example, in FIG. 27, a reference time 1 may be when a last transmission of a PHR in this MAC entity. In FIG. 27, a reference time 2 may be when the MAC entity has UL resources for new transmission. A radio access technology may define the reference time 1 and the reference time 2 in different ways.

A base station may configure a wireless device with a PHR pathloss change threshold per antenna group. In an example, an MAC entity of a wireless device may trigger a PHR after or in response to an event in the following: a PHR prohibit timer (e.g., phr-ProhibitTimer) expires or has expired and at least one pathloss changes measured within at least one antenna group is larger than a PHR pathloss change threshold (e.g., phr-Tx-PowerFactorChange dB) corresponding to (or associated with) the at least one antenna group. The PHR may be trigger, for example, when a PHR prohibit timer (e.g., phr-ProhibitTimer) expires or has expired and at least one pathloss changes measured within at least one antenna group is larger than a PHR pathloss change threshold (e.g., phr-Tx-PowerFactorChange dB associated with the at least one activated antenna group) for the at least one activated antenna group of at least one activated serving cell of any MAC entity which is used as a pathloss reference since the last transmission of a PHR in this MAC entity when the MAC entity has UL resources for new transmission. For example, in FIG. 27, a reference time 1 may be when a last transmission of a PHR in this MAC entity. In FIG. 27, a reference time 2 may be when the MAC entity has UL resources for new transmission. A radio access technology may define the reference time 1 and the reference time 2 in different ways.

Figure 28:
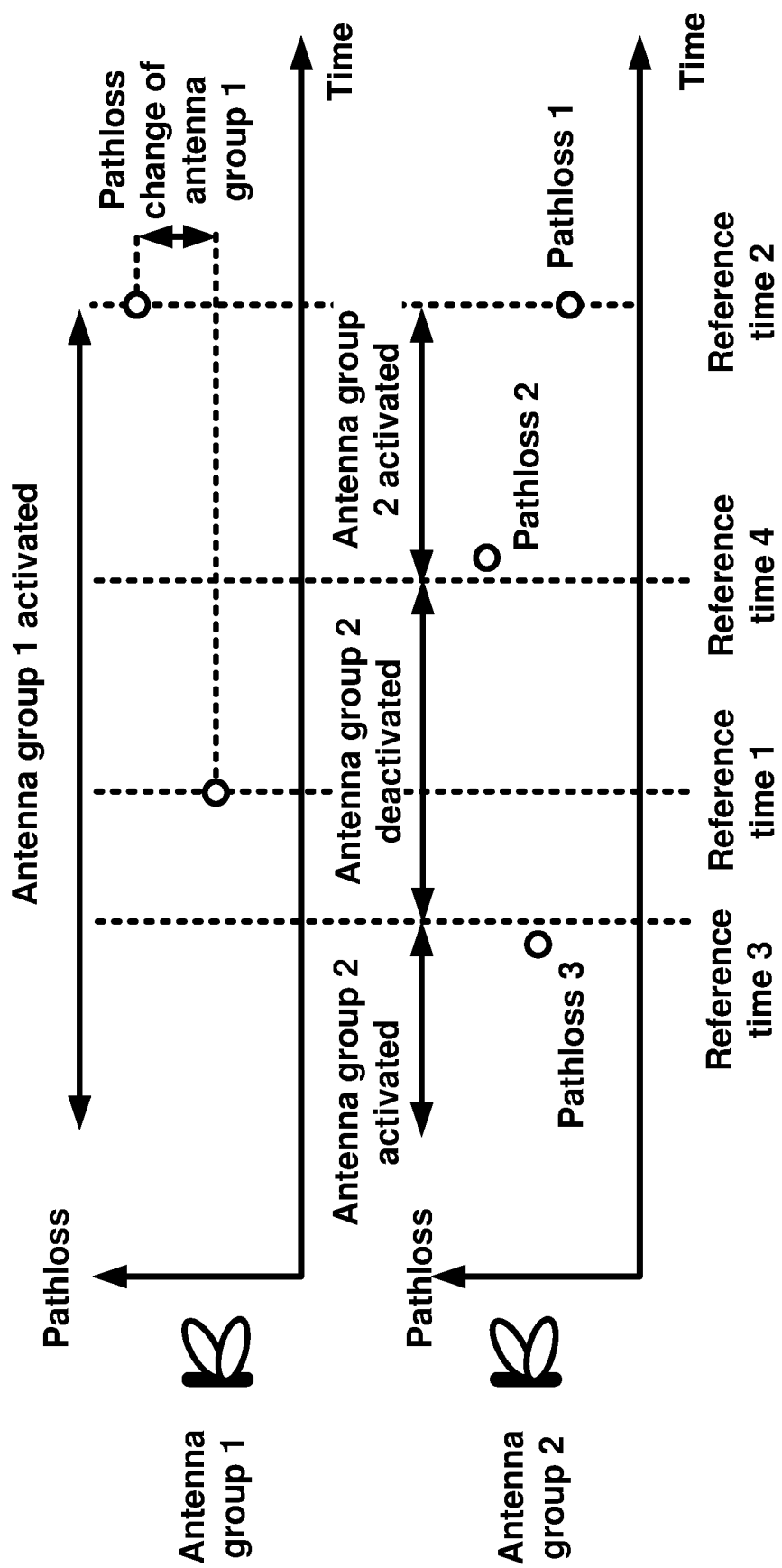
FIG. 28 shows an example of determining one or more pathlosses as per an aspect of an embodiment of the present disclosure.

FIG. 28 shows an example of determining one or more referent times to measure a first pathloss and a second pathloss. A pathloss change may be determine the first pathloss and the second pathloss per antenna group (e.g. panel). There may be a case that, for an activated cell, a wireless device activates and deactivate at least one antenna group. For example, in FIG. 28, while the antenna group 1 is activated, the antenna group 2 is deactivated between reference time 3 and reference time 4. An MAC entity may trigger a PHR between reference time 1 and reference time 2. The MAC entity may determine a pathloss change between two pathloss measured reference time 1 and reference time 2 for the antenna group 1, for example, a last PHR transmission occurs at a time (symbol, slot, mini-slot, and/or subframe) associated with reference time 1 (e.g., with an time offset from reference time 1). The wireless device may not have a measurement performed via the antenna group 2 between reference time 3 and reference time 4. The MAC entity may determine a pathloss change for the antenna group 2 based on pathloss 1 and pathloss 2 in FIG. 28. For example, the pathloss 2 is the latest pathloss measured at the antenna group 2 since the antenna group 2 is (re-)activated. The MAC entity may determine a pathloss change for the antenna group 2 based on pathloss 1 and pathloss 3 in FIG. 28. For example, the pathloss 3 is the latest pathloss measured at the antenna group 2 before the antenna group 2 is deactivated (e.g., before the reference time 3). For example, the pathloss 3 is the latest pathloss calculated via the antenna group 2 for a PHR transmitted before the antenna group 2 is deactivated (e.g., before the reference time 3).

In an example, a wireless device may receive, from a base station, a message indicating a pathloss change threshold. The wireless device may, based on a MAC entity of the wireless device having uplink resources for a new transmission at a first time and a power headroom timer is expired, may determine a plurality of pathloss value changes, wherein each of the plurality of pathloss value changes is for a respective one of the plurality of antenna groups. The wireless device may, based on a MAC entity of the wireless device having uplink resources for a new transmission at a first time and a power headroom timer is expired, may trigger a power headroom report in response to one of the plurality of pathloss value changes, determined for one of the plurality of antenna groups, being more than the pathloss change threshold. For example, the one of the plurality of pathloss value changes is determined based on a difference between a first pathloss value measured, at the first time, on a first pathloss reference of the one of the plurality of antenna groups and a second pathloss value measured on second pathloss reference of the one of the plurality of antenna groups, at a second time of the last transmission of power headroom report. The wireless device may transmit, to the base station, the power headroom report.

In an example, one or more types of power headroom reports that may be used for example embodiment in this specification may be the following. A Type 1 power headroom PH that may be valid for a PUSCH transmission occasion i on active UL BWP b of carrier f of serving cell c. A Type 3 power headroom PH that may be valid for an SRS transmission occasion i on active UL BWP b of carrier f of serving cell c.

A wireless device may determine whether a power headroom report for an activated serving cell may be based on an actual transmission or a reference format based on the downlink control information the wireless device received until and including the PDCCH monitoring occasion where the wireless device detects a first DCI (e.g., DCI format 0_0 or DCI format 0_1) scheduling an initial transmission of a transport block since a power headroom report was triggered.

For example, if a wireless device is configured with two UL carriers for a serving cell and determines a Type 1 power headroom report and a Type 3 power headroom report for the serving cell, the wireless device may provide the Type 1 power headroom report if both the Type 1 and Type 3 power headroom reports are based on respective actual transmissions or on respective reference transmissions; and/or provide the power headroom report that is based on a respective actual transmission if either the Type 1 report or the Type 3 report is based on a respective reference transmission.

For example, if a wireless device is configured with a SCG and if phr-ModeOtherCG for a CG indicates 'virtual' then, for power headroom reports transmitted on the CG, the wireless device may compute PH based on the fact that the wireless device does not transmit PUSCH/PUCCH on any serving cell of the other CG. If the wireless device is configured with a SCG, for computing power headroom for cells belonging to MCG, the term 'serving cell' in this specification may refer to serving cell belonging to the MCG. If the wireless device is configured with a SCG, for computing power headroom for cells belonging to SCG, the term 'serving cell' in this specification may refer to serving cell belonging to the SCG. The term 'primary cell' in this specification refers to the PSCell of the SCG.

For example, if the wireless device is configured with a PUCCH-SCell, for computing power headroom for cells belonging to primary PUCCH group, the term 'serving cell' in this specification may refer to serving cell belonging to the primary PUCCH group. If the wireless device is configured with a PUCCH-SCell, for computing power headroom for cells belonging to secondary PUCCH group, the term 'serving cell' in this specification may refer to serving cell belonging to the secondary PUCCH group. The term 'primary cell' in this specification refers to the PUCCH-SCell of the secondary PUCCH group.

In the following, examples of determining Type 1 power headroom report and Type 3 power headroom report, PUSCH transmission power, PUCCH transmission power, and/or SRS transmission power. The examples in this specification may be based on a power control per bandwidth part (e.g., index b in the specification) with one or more closed loop power control (e.g., index l in the specification) and/or one or more pathloss reference signals configured (e.g., index $q_d$). Depending on a radio access technology and/or implementation, there may be a single bandwidth part, a single closed loop power control and/or a single pathloss reference signal configured. In such a case, the following examples may be extended by dropping (omitting) a respective index.

For example, if a wireless device determines that a Type 1 power headroom report for an activated serving cell is based on an actual PUSCH transmission then, for PUSCH transmission occasion i on active UL BWP b of carrier f of serving cell c, the wireless device may determine the Type 1 power headroom report as $$PH_{type1,b,f,c}(i,j,q_d,l) = P_{CMAX,f,c}(i) - \{P_{O\_PUSCH,b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\} [dB]$$

where $P_{CMAX,f,c}(i)$, $P_{O\_PUSCH,b,f,c}(j)$, $M_{RB,b,f,c}^{PUSCH}(i)$, $\alpha_{b,f,c}(j)$, $PL_{b,f,c}(q_d)$, $\Delta_{TF,b,f,c}(i)$ and $f_{b,f,c}(i,l)$ are described elsewhere in this specification.

For example, i a wireless device is configured with multiple cells for PUSCH transmissions, where a SCS configuration $\mu_1$ on active UL BWP $b_1$ of carrier $f_1$ of serving cell $c_1$ is smaller than a SCS configuration $\mu_2$ on active UL BWP $b_2$ of carrier $f_2$ of serving cell $c_2$, and if the wireless device provides a Type 1 power headroom report in a PUSCH transmission in a slot on active UL BWP $b_1$ that overlaps with multiple slots on active UL BWP $b_2$, the UE may provide a Type 1 power headroom report for the first PUSCH, if any, on the first slot of the multiple slots on active UL BWP $b_2$ that fully overlaps with the slot on active UL BWP $b_1$.

For example, if a wireless device is configured with multiple cells for PUSCH transmissions, the wireless device may not consider for computation of a Type 1 power headroom report in a first PUSCH transmission that includes an initial transmission of transport block on active UL BWP $b_1$ of carrier $f_1$ of serving cell $c_1$, a second PUSCH transmission on active UL BWP $b_2$ of carrier $f_2$ of serving cell $c_2$ that overlaps with the first PUSCH transmission if the second PUSCH transmission is scheduled by a DCI format 0_0 or a DCI format 0_1 in a PDCCH received in a second PDCCH monitoring occasion, and/or the second PDCCH monitoring occasion is after a first PDCCH monitoring occasion where the UE detects the earliest DCI format 0_0 or DCI format 0_1 scheduling an initial transmission of a transport block after a power headroom report was triggered.

For example, i the wireless device determines that a Type 1 power headroom report for an activated serving cell is based on a reference PUSCH transmission then, for PUSCH transmission occasion on active UL BWP b of carrier f of serving cell c, the wireless device computes the Type 1 power headroom report as $$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + \Delta_{TF,b,f,c}(i) + f_{b,f,c}(i,l)\} [dB]$$

where $\tilde{P}_{CMAX,f,c}(i)$ is computed assuming MPR=0 dB, A-MPR=0 dB, P-MPR=0 dB. $\Delta TC$=0 dB. MPR, A-MPR, P-MPR and $\Delta TC$ may be predefined. The remaining parameters are described elsewhere in this specification, where $P_{O\_PUSCH,b,f,c}(j)$ and $\alpha_{b,f,c}(j)$ may be obtained using $P_{O\_NOMINAL\_PUSCH,f,c}(0)$ and p0-PUSCH-AlphaSetId=0, $PL_{b,f,c}(q_d)$ may be obtained using PathlossReferenceRS-Id=0, and l=0.

For example, i a wireless device is configured with two UL carriers for a serving cell and the UE determines a Type 1 power headroom report for the serving cell based on a reference PUSCH transmission, the wireless device may compute a Type 1 power headroom report for the serving cell assuming a reference PUSCH transmission on the UL carrier provided by pusch-Config. If the wireless device is provided pusch-Config for both UL carriers, the wireless device may compute a Type 1 power headroom report for the serving cell assuming a reference PUSCH transmission on the UL carrier provided by pucch-Config. If pucch-Config is not provided to the wireless device for any of the two UL carriers, the wireless device may compute a Type 1 power headroom report for the serving cell assuming a reference PUSCH transmission on the non-supplementary UL carrier.

For example, if a wireless device determines that a Type 3 power headroom report for an activated serving cell is based on an actual SRS transmission then, for SRS transmission occasion i on active UL BWP b of carrier f of serving cell c and if the wireless device is not configured for PUSCH transmissions on carrier f of serving cell c, the wireless device may compute a Type 3 power headroom report as $$PH_{type3,b,f,c}(i,q_s) = P_{CMAX,f,c}(i) - \{P_{O\_SRS,b,f,c}(q_s) + 10 \log_{10}(2^\mu \cdot M_{SRS,b,f,c}(i)) + \alpha_{SRS,b,f,c}(q_s) \cdot PL_{b,f,c}(q_d) + h_{b,f,c}(i)\} \text{ [dB]}$$

where $P_{CMAX,f,c}(i)$, $P_{SRS,\ b,f,c}(q_s)$, $M_{SRS,b,f,c}(i)$, $\alpha_{SRS,b,f,c}(q_s)$, $PL_{b,f,c}(q_d)$ and $h_{b,f,c}(i)$ are described elsewhere in this specification.

For example, if the wireless device determines that a Type 3 power headroom report for an activated serving cell is based on a reference SRS transmission then, for SRS transmission occasion i on UL BWP b of carrier f of serving cell c, and if the wireless device is not configured for PUSCH transmissions on UL BWP b of carrier f of serving cell c, the wireless device may compute a Type 3 power headroom report as $$PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i,l)\} \text{ [dB]}$$

where $q_s$ may be an SRS resource set corresponding to SRS-ResourceSetId=0 for UL BWP b and $P_{O\_SRS,\ b,f,c}(q_s)$, $\alpha_{SRS,f,c}(q_s)$, $PL_{b,f,c}(q_d)$ and $h_{b,f,c}(i)$ are described elsewhere in this specification with corresponding values obtained from SRS-ResourceSetId=0 for UL BWP b. $\tilde{P}_{CMAX,f,c}(i)$ may be computed assuming MPR=0 dB, A-MPR=0 dB, P-MPR=0 dB and ΔTC=0 dB. MPR, A-MPR, P-MPR and ΔTC may be predefined.

For example, i a wireless device is configured with two UL carriers for a serving cell and the wireless device determines a Type 3 power headroom report for the serving cell based on a reference SRS transmission, the wireless device may compute a Type 3 power headroom report for the serving cell assuming a reference SRS transmission on the UL carrier provided by pucch-Config. If pucch-Config is not provided to the wireless device for any of the two UL carriers, the wireless device may compute a Type 3 power headroom report for the serving cell assuming a reference SRS transmission on the non-supplementary UL carrier.

In an example, a PUSCH/PUCCH/SRS/PRACH transmission occasion i may be defined by a slot index $n_{s,f}^\mu$ within a frame with system frame number SFN, a first symbol S within the slot, and a number of consecutive symbols L.

For a PUSCH transmission on active UL BWP b of carrier f of serving cell c, a wireless device may calculate a linear value $\hat{P}_{PUSCH,b,f,c}(i,j,q_d,l)$ of the transmit power $P_{PUSCH,b,f,c}(i,j,q_d,l)$, with parameters described elsewhere in this specification. If the PUSCH transmission is scheduled by a DCI format 0_1 and when txConfig in PUSCH-Config is set to 'codebook', the wireless device may scale the linear value by the ratio of the number of antenna ports with a non-zero PUSCH transmission power to the maximum number of SRS ports supported by the wireless device in one SRS resource. For example, the wireless device split the power equally across the antenna ports on which the wireless device transmits the PUSCH with non-zero power. For example, two PUSCH transmissions are scheduled in different SRS resource sets (e.g., different antenna groups and/or panels), the wireless device may determine a PUSCH power per each SRS resource set (e.g., antenna group and/or panel) and scale a sum of one or more determined PUSCH powers for the different SRS resource sets (e.g., the different antenna groups and/or panels), for example, if the sum exceed (e.g., larger than and/or equal to) $P_{CMAX,f,c}(i)$.

For example, i a wireless device transmits a PUSCH on active UL BWP b of carrier f of serving cell c using parameter set configuration with index j and PUSCH power control adjustment state with index l, the wireless device may determine the PUSCH transmission power $P_{PUSCH,b,f,c}(i,j,q_d,l)$ in PUSCH transmission occasion i as $$P_{PUSCH,b,f,c}(i, j, q_d, l) = \min \begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} \text{[dBm]}.$$

In an example, $P_{CMAX,f,c}(i)$ may be the configured wireless device transmit power for carrier f of serving cell c in PUSCH transmission occasion i. $P_{O\_PUSCH,b,f,c}(j)$ may be a parameter composed of the sum of a component $P_{O\_NOMINAL\_PUSCH,f,c}(j)$ and a component $P_{O\_UE\_PUSCH,b,f,c}(i)$ where $j \in \{0, 1, \ldots, J-1\}$.

For example, if a wireless device is not provided P0-PUSCH-AlphaSet or for a PUSCH transmission scheduled by a RAR UL grant, a wireless device may determine j=0, $P_{O\_UE\_PUSCH,b,f,c}(0)=0$, and $P_{O\_NOMINAL\_PUSCH,\ f,c}(0) = P_{O\_PRE} + \Delta_{PREAMBLE\_Msg\ 3}$, where a higher layer parameter, e.g., preambleReceivedTargetPower (for $P_{O\_PRE}$) and msg3-DeltaPreamble (for $\Delta_{PREAMBLE\_Msg3}$), may be provided by higher layers, or $\Delta_{PREAMBLE\_Msg3}=0$ dB if msg3-DeltaPreamble is not provided, for carrier f of serving cell c.

In an example, for a PUSCH (re)transmission configured by ConfiguredGrantConfig, j=1, $P_{O\_NOMINAL\_PUSCH,f,c}(1)$ is provided by p0-NominalWithoutGrant, or $P_{O\_NOMINAL\_PUSCH,f,c}(1)=P_{O\_NOMINAL\_PUSCH,f,c}(0)$ if p0-NominalWithoutGrant is not provided, and $P_{O\_UE\_PUSCH,b,f,c}(1)$.is provided by p0 obtained from p0-PUSCH-Alpha in ConfiguredGrantConfig that provides an index P0-PUSCH-AlphaSetId to a set of P0-PUSCH-AlphaSet for active UL BWP b of carrier f of serving cell c.

In an example, for $j \in \{2, \ldots, J-1\}=S_J$, a $P_{O\_NOMINAL\_PUSCH,f,c}(j)$ value, applicable for all $j \in S_J$, may be provided by p0-NominalWithGrant, or $P_{O\_NOMINAL\_PUSCH,f,c}(J)=P_{O\_NOMINAL\_PUSCH,f,c}(0)$ if p0-NominalWithGrant is not provided, for each carrier f of serving cell c and a set of $P_{O\_UE\_PUSCH,b,f,c}(j)$ values are provided by a set of p0 in P0-PUSCH-AlphaSet indicated by a respective set of p0-PUSCH-AlphaSetId for active UL BWP b of carrier f of serving cell c In an example, if the wireless device is provided by SRI-PUSCH-PowerControl more than one values of p0-PUSCH-AlphaSetId and if DCI format 0_1 includes a SRI field, the wireless device may obtain a mapping from sri-PUSCH-PowerControlId in SRI-PUSCH-PowerControl between a set of values for the SRI field in DCI format 0_1 and a set of indexes provided by p0-PUSCH-AlphaSetId that map to a set of P0-PUSCH-AlphaSet values. If the PUSCH transmission is scheduled by a DCI format 0_1 that includes a SRI field, the wireless device determine the value of $P_{O\_UE\_PUSCH,b,f,c}(j)$ from the p0-PUSCH-AlphaSetId value that is mapped to the SRI field value.

If the PUSCH transmission is scheduled by a DCI format 0_0 or by a DCI format 0_1 that does not include a SRI field, or if SRI-PUSCHPowerControl is not provided to the UE, j=2, and the wireless device determines $P_{O\_UE\_PUSCH,b,f,c}(j)$ from the value of the first p0-Pusch-AlphaSet in p0-AlphaSets.

For $\alpha_{b,f,c}(j)$ with j=0, $\alpha_{b,f,c}(0)$ may be a value of msg3-Alpha, when provided; otherwise, a wireless device may determine $\alpha_{b,f,c}(0)=1$. For $\alpha_{b,f,c}(j)$ with j=1, $\alpha_{b,f,c}(1)$ may be provided by alpha obtained from p0-PUSCH-Alpha in ConfiguredGrantConfig providing an index P0-PUSCH-AlphaSetId to a set of P0-PUSCH-AlphaSet for active UL BWP b of carrier f of serving cell c. For $\alpha_{b,f,c}(j)$ with j∈$S_j$, a set of $\alpha_{b,f,c}(j)$ values may be provided by a set of alpha in P0-PUSCH-AlphaSet indicated by a respective set of p0-PUSCH-AlphaSetId for active UL BWP b of carrier f of serving cell c.

For example, if the wireless device is provided SRI-PUSCH-PowerControl and more than one values of p0-PUSCH-AlphaSetId, and if DCI format 0_1 includes a SRI field, the wireless device may obtain a mapping from sri-PUSCH-PowerControlId in SRI-PUSCH-PowerControl between a set of values for the SRI field in DCI format 0_1 and a set of indexes provided by p0-PUSCH-AlphaSetId that map to a set of P0-PUSCH-AlphaSet values. If the PUSCH transmission is scheduled by a DCI format 0_1 that includes a SRI field, the wireless device may determine the values of $\alpha_{b,f,c}(j)$ from the p0-PUSCH-AlphaSetId value that is mapped to the SRI field value For example, if the PUSCH transmission is scheduled by a DCI format 0_0 or by a DCI format 0_1 that does not include a SRI field, or if SRI-PUSCH-PowerControl is not provided to the UE, j=2, and the wireless device may determine $\alpha_{b,f,c}(j)$ from the value of the first p0-PUSCH-AlphaSet in p0-AlphaSets For example, $M_{RB,b,f,c}^{PUSCH}(i)$ may be the bandwidth of the PUSCH resource assignment expressed in number of resource blocks for PUSCH transmission occasion i on active UL BWP b of carrier f of serving cell c and μ is a SCS configuration.

For example, $PL_{b,f,c}(q_d)$ may be a downlink pathloss estimate in dB calculated by the wireless device using reference signal (RS) index $q_d$ for the active DL BWP of serving cell c.

For example, i the wireless device is not provided PUSCH-PathlossReferenceRS or before the wireless device is provided dedicated higher layer parameters, the wireless device may calculate $PL_{b,f,c}(q_d)$ using a RS resource from the SS/PBCH block that the wireless device may use to obtain MIB For example, if the wireless device is configured with a number of RS resource indexes, up to the value of maxNrofPUSCH-PathlossReferenceRSs, and a respective set of RS configurations for the number of RS resource indexes by PUSCH-PathlossReferenceRS, the set of RS resource indexes may comprise one or both of a set of SS/PBCH block indexes, each provided by ssb-Index when a value of a corresponding pusch-PathlossReferenceRS-Id maps to a SS/PBCH block index, and a set of CSI-RS resource indexes, each provided by csi-RS-Index when a value of a corresponding pusch-PathlossReferenceRS-Id maps to a CSI-RS resource index. The wireless device may identify an RS resource index $q_d$ in the set of RS resource indexes to correspond either to a SS/PBCH block index or to a CSI-RS resource index as provided by pusch-PathlossReferenceRS-Id in PUSCH-PathlossReferenceRS For example, if the PUSCH transmission is scheduled by a RAR UL grant, the wireless device may use the same RS resource index $q_d$ as for a corresponding PRACH transmission For example, if the wireless device is provided SRI-PUSCH-PowerControl and more than one values of PUSCH-PathlossReferenceRS-Id, the wireless device may obtain a mapping from sri-PUSCH-PowerControlId in SRI-PUSCH-PowerControl between a set of values for the SRI field in DCI format 0_1 and a set of PUSCH-PathlossReferenceRS-Id values. If the PUSCH transmission is scheduled by a DCI format 0_1 that includes a SRI field, the wireless device may determine the RS resource index $q_d$ from the value of PUSCH-PathlossReferenceRS-Id that is mapped to the SRI field value where the RS resource is either on serving cell C or, if provided, on a serving cell indicated by a value of pathlossReferenceLinking For example, If the PUSCH transmission is scheduled by a DCI format 0_0, and if the wireless device is provided a spatial setting by PUCCH-Spatialrelationinfo for a PUCCH resource with a lowest index for active UL BWP b of each carrier f and serving cell, the wireless device uses the same RS resource index $q_d$ as for a PUCCH transmission in the PUCCH resource with the lowest index For example, if the PUSCH transmission is scheduled by a DCI format 0_0 and if the wireless device is not provided a spatial setting for a PUCCH transmission, or by a DCI format 0_1 that does not include a SRI field, or if SRI-PUSCH-PowerControl is not provided to the wireless device, the wireless device determines a RS resource index $q_d$ with a respective PUSCH-PathlossReferenceRS-Id value being equal to zero where the RS resource is either on serving cell C or, if provided, on a serving cell indicated by a value of pathlossReferenceLinking For a PUSCH transmission configured by ConfiguredGrantConfig, if rrc-ConfiguredUplinkGrant is included in ConfiguredGrantConfig, a RS resource index $q_d$ may be provided by a value of pathlossReferenceIndex included in rrc-ConfiguredUplinkGrant where the RS resource may be either on serving cell C or, if provided, on a serving cell indicated by a value of pathlossReferenceLinking For a PUSCH transmission configured by ConfiguredGrantConfig that does not include rrc-ConfiguredUplinkGrant, the wireless device may determine an RS resource index $q_d$ from a value of PUSCH-PathlossReferenceRS-Id that is mapped to a SRI field value in a DCI format activating the PUSCH transmission. For example, if the DCI format activating the PUSCH transmission does not include a SRI field, the wireless device may determine an RS resource index $q_d$ with a respective PUSCH-PathlossReferenceRS-Id value being equal to zero where the RS resource is either on serving cell C or, if provided, on a serving cell indicated by a value of pathlossReferenceLinking The wireless device may determine $PL_{f,c}(q_d)$=referenceSignalPower−higher layer filtered RSRP, where referenceSignalPower may be provided by higher layers and a calculation of RSRP may be predefined for the reference serving cell and the higher layer filter configuration provided by QuantityConfig is for the reference serving cell For example, if the wireless device is not configured periodic CSI-RS reception, referenceSignalPower is provided by ss-PBCH-BlockPower. For example, if the wireless device is configured periodic CSI-RS reception, referenceSignalPower is provided either by ss-PBCH-BlockPower or by powerControlOffsetSS providing an offset of the CSI-RS transmission power relative to the SS/PBCH block transmission power. For example, if powerControlOffsetSS is not provided to the wireless device, the wireless device may determine an offset of 0 dB.

The wireless device may determine $\Delta_{TF,b,f,c}(i)=10 \log_{10}((2^{BPRK_s}-1)\cdot\beta_{offset}^{PUSCH})$ for $K_s=1.25$ and $\Delta_{TF,b,f,c}(\ )=0$ for $K_s=0$ where $K_s$ may be provided by deltaMCS for each UL BWP b of each carrier f and serving cell c. If the PUSCH transmission is over more than one layer, $\Delta_{TF,b,f,c}(i)=0$, BPRE and $\beta_{offset}^{PUSCH}$, for active UL BWP b of each carrier f and each serving cell c, may be computed as below
the wireless device may determine $$BPRE = \sum_{r=0}^{C-1} K_r/N_{RE}$$

for PUSCH with UL-SCH data and BPRE=$Q_m\cdot R$/$\beta_{offset}^{PUSCH}$ for CSI transmission in a PUSCH without UL-SCH data, where
c may be a number of transmitted code blocks, $K_r$ is a size for code block r, and $N_{RE}$ may be a number of resource elements determined as $$N_{RE} = M_{RB,b,f,c}^{PUSCH}(i) \cdot \sum_{j=0}^{N_{symb,b,f,c}^{PUSCH}(i)-1} N_{sc,data}^{RB}(i,j),$$

where $N_{symb,b,f,c}^{PUSCH}(i)$ may be a number of symbols for PUSCH transmission occasion i on active UL BWP b of carrier f of serving cell c, $N_{sc,data}^{RB}(i,j)$ may be a number of subcarriers excluding DM-RS subcarriers and phase-tracking RS samples in PUSCH symbol j, $0 \leq j < N_{symb,b,f,c}^{PUSCH}(i)$ and C, $K_r$ may be predefined and/or indicated by a DCI and/or RRC.

The wireless device may determine $\beta_{offset}^{PUSCH}=1$, for example, when the PUSCH includes UL-SCH data and $\beta_{offset}^{PUSCH}=\beta_{offset}^{CSI,1}$, for example, when the PUSCH includes CSI and does not include UL-SCH data.

$Q_m$ may be the modulation order and R is the target code rate, provided by the DCI format scheduling the PUSCH transmission that includes CSI and does not include UL-SCH data.

For the PUSCH power control adjustment state $f_{b,f,c}(i,l)$ for active UL BWP b of carrier f of serving cell c in PUSCH transmission occasion i $\delta_{PUSCH,b,f,c}(i,l)$ may be a transmit power control (TPC) command value included in a DCI format 0_0 or DCI format 0_1 that schedules the PUSCH transmission occasion i on active UL BWP b of carrier f of serving cell c or jointly coded with other TPC commands in a DCI format 2_2 with CRC scrambled by a particular RNTI (e.g., TPC-PUSCH-RNTI). The wireless device may determine $l \in \{0, 1\}$ if the wireless device is configured with twoPUSCH-PC-AdjustmentStates and l=0 if the wireless device is not configured with twoPUSCH-PC-AdjustmentStates or if the PUSCH transmission is scheduled by a RAR UL grant.

For a PUSCH (re)transmission configured by ConfiguredGrantConfig, the value of $l \in \{0,1\}$ may be provided to the wireless device by powerControlLoopToUse. For example, if the wireless device is provided SRI-PUSCH-PowerControl, the wireless device may obtain a mapping between a set of values for the SRI field in DCI format 0_1 and the l value(s) provided by sri-PUSCH-ClosedLoopIndex. For example, if the PUSCH transmission is scheduled by a DCI format 0_1 and if DCI format 0_1 includes a SRI field, the wireless device may determine the l value that is mapped to the SRI field value For example, if the PUSCH transmission is scheduled by a DCI format 00 or by a DCI format 0_1 that does not include a SRI field, or if a SRI-PUSCH-PowerControl is not provided to the UE, l=0 For example, if the wireless device obtains one TPC command from a DCI format 2_2 with CRC scrambled by a TPC-PUSCH-RNTI, the l value may be provided by the closed loop indicator field in DCI format 2_2.

The wireless device may determine that $$f_{b,f,c}(i,l) = f_{b,f,c}(i-i_0, l) + \sum_{m=0}^{c(D_i)-1} \delta_{PUSCH,b,f,c}(m,l)$$

is the PUSCH power control adjustment state l for active UL BWP b of carrier f of serving cell c and PUSCH transmission occasion i if the wireless device is not provided tpc-Accumulation, where the $\delta_{PUSCH,b,f,c}$ values are given in a predefined table.

For example, $$\sum_{m=0}^{c(D_i)-1} \delta_{PUSCH,b,f,c}(m,l)$$

may be a sum of TPC command values in a set $D_i$ of TPC command values with cardinality $\mathscr{C}(D_i)$ that the wireless device receives between $K_{PUSCH}(i-i_0)-1$ symbols before PUSCH transmission occasion i-$i_0$ and $K_{PUSCH}(i)$ symbols before PUSCH transmission occasion i on active UL BWP b of carrier f of serving cell c for PUSCH power control adjustment state l, where $i_0 > 0$ may be the smallest integer for which $K_{PUSCH}(i-i_0)$ symbols before PUSCH transmission occasion i-$i_0$ is earlier than $K_{PUSCH}(i)$ symbols before PUSCH transmission occasion i.

For example, if a PUSCH transmission is scheduled by a DCI format 0_0 or DCI format 0_1, $K_{PUSCH}(i)$ may be a number of symbols for active UL BWP b of carrier f of serving cell c after a last symbol of a corresponding PDCCH reception and before a first symbol of the PUSCH transmission.

For example, if a PUSCH transmission is configured by ConfiguredGrantConfig, $K_{PUSCH}(i)$ may be a number of $K_{PUSCH,min}$ symbols equal to the product of a number of symbols slot per slot, $N_{symb}^{slot}$, and the minimum of the values provided by k2 in PUSCH-ConfigCommon for active UL BWP b of carrier f of serving cell c.

For example, if the wireless device has reached maximum power for active UL BWP b of carrier f of serving cell c at PUSCH transmission occasion i-$i_0$ and $$\sum_{m=0}^{c(D_i)-1} \delta_{PUSCH,b,f,c}(m,l) \geq 0,$$

then the wireless device may determine $f_{b,f,c}(i,l)=f_{b,f,c}(i-i_0,l)$.

For example, if the wireless device has reached minimum power for active UL BWP b of carrier f of serving cell c at PUSCH transmission occasion $i$-$i_0$ and $$\sum_{m=0}^{C(D_i)-1} \delta_{PUSCH,b,f,c}(m, l) \le 0,$$

then the wireless device may determine $f_{b,f,c}(i,l)=f_{b,f,c}(i-i_0,l)$.

For example, a wireless device may reset accumulation of a PUSCH power control adjustment state l for active UL BWP b of carrier f of serving cell c to $f_{b,f,c}(0,l)=0$, for example, if a configuration for a corresponding $P_{O\_UE\_PUSCH,b,f,c}(j)$ value is provided by higher layers. For example, a wireless device may reset accumulation of a PUSCH power control adjustment state l for active UL BWP b of carrier f of serving cell c to $f_{b,f,c}(0,l)=0$, for example, if a configuration for a corresponding $\alpha_{b,f,c}(j)$ value is provided by higher layers For example, if j>1 and the PUSCH transmission is scheduled by a DCI format 0_1 that includes a SRI field, and the wireless device is provided higher SRI-PUSCH-Power-Control, the wireless device may determine the value of l from the value of i based on an indication by the SRI field for a sri-PUSCH-PowerControlId value associated with the sri-P0-PUSCH-AlphaSetId value corresponding to i and with the sri-PUSCH-ClosedLoopIndex value corresponding to l.

For example, if j>1 and the PUSCH transmission is scheduled by a DCI format 0_0 or by a DCI format 0_1 that does not include a SRI field or the wireless device is not provided SRI-PUSCH-PowerControl, the wireless device may determine l=0.

For example, if j=1, l is provided by the value of powerControlLoopToUse, the wireless device may determine that $f_{b,f,c}(i,l)=\delta_{PUSCH,b,f,c}(i,l)$ is the PUSCH power control adjustment state for active UL BWP b of carrier f of serving cell c and PUSCH transmission occasion i if the wireless device is provided tpc-Accumulation, where $\delta_{PUSCH,b,f,c}$ absolute values may be predefined.

For example, if the wireless device receives a random access response message in response to a PRACH transmission on active UL BWP b of carrier f of serving cell c, the wireless device may determine $f_{b,f,c}(0,l)=\Delta P_{rampup,b,f,c}+\delta_{msg\ 2,b,f,c}$, where the wireless device may determine that l=0 and $\delta_{msg\ 2,b,f,c}$ is a TPC command value indicated in the random access response grant of the random access response message corresponding to the PRACH transmission on active UL BWP b of carrier f in the serving cell c, and $$\Delta P_{rampup,b,f,c} = \\ \min\left[\left\{\max\left(0, P_{CMAX,f,c} - \begin{pmatrix}10\log_{10}\left(2^\mu \cdot M_{RB,b,f,c}^{PUSCH}(0)\right) + \\ P_{O\_PUSCH,b,f,c}(0) + \alpha_{b,f,c}(0) \cdot PL_c + \\ \Delta_{TF,b,f,c}(0) + \delta_{msg2,b,f,c}\end{pmatrix}\right)\right\}, \\ \Delta P_{ramp\ up\ requested,b,f,c}\right]$$

and $\Delta P_{rampuprequested,b,f,c}$ is provided by higher layers and corresponds to the total power ramp-up requested by higher layers from the first to the last random access preamble for carrier f in the serving cell c, $M_{RB,b,f,c}^{PUSCH}(0)$ is the bandwidth of the PUSCH resource assignment expressed in number of resource blocks for the first PUSCH transmission on active UL BWP b of carrier f of serving cell c, and $\Delta_{TF,b,f,c}(0)$ is the power adjustment of first PUSCH transmission on active UL BWP b of carrier f of serving cell c.

For example, if a wireless device transmits a PUCCH on active UL BWP b of carrier f in the primary cell C using PUCCH power control adjustment state with index l, the wireless device determines the PUCCH transmission power $P_{PUCCH,b,f,c}(i,q_u,q_d,l)$ in PUCCH transmission occasion i as $$P_{PUCCH,b,f,c}(i, q_u, q_d, l) = \\ \min\left\{\begin{matrix}P_{CMAX,f,c}(i), \\ P_{O\_PUCCH,b,f,c}(q_u) + 10\log_{10}\left(2^\mu \cdot M_{RB,b,f,c}^{PUCCH}(i)\right) + PL_{b,f,c}(q_d) + \\ \Delta_{F\_PUCCH}(F) + \Delta_{TF,b,f,c}(i) + g_{b,f,c}(i, l)\end{matrix}\right\} [dBm].$$

For example, $P_{CMAX,f,c}(i)$ may be the configured wireless device transmit power defined in for carrier f of serving cell c in PUCCH transmission occasion i. For example, $P_{O\_PUCCH,b,f,c}(q_u)$ may be a parameter composed of the sum of a component $P_{O\_NOMINAL\_PUCCH}$, provided by p0-nominal, or $P_{O\_NOMINAL\_PUCCH}=0$ dBm, for example, if p0-nominal is not provided, for carrier f of primary cell c and, if provided, a component $P_{O\_UE\_PUCCH}(q_u)$ provided by p0-PUCCH-Value in P0-PUCCH for active UL BWP b of carrier f of primary cell c, where $0 \le q_u < Q_u$, $Q_u$ may be a size for a set of $P_{O\_UE\_PUCCH}$ values provided by maxNrof-PUCCH-P0-PerSet. The set of $P_{O\_UE\_PUCCH}$ values may be provided by p0-Set. If p0-Set is not provided to the wireless device, the wireless device may determine $P_{O\_UE\_PUCCH}(q_u)=0$, $0 \le q_u < Q_u$.

For example, if the wireless device is provided PUCCH-SpatialRelationInfo, the wireless device may obtain a mapping, by an index provided by p0-PUCCH-Id, between a set of pucch-SpatialRelationInfoId values and a set of p0-PUCCH-Value values. If the wireless device is provided more than one values for pucch-SpatialRelationInfoId and the wireless device receives an activation command indicating a value of pucch-SpatialRelationInfoId, the wireless device may determine the p0-PUCCH-Value value through the link to a corresponding p0-PUCCH-Id index. The wireless device may apply the activation command with a time offset (e.g., 3 msec) after a slot where the wireless device transmits HARQ-ACK information for the PDSCH providing the activation command. For example, if the wireless device is not provided PUCCH-SpatialRelationInfo, the wireless device may obtain the p0-PUCCH-Value value from the P0-PUCCH with p0-PUCCH-Id value equal to 0 in p0-Set.

For example, $M_{RB,b,f,c}^{PUCCH}(i)$ may be a bandwidth of the PUCCH resource assignment expressed in number of resource blocks for PUCCH transmission occasion i on active UL BWP b of carrier f of serving cell c and μ is a SCS configuration.

For example, $PL_{b,f,c}(q_d)$ may be a downlink pathloss estimate in dB calculated by the wireless device using RS resource index $q_d$ as described elsewhere in this specification for the active DL BWP of carrier f of the primary cell c.

For example, if the wireless device is not provided pathlossReferenceRSs or before the wireless device is provided dedicated higher layer parameters, the wireless device may determine $PL_{b,f,c}(q_d)$ using a RS resource obtained from the SS/PBCH block that the wireless device uses to obtain MIB.

For example, if the wireless device is provided a number of RS resource indexes, the wireless device may determine $PL_{b,f,c}$ ($q_d$) using RS resource with index $q_d$, where $0 \leq q_d < Q_d$. $Q_d$ may be a size for a set of RS resources provided by maxNrofPUCCH-PathlossReferenceRSs. The set of RS resources may be provided by pathlossReferenceRSs. The set of RS resources may comprise one or both of a set of SS/PBCH block indexes, each provided by ssb-Index in PUCCH-PathlossReferenceRS when a value of a corresponding pucch-PathlossReferenceRS-Id maps to a SS/PBCH block index, and a set of CSI-RS resource indexes, each provided by csi-RS-Index when a value of a corresponding pucch-PathlossReferenceRS-Id maps to a CSI-RS resource index. The wireless device may identify an RS resource in the set of RS resources to correspond either to a SS/PBCH block index or to a CSI-RS resource index as provided by pucch-PathlossReferenceRS-Id in PUCCH-PathlossReferenceRS.

For example, if the wireless device is provided PUCCH-SpatialRelationInfo, the wireless device may obtain a mapping, by indexes provided by corresponding values of pucch-PathlossReferenceRS-Id, between a set of pucch-SpatialRelationInfoId values and a set of reference signal values provided by PUCCH-PathlossReferenceRS. If the wireless device is provided more than one values for pucch-SpatialRelationInfoId and the wireless device receives an activation command indicating a value of pucch-SpatialRelationInfoId, the wireless device may determine the reference signal value in PUCCH-PathlossReferenceRS through the link to a corresponding pucch-PathlossReferenceRS-Id index. The wireless device may apply the activation command with a time offset (e.g., 3 msec) after a slot where the wireless device transmits HARQ-ACK information for the PDSCH providing the activation command.

For example, if PUCCH-SpatialRelationInfo comprises servingCellId indicating a serving cell, the wireless device may receive the RS for resource index $q_d$ on the active DL BWP of the serving cell. For example, if the wireless device is not provided PUCCH-SpatialRelationInfo, the wireless device may obtain the reference signal value in PUCCH-PathlossReferenceRS from the pucch-PathlossReferenceRS-Id with index 0 in PUCCH-PathlossReferenceRS where the RS resource is either on a same serving cell or, if provided, on a serving cell indicated by a value of pathlossReferenceLinking.

For example, the parameter $\Delta_{F\_PUCCH}(F)$ may be provided by deltaF-PUCCH-f0 for PUCCH format 0, deltaF-PUCCH-f1 for PUCCH format 1, deltaF-PUCCH-f2 for PUCCH format 2, deltaF-PUCCH-f3 for PUCCH format 3, and deltaF-PUCCH-f4 for PUCCH format 4.

For example, $\Delta_{TF,b,f,c}(i)$ may be a PUCCH transmission power adjustment component on active UL BWP b of carrier f of primary cell c. For a PUCCH transmission using PUCCH format 0 or PUCCH format 1, the wireless device may determine $$\Delta_{TF,b,f,c}(i) = 10 \log_{10}\left(\frac{N_{ref}^{PUCCH}}{N_{symb}^{PUCCH}(i)}\right) + \Delta_{UCI}(i).$$

For example, $N_{symb}^{PUCCH}(i)$ may be number of PUCCH format 0 symbols or PUCCH format 1 symbols included in a PUCCH resource of a PUCCH resource set indicated by a value of a PUCCH resource indicator field in DCI format 1_0 or DCI format 1_1, or provided by nrofSymbols in PUCCH-format0 or in PUCCH-format1 respectively. For example, the wireless device may determine $N_{ref}^{PUCCH}=2$ for PUCCH format 0. For example, the wireless device may determine $N_{ref}^{PUCCH}=N_{symb}^{slot}$ for PUCCH format 1. For example, the wireless device may determine $\Delta_{UCI}(i)=0$ for PUCCH format 0. For example, the wireless device may determine $\Delta_{UCI}(i)=10 \log_{10}(O_{UCI}(i))$ for PUCCH format 1, where $O_{UCI}(i)$ may be a number of UCI bits in PUCCH transmission occasion i.

For a PUCCH transmission using PUCCH format 2 or PUCCH format 3 or PUCCH format 4 and for a number of UCI bits smaller than or equal to 11, the wireless device may determine $\Delta_{TF,b,f,c}(J)=10 \log_{10}(K_1 \cdot (n_{HARQ-ACK}(i)+O_{SR}(i)+O_{CSI}(i))/N_{RE}(i))$. For example, $K_1=6$. For example, $n_{HARQ-ACK}(i)$ may be a number of HARQ-ACK information bits that the wireless device determines for Type-1 HARQ-ACK codebook and for Type-2 HARQ-ACK codebook. If the wireless device is not provided with pdsch-HARQ-ACK-Codebook, the wireless device may determine $n_{HARQ-ACK}(i)=1$ if the wireless device includes a HARQ-ACK information bit in the PUCCH transmission; otherwise, the wireless device may determine $n_{HARQ-ACK}(i)=0$ For example, $O_{SR}(i)$ may be a number of SR information bits that the wireless device determines. For example, $O_{CSI}(i)$ may be a number of CSI information bits that the wireless device determines.

For example, $N_{RE}(i)$ may be a number of resource elements determined as $N_{RE}(i)=M_{RB,b,f,c}^{PUCCH}(i) \cdot N_{sc,ctrl}^{RB}(i) \cdot N_{symb-UCI,b,f,c}^{PUCCH}(i)$, where $N_{sc,ctrl}^{RB}(i)$ may be a number of subcarriers per resource block excluding subcarriers used for DM-RS transmission, and $N_{symb-UCI,b,f,c}^{PUCCH}(i)$ is a number of symbols excluding symbols used for DM-RS transmission for PUCCH transmission occasion i on active UL BWP b of carrier f of serving cell c For a PUCCH transmission using PUCCH format 2 or PUCCH format 3 or PUCCH format 4 and for a number of UCI bits larger than 11, the wireless device may determine $\Delta_{TF,b,f,c}(i)=10 \log_{10}(2^{K_2 \cdot BPRE(i)}-1)$.

For example, $K_2=2.4$. For example, the wireless device may determine $BPRE(i)=(O_{ACK}(i)+O_{SR}(i)+O_{CSI}(i)+O_{CRC}(i))/N_{RE}(i)$.

For example, $O_{ACK}(i)$ may be a number of HARQ-ACK information bits that the wireless device determines for Type-1 HARQ-ACK codebook and for Type-2 HARQ-ACK codebook. If the wireless device is not provided pdsch-HARQ-ACK-Codebook, the wireless device may determine $O_{ACK}=1$ if the wireless device includes a HARQ-ACK information bit in the PUCCH transmission; otherwise, $O_{ACK}=0$.

For example, $O_{SR}(i)$ may be a number of SR information bits that the wireless device determines. For example, $O_{CSI}(i)$ may be a number of CSI information bits that the wireless device determines. For example, $O_{CRC}(i)$ may be a number of CRC bits.

For example, $N_{RE}(i)$ may be a number of resource elements that the wireless device may determine as $N_{RE}(i)=M_{RB,b,f,c}^{PUCCH}(i) \cdot N_{sc,ctrl}^{RB}(i) \cdot N_{symb-UCI,b,f,c}^{PUCCH}(i)$, where $N_{sc,ctrl}^{RB}$ may be a number of subcarriers per resource block excluding subcarriers used for DM-RS transmission, and $N_{symb-UCI,b,f,c}^{PUCCH}(i)$ may be a number of symbols excluding symbols used for DM-RS transmission for PUCCH transmission occasion i on active UL BWP b of carrier f of serving cell c.

For the PUCCH power control adjustment state $g_{b,f,c}(i,l)$ for active UL BWP b of carrier f of primary cell c and PUCCH transmission occasion i, the wireless device may determine at least one of following.

For example, $\delta_{PUCCH,b,f,c}(i,l)$ may be a TPC command value and is included in a DCI format 1_0 or DCI format 1_1 for active UL BWP b of carrier f of the primary cell c that the wireless device may detect for PUCCH transmission occasion i or is jointly coded with other TPC commands in a DCI format 2_2 with CRC scrambled by a particular RNTI (e.g., TPC-PUCCH-RNTI).

For example, $l \in \{0, 1\}$ if the wireless device is provided twoPUCCH-PC-AdjustmentStates and PUCCH-SpatialRelationInfo and l=0 if the wireless device is not provided twoPUCCH-PC-AdjustmentStates or PUCCH-SpatialRelationInfo.

For example, if the wireless device obtains a TPC command value from a DCI format 1_0 or a DCI format 1_1 and if the wireless device is provided PUCCH-SpatialRelationInfo, the wireless device may obtain a mapping, by an index provided by p0-PUCCH-Id, between a set of pucch-SpatialRelationInfoId values and a set of values for closedLoopIndex that provide the l value(s). If the wireless device receives an activation command indicating a value of pucch-SpatialRelationInfoId, the wireless device may determine the value closedLoopIndex that provides the value of l through the link to a corresponding p0-PUCCH-Id index.

For example, if the wireless device obtains one TPC command from a DCI format 2_2 with CRC scrambled by a particular RNTI (e.g., TPC-PUCCH-RNTI), the l value is provided by the closed loop indicator field in DCI format 2_2, the wireless device may determine that $$g_{b,f,c}(i, l) = g_{b,f,c}(i - i_0, l) + \sum_{m=0}^{C(C_i)-1} \delta_{PUCCH,b,f,c}(m, l)$$

is the current PUCCH power control adjustment state l for active UL BWP b of carrier f of serving cell c and PUCCH transmission occasion i, where the $\delta_{PUCCH,b,f,c}$ values may be predefined.

For example, $$\sum_{m=0}^{C(C_i)-1} \delta_{PUCCH,b,f,c}(m, l)$$

may be a sum of TPC command values in a set $C_i$ of TPC command values with cardinality $\mathcal{C}$ $(C_i)$ that the wireless device receives between $K_{PUCCH}(i-i_0)-1$ symbols before PUCCH transmission occasion $i-i_0$ and $K_{PUCCH}(i)$ symbols before PUCCH transmission occasion i on active UL BWP b of carrier f of serving cell c for PUCCH power control adjustment state, where $i_0>0$ may be the smallest integer for which $K_{PUCCH}(i-i_0)$ symbols before PUCCH transmission occasion $i-i_0$ is earlier than $K_{PUCCH}(i)$ symbols before PUCCH transmission occasion i.

For example, if the PUCCH transmission is in response to a detection by the wireless device of a DCI format 1_0 or DCI format 1_1, $K_{PUCCH}(i)$ may be a number of symbols for active UL BWP b of carrier f of serving cell c after a last symbol of a corresponding PDCCH reception and before a first symbol of the PUCCH transmission.

For example, if the PUCCH transmission is not in response to a detection by the wireless device of a DCI format 1_0 or DCI format 1_1, $K_{PUCCH}(i)$ may be a number of $K_{PUCCH, min}$ symbols equal to the product of a number of symbols per slot, $N_{symb}^{slot}$, and the minimum of the values provided by k2 in PUSCH-ConfigCommon for active UL BWP b of carrier f of serving cell c.

For example, if the wireless device has reached maximum power for active UL BWP b of carrier f of primary cell c at PUCCH transmission occasion $i-i_0$ and $$\sum_{m=0}^{C(C_i)-1} \delta_{PUCCH,b,f,c}(m, l) \geq 0,$$

then the wireless device may determine $g_{b,f,c}(i,l)=g_{b,f,c}(i-i_0, l)$.

For example, if wireless device has reached minimum power for active UL BWP b of carrier f of primary cell c at PUCCH transmission occasion $i-i_0$ and $$\sum_{m=0}^{C(C_i)-1} \delta_{PUCCH,b,f,c}(m, l) \leq 0,$$

then the wireless device may determine $g_{b,f,c}(i,l)=g_{b,f,c}(i-i_0, l)$.

For example, if a configuration of a $P_{O\_PUCCH,b,f,c}(q_u)$ value for a corresponding PUCCH power control adjustment state l for active UL BWP b of carrier f of serving cell c is provided by higher layers, the wireless device may determine $g_{b,f,c}(0,l)=0$. For example, if the wireless device is provided PUCCH-SpatialRelationInfo, the wireless device may determine the value of l from the value of $q_u$ based on a pucch-SpatialRelationInfoId value associated with the p0-PUCCH-Id value corresponding to $q_u$ and with the closedLoopIndex value corresponding to l; otherwise, l=0

For example, if a configuration of a $P_{O\_PUCCH, b,f,c}(q_u)$ value for a corresponding PUCCH power control adjustment state l for active UL BWP b of carrier f of serving cell C is not provided by higher layers, the wireless device may determine that $g_{b,f,c}(0,l)=\Delta P_{rampup,b,f,c}+\delta_{b,f,c}$. For example, l=0, and $\delta_{b,f,c}$ may be the TPC command value indicated in a random access response grant corresponding to a PRACH transmission or is the TPC command value in a DCI format with CRC scrambled by a particular RNTI (e.g., C-RNTI or MCS-C-RNTI) that the wireless device detects in a first PDCCH reception in a search space set provided by recoverySearchSpaceId if the PUCCH transmission is a first PUCCH transmission after a number of symbols (e.g., 28 symbols) from a last symbol of the first PDCCH reception, and, if the wireless device transmits PUCCH on active UL BWP b of carrier f of serving cell c, the wireless device may determine $$\Delta P_{rampup,b,f,c} = \min\left[\begin{array}{l}\max\left(\begin{array}{l}0, \\ P_{CMAX,f,c} - (P_{O\_PUCCH,b,f,c} + PL_{b,f,c}(q_d) + \\ \Delta_{F\_PUCCH}(F) + \Delta_{TF,b,f,c} + \delta_{b,f,c})\end{array}\right), \\ \Delta P_{ramp\ up\ requested,b,f,c}\end{array}\right];$$

The wireless device may $$\Delta P_{rampup,b,f,c} = \min\left[\begin{array}{l}\max\left(\begin{array}{l}0, \\ P_{CMAX,f,c} - (P_{O\_PUCCH,b,f,c} + PL_{b,f,c}(q_d))\end{array}\right), \\ \Delta P_{ramp\ up\ requested,b,f,c}\end{array}\right]$$

where $\Delta P_{rampuprequested,b,f,c}$ may be provided by higher layers and corresponds to the total power ramp-up requested by higher layers from the first to the last preamble for active UL BWP b of carrier f of primary cell c, and $\Delta_{F\_PUCCH}(F)$ corresponds to PUCCH format 0 or PUCCH format 1.

If a wireless device transmits SRS on active UL BWP b of carrier f of serving cell c using SRS power control adjustment state with index l, the wireless device may determine the SRS transmission power $P_{SRS,b,f,c}(i,q_s,l)$ in SRS transmission occasion i as $$P_{SRS,b,f,c}(i, q_s, l) = \min \begin{Bmatrix} P_{CMAX,f,c}(i), \\ P_{O\_SRS,b,f,c}(q_s) + 10\log_{10}(2^{\mu} \cdot M_{SRS,b,f,c}(i)) + \alpha_{SRS,b,f,c}(q_s) \cdot \\ PL_{b,f,c}(q_d) + h_{b,f,c}(i, l) \end{Bmatrix} [dBm].$$

For example, $P_{CMAX,f,c}(i)$ may be the configured wireless device transmit power for carrier f of serving cell c in SRS transmission occasion i. For example, $P_{O\_SRS,b,f,c}(q_s)$ may be provided by p0 for active UL BWP b of carrier f of serving cell c and SRS resource set $q_s$ provided by SRS-ResourceSet and SRS-ResourceSetId; if p0 is not provided, $P_{O\_SRS, b,f,c}(q_s)=P_{O\_NOMINAL\_PUSCH, f,c}(0)$. For example, $M_{SRS,b,f,c}(i)$ may be an SRS bandwidth expressed in number of resource blocks for SRS transmission occasion i on active UL BWP b of carrier f of serving cell c and $\mu$ is a SCS configuration. For example, $\alpha_{SRS,b,f,c}(q_s)$ may be provided by alpha for active UL BWP b of carrier f of serving cell c and SRS resource set $q_s$.

For example, $PL_{b,f,c}(q_d)$ may be a downlink pathloss estimate in dB calculated by the wireless device using RS resource index $q_d$ as described elsewhere in this specification for the active DL BWP of serving cell C and SRS resource set $q_s$. The RS resource index $q_d$ may be provided by pathlossReferenceRS associated with the SRS resource set $q_s$ and may be either a ssb-Index providing a SS/PBCH block index or a csi-RS-Index providing a CSI-RS resource index.

For example, if the wireless device is not provided pathlossReferenceRS or before the wireless device is provided dedicated higher layer parameters, the wireless device may determine $PL_{b,f,c}(q_d)$ using a RS resource obtained from the SS/PBCH block that the wireless device uses to obtain MIB. For example, if the wireless device is provided pathlossReferenceLinking, the RS resource may be on a serving cell indicated by a value of pathlossReferenceLinking.

For example, the wireless device may determine $h_{b,f,c}(i, l)=f_{b,f,c}(i,l)$, where $f_{b,f,c}(i,l)$ may be the current PUSCH power control adjustment state, for example if srs-PowerControlAdjustmentStates indicates a same power control adjustment state for SRS transmissions and PUSCH transmissions.

For example, the wireless device may determine $h_{b,f,c}(i)=h_{b,f,c}(i-1)+\sum_{m=0}^{C(S_i)-1}\delta_{SRS,b,f,c}(m)$, for example, if the wireless device is not configured for PUSCH transmissions on active UL BWP b of carrier f of serving cell c, or if srs-PowerControlAdjustmentStates indicates separate power control adjustment states between SRS transmissions and PUSCH transmissions, and if tpc-Accumulation is not provided, where the $\delta_{SRS,b,f,c}$ values may be predefined.

For example, $\delta_{SRS,b,f,c}(m)$ may be jointly coded with other TPC commands in a PDCCH with DCI format 2_3. For example, $$\sum_{m=0}^{C(S_i)-1} \delta_{SRS,b,f,c}(m)$$

may be a sum of TPC command values in a set $s_i$ of TPC command values with cardinality $\mathcal{C}(S_i)$ that the wireless device receives between $K_{SRS}(i-i_0)-1$ symbols before SRS transmission occasion $i-i_0$ and $K_{SRS}(i)$ symbols before SRS transmission occasion i on active UL BWP b of carrier f of serving cell c for SRS power control adjustment state, where $i_0>0$ may be the smallest integer for which $K_{SRS}(i-i_0)$ symbols before SRS transmission occasion $i-i_0$ is earlier than $K_{SRS}(i)$ symbols before SRS transmission occasion i.

For example, if the SRS transmission is aperiodic, $K_{SRS}(i)$ may be a number of symbols for active UL BWP b of carrier f of serving cell c after a last symbol of a corresponding PDCCH triggering the SRS transmission and before a first symbol of the SRS transmission For example, if the SRS transmission is semi-persistent or periodic, $K_{SRS}(i)$ may be a number of $K_{SRS, min}$ symbols equal to the product of a number of symbols per slot, $N_{symb}^{slot}$, and the minimum of the values provided by k2 in PUSCH-ConfigCommon for active UL BWP b of carrier f of serving cell c.

For example, if the wireless device has reached maximum power for active UL BWP b of carrier f of serving cell c at SRS transmission occasion $i-i_0$ and $$\sum_{m=0}^{C(S_i)-1} \delta_{SRS,b,f,c}(m) \geq 0,$$

then the wireless device may determine $h_{b,f,c}(i)=h_{b,f,c}(i-i_0)$. For example, if the wireless device has reached minimum power for active UL BWP b of carrier f of serving cell c at SRS transmission occasion $i-i_0$ and $$\sum_{m=0}^{C(S_i)-1} \delta_{SRS,b,f,c}(m) \leq 0,$$

then the wireless device may determine $h_{b,f,c}(i)=h_{b,f,c}(i-i_0)$.

For example, if a configuration for a $P_{O\_SRS, b,f,c}(q_s)$ value or for a $\alpha_{SRS,b,f,c}(q_s)$ value for a corresponding SRS power control adjustment state l for active UL BWP b of carrier f of serving cell c is provided by higher layer, the wireless device may determine $h_{b,f,c}(0)=0$; else the wireless device may determine $h_{b,f,c}(0)=\Delta P_{rampup,b,f,c}+\delta_{msg2,b,f,c}$.

For example, $\delta_{msg2,b,f,c}$ may be the TPC command value indicated in the random access response grant corresponding to the random access preamble that the wireless device transmitted on active UL BWP b of carrier f of the serving cell c, and $$\Delta P_{rampup,b,f,c} =$$

$$\min\left[\max\left(\begin{matrix}0,\\ P_{CMAX,f,c} - (P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d))\end{matrix}\right),\\ \Delta P_{rampuprequested,b,f,c}\right].$$

For example, $\Delta P_{rampuprequested,b,f,c}$ may be provided by higher layers and corresponds to the total power ramp-up requested by higher layers from the first to the last preamble for active UL BWP b of carrier f of serving cell $c$.

For example, the wireless device may determine $h_{b,f,c}(i)$—$\delta_{SRS,b,f,c}$ if the wireless device is not configured for PUSCH transmissions on active UL BWP b of carrier f of serving cell $c$, or if srs-PowerControlAdjustmentStates indicates separate power control adjustment states between SRS transmissions and PUSCH transmissions, and tpc-Accumulation is provided, and the wireless device may detect a DCI format 2_3 $K^{SRS,\ min}$ symbols before a first symbol of SRS transmission occasion i, where absolute values of $\delta_{SRS,\ b,f,c}$ may be predefined.

For example, if srs-PowerControlAdjustmentStates indicates a same power control adjustment state for SRS transmissions and PUSCH transmissions, the update of the power control adjustment state for SRS transmission occasion i may occur at the beginning of each SRS resource in the SRS resource set $q_s$; otherwise, the update of the power control adjustment state SRS transmission occasion i may occur at the beginning of the first transmitted SRS resource in the SRS resource set $q_s$.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

According to various embodiments, a wireless device may receive configuration parameters of a first antenna group for a cell. The configuration parameters may be for a second antenna group for the cell. The wireless device may trigger a first power headroom report in response to activating the first antenna group. The wireless device may transmit the first power headroom report.

According to various embodiments, the cell may be a primary cell. According to various embodiments, the cell may be a primary secondary cell. According to various embodiments, the wireless device may activate the cell based on receiving a cell activation indicator of the cell, wherein the cell may be a secondary cell. According to various embodiments, the wireless device may trigger the first power headroom report while the cell is being activated. According to various embodiments, the first power headroom report may indicate a first power headroom value of the first antenna group for the cell. According to various embodiments, the first power headroom report may comprise a first field indicating the first power headroom value of the first antenna group for the cell. According to various embodiments, the first power headroom report may comprise a second field. According to various embodiments, the second field may be associated with the cell. According to various embodiments, the second field may be indicating a presence of the first field in the first power headroom report. According to various embodiments, the first power headroom report may comprise a first identifier indicating a presence of the first power headroom value of the first antenna group. According to various embodiments, the first power headroom report may comprise a second identifier indicating a presence of a second power headroom value of the second antenna group. According to various embodiments, the wireless device may transmit a second power headroom report comprising a second power headroom value of the second antenna group for the cell. According to various embodiments, the second power headroom report may comprise the second power headroom value based on the second antenna group being activated. According to various embodiments, based on the first antenna group being deactivated, the second power headroom report may comprise a third field indicating an absence of a fourth field in the second power headroom report. According to various embodiments, the fourth field may indicate the first power headroom value of the first antenna group for the cell. According to various embodiments, the activating the first antenna group may be based on receiving an activation indication of the first antenna group. According to various embodiments, the activating the first antenna group may be based on determining, by the wireless device, to activate the first antenna group. According to various embodiments, the activating the first antenna group may be based on receiving a response to transmitting an indication of activating the first antenna group. According to various embodiments, the configuration parameters may indicate the first antenna group is associated with a first antenna panel of the wireless device. According to various embodiments, the configuration parameters may indicate the second antenna group is associated with a second antenna panel of the wireless device. According to various embodiments, the configuration parameters may indicate that the first antenna group is associated with a first sounding reference signal resource set comprising one or more first sounding reference signal resources. According to various embodiments, the configuration parameters may indicate that the second antenna group is associated with a second sounding reference signal resource set comprising one or more second sounding reference signal resources. According to various embodiments, the configuration parameters may indicate that a first pathloss reference signal is used to measure a first pathloss value of the first antenna group. According to various embodiments, the configuration parameters may indicate that a second pathloss reference signal is used to measure a second pathloss value of the second antenna group. According to various embodiments, the wireless device may determine the first power headroom value based on the first pathloss value of the first antenna group. According to various embodiments, the wireless device may determine that the first power headroom value is based on first transmission power parameters of the uplink transmission in response to an uplink transmission scheduled on the cell. According to various embodiments, the wireless device may determine that the first power headroom value is based on, in response to no uplink transmission scheduled on the cell, second transmission power parameters of a reference uplink transmission. According to various embodiments, the first transmission power parameters may comprise the second transmission power parameters and one or more power offset values. According to various embodiments, the second transmission power parameters may comprise a reference transmission power, a scaling factor, and the second pathloss value.

According to various embodiments, a wireless device may receive configuration parameters of a first antenna group for a cell. The configuration parameters may be for a second antenna group for the cell. The wireless device may transmit a first power headroom report. The first power headroom report may comprise a power headroom value of the first antenna group for the cell in response to the first antenna group being activated. The wireless device may trigger, in response to activating the second antenna group, a second power headroom report. The wireless device may transmit the second power headroom report. According to various embodiments, the second power headroom report comprises a first power headroom value of the first antenna group for the cell and a second power headroom value of the second antenna group for the cell.

According to various embodiments, a wireless device may receive configuration parameters of a first antenna group for a cell and of a second antenna group for the cell. The wireless device may transmit a first power headroom report. According to various embodiments, the first power headroom report may comprise a power headroom value of the first antenna group for the cell in response to the first antenna group being activated. The wireless device may receive an activation indicator of the second antenna group. The wireless device may activate the second antenna group based on receiving the activation indicator. The wireless device may trigger, in response to the activating the second antenna group, a second power headroom report. The wireless device may transmit the second power headroom report comprising a first power headroom value of the first antenna group for the cell and a second power headroom value of the second antenna group for the cell. According to various embodiments, According to various embodiments, a wireless device may receive configuration parameters of a plurality of antenna groups of the wireless device. According to various embodiments, the wireless device may determine an activation of a first antenna group of the plurality of antenna groups. According to various embodiments, the wireless device may transmit, based on determining the activation of the first antenna group, an indication of the activation of the first antenna group. According to various embodiments, the wireless device may receive a response to the indication. According to various embodiments, the wireless device may trigger, based on receiving the response to the indication, a power headroom report comprising a power headroom value of the first antenna group. According to various embodiments, the wireless device may transmit, via an uplink radio resource, the power headroom report.

According to various embodiments, a wireless device may receive configuration parameters of a plurality of antenna groups of the wireless device. According to various embodiments, the wireless device may determine an activation of a first antenna group of the plurality of antenna groups. According to various embodiments, the wireless device may trigger, based on determining the activation of the first antenna group, a power headroom report comprising a power headroom value of the first antenna group. According to various embodiments, the wireless device may transmit an indication of the activation of the first antenna group and the power headroom report.

According to various embodiments, a base station may transmit configuration parameters of a first antenna group for a cell. According to various embodiments, the configuration parameters may be for a second antenna group for the cell. According to various embodiments, the base station, transmit an activation indication that activates the first antenna group. According to various embodiments, activating the first antenna group may trigger a first power headroom report. According to various embodiments, the base station may receive the first power headroom report.

According to various embodiments, the cell may be a primary cell. According to various embodiments, the cell may be a primary secondary cell. According to various embodiments, the base station may transmit a cell activation indication activating the cell. According to various embodiments, the cell may be a secondary cell. According to various embodiments, the base station may transmit the activation indication while the cell is being activated. According to various embodiments, the first power headroom report may indicate a first power headroom value of the first antenna group for the cell. According to various embodiments, the first power headroom report may comprise a first field indicating the first power headroom value of the first antenna group for the cell and a second field. According to various embodiments, the second field may be associated with the cell. According to various embodiments, the second field may indicate a presence of the first field in the first power headroom report. According to various embodiments, the first power headroom report comprises: a first identifier indicating a presence of the first power headroom value of the first antenna group; and a second identifier indicating a presence of a second power headroom value of the second antenna group. According to various embodiments, the base station receive a second power headroom report comprising a second power headroom value of the second antenna group for the cell. According to various embodiments, the second power headroom report may comprise the second power headroom value based on the second antenna group being activated. According to various embodiments, based on the first antenna group being deactivated, the second power headroom report may comprise a third field indicating an absence of a fourth field in the second power headroom report. According to various embodiments, the fourth field may indicate the first power headroom value of the first antenna group for the cell. According to various embodiments, activating the first antenna group may be based on transmitting a response to receiving an indication of activating the first antenna group. According to various embodiments, the configuration parameters may indicate the first antenna group is associated with a first antenna panel of the wireless device and the second antenna group is associated with a second antenna panel of the wireless device. According to various embodiments, the configuration parameters may indicate that the first antenna group is associated with a first sounding reference signal resource set comprising one or more first sounding reference signal resources. According to various embodiments, the configuration parameters may indicate that the second antenna group is associated with a second sounding reference signal resource set comprising one or more second sounding reference signal resources. According to various embodiments, the configuration parameters may indicate that a first pathloss reference signal is used to measure a first pathloss value of the first antenna group. According to various embodiments, the configuration parameters may indicate that a second pathloss reference signal is used to measure a second pathloss value of the second antenna group. According to various embodiments, the first power headroom value may be based on the first pathloss value of the first antenna group. According to various embodiments, the first power headroom value may be based on, in response to an uplink transmission scheduled on the cell, first transmission power parameters of the uplink transmission. According to various embodiments, the first power headroom value may be based on, in response to no uplink transmission scheduled on the cell, second transmission power parameters of a reference uplink transmission. According to various embodiments, the first transmission power parameters may comprise the second transmission power parameters and one or more power offset values. According to various embodiments, the second transmission power parameters may comprise a reference transmission power, a scaling factor, and the second pathloss value.

According to various embodiments, a base station may transmit configuration parameters of a first antenna group for a cell and of a second antenna group for the cell. According to various embodiments, the base station may receive a first power headroom report. According to various embodiments, the first power headroom report may comprise a first power headroom value of the first antenna group for the cell in response to the first antenna group being activated. According to various embodiments, the first power headroom report may not comprise a second power headroom value of the second antenna group for the cell in response to the second antenna group being deactivated. According to various embodiments, the base station may transmit an activation indicator activating the second antenna group. According to various embodiments, the base station may receive a second power headroom report triggered in response to the activation indicator. According to various embodiments, the second power headroom report comprises a third power headroom value of the first antenna group for the cell and a fourth power headroom value of the second antenna group for the cell. According to various embodiments, the base station may receive a control signal indicating an activation of the second antenna group. According to various embodiments, the base station may transmit a cell activation indicator activating the cell.

According to various embodiments, a wireless device may determine a plurality of pathloss change values. According to various embodiments, each of the plurality of pathloss change values may be for a respective one of a plurality of antenna groups for a cell. According to various embodiments, the wireless device may trigger a power headroom report based on at least one of the plurality of pathloss change values being larger than a power headroom pathloss change value for the cell. According to various embodiments, the wireless device may transmit the power headroom report indicating power headroom values of the plurality of antenna groups for the cell.

According to various embodiments, the wireless device may receive configuration parameters indicating the power headroom pathloss change value and a timer value used for determining that a power headroom prohibit timer expires. According to various embodiments, the wireless device may trigger the power headroom further based on a determination that the power headroom prohibit timer has expired. According to various embodiments, the plurality of antenna groups may comprise a first antenna group. According to various embodiments, the plurality of pathloss change values may comprise a first pathloss change value for the first antenna group. According to various embodiments, the power headroom values may comprise a first power headroom value for the first antenna group. According to various embodiments, the wireless device may measure a first pathloss value based on the first antenna group. According to various embodiments, the first pathloss change value of the first antenna group may be determined based on a difference between the first pathloss value and a second pathloss value. According to various embodiments, the second pathloss value may be measured based on the first antenna group during a transmission time of the last transmission of a power headroom report. According to various embodiments, the wireless device may start the power headroom prohibit timer based on performing the last transmission of the power headroom report. According to various embodiments, the first pathloss value may be measured on a first downlink pathloss reference signal. According to various embodiments, the second pathloss value may be measured on a second downlink pathloss reference signal. According to various embodiments, the cell may be activated while the wireless device determines the first power headroom value. According to various embodiments, the first antenna group may be activated while the wireless device determines the first power headroom value. According to various embodiments, the wireless device may determine that the first power headroom value is based on first transmission power parameters of the uplink transmission in response to an uplink transmission scheduled on the cell. According to various embodiments, the wireless device may determine that the first power headroom value is based on second transmission power parameters a reference uplink transmission in response to no uplink transmission scheduled on the cell. According to various embodiments, the first transmission power parameters may comprise the second transmission power parameters and one or more power offset values. According to various embodiments, the second transmission power parameters may comprise a reference transmission power, a scaling factor, and the first pathloss value. According to various embodiments, the plurality of antenna groups may further comprise a second antenna group. According to various embodiments, the configuration parameters indicate that the first antenna group is associated with a first antenna panel of the wireless device. According to various embodiments, the configuration parameters indicate that the second antenna group is associated with a second antenna panel of the wireless device. According to various embodiments, the configuration parameters may indicate that the first antenna group is associated with a first sounding reference signal resource set comprising one or more first sounding reference signal resources. According to various embodiments, the configuration parameters may indicate that the second antenna group is associated with a second sounding reference signal resource set comprising one or more second sounding reference signal resources. According to various embodiments, the power headroom report may comprise a first field indicating a presence of a second field in the power headroom report. According to various embodiments, the first field may further indicate a presence of at least one first power headroom value of the first antenna group for the cell in the power headroom report. According to various embodiments, the second field may indicate the first power headroom value of the first antenna group for the cell.

According to various embodiments, a wireless device may receive configuration parameters indicating a power headroom pathloss change value. According to various embodiments, the wireless device may determine a plurality of pathloss change values. According to various embodiments, each of the plurality of pathloss change values is for a respective one of a plurality of antenna groups for a cell. According to various embodiments, the wireless device may trigger a power headroom report based on at least one of the plurality of pathloss change values being larger than a power headroom pathloss change value for the cell. According to various embodiments, the wireless device may transmit the power headroom report indicating power headroom values of the plurality of antenna groups for the cell.

According to various embodiments, a wireless device may receive configuration parameters indicating a power headroom pathloss change value. According to various embodiments, the wireless device may measure a first pathloss value of a first antenna group of a plurality of antenna groups. According to various embodiments, the wireless device may determine a plurality of pathloss change values. According to various embodiments, each of the plurality of pathloss change values may be for a respective one of the plurality of antenna groups for a cell. According to various embodiments, a first pathloss change value of the first antenna group may be determined based on a difference between the first pathloss value and a second pathloss value measured during a transmission time of the last power headroom report. According to various embodiments, the wireless device may trigger a power headroom report based on at least one of the plurality of pathloss change values being larger than a power headroom pathloss change value for the cell. According to various embodiments, the wireless device may transmit the power headroom report indicating power headroom values of the plurality of antenna groups for the cell.

According to various embodiments, a base station may transmit configuration parameters of a plurality of antenna groups for a cell. The base station may receive a power headroom report indicating power headroom values of the plurality of antenna groups for the cell. According to various embodiments, the power headroom report may be triggered based on at least one of a plurality of pathloss change values being larger than a power headroom pathloss change value for the cell. According to various embodiments, each of the plurality of pathloss change values may be for a respective one of a plurality of antenna groups for the cell.

According to various embodiments, the configuration parameters may indicate the power headroom pathloss change value and a timer value used for determining when a power headroom prohibit timer expires. According to various embodiments, the power headroom report may be triggered further based on a determination that the power headroom prohibit timer has expired. According to various embodiments, the plurality of antenna groups may comprise a first antenna group. According to various embodiments, the plurality of pathloss change values may comprise a first pathloss change value for the first antenna group. According to various embodiments, the power headroom values may comprise a first power headroom value for the first antenna group. According to various embodiments, a first pathloss value may be measured based on the first antenna group. According to various embodiments, the first pathloss change value of the first antenna group may be determined based on a difference between the first pathloss value and a second pathloss value. According to various embodiments, the second pathloss value may be measured based on the first antenna group during a transmission time of the last transmission of a power headroom report. According to various embodiments, the base station may start the power headroom prohibit timer based on receiving the last transmission of the power headroom report. According to various embodiments, the first pathloss value may be measured on a first downlink pathloss reference signal. According to various embodiments, the second pathloss value may be measured on a second downlink pathloss reference signal. According to various embodiments, the cell may be being activated while the first power headroom value is determined. According to various embodiments, the first antenna group may be being activated while the first power headroom value is determined. According to various embodiments, the first power headroom value may be based on first transmission power parameters of the uplink transmission in response to an uplink transmission scheduled on the cell. According to various embodiments, the first power headroom value may be based on second transmission power parameters a reference uplink transmission in response to no uplink transmission scheduled on the cell. According to various embodiments, the first transmission power parameters may comprise the second transmission power parameters and one or more power offset values. According to various embodiments, the second transmission power parameters may comprise a reference transmission power, a scaling factor, and the first pathloss value. According to various embodiments, the plurality of antenna groups may further comprise a second antenna group. According to various embodiments, the configuration parameters may indicate that the first antenna group is associated with a first antenna panel of the wireless device. According to various embodiments, the configuration parameters may indicate that the second antenna group is associated with a second antenna panel of the wireless device. According to various embodiments, the configuration parameters may indicate that the first antenna group is associated with a first sounding reference signal resource set comprising one or more first sounding reference signal resources. According to various embodiments, the configuration parameters may indicate that the second antenna group is associated with a second sounding reference signal resource set comprising one or more second sounding reference signal resources. According to various embodiments, the power headroom report may comprise a first field indicating a presence of a second field in the power headroom report. According to various embodiments, the first field further may indicate a presence of at least one first power headroom value of the first antenna group for the cell in the power headroom report. According to various embodiments, the second field may indicate the first power headroom value of the first antenna group for the cell.

According to various embodiments, a wireless device may measure a first pathloss during a first time interval. The wireless device may determine a first pathloss change value of a first antenna group based on a difference between the first pathloss value and a second pathloss value measured during a second time interval. According to various embodiments, the second time interval may be determined based on deactivating or activating the first antenna group. According to various embodiments, the wireless device may transmit a first power headroom report based on the first pathloss change value.

According to various embodiments, the wireless device may deactivate the first antenna group. According to various embodiments, the wireless device may activate the deactivated first antenna group. According to various embodiments, the first power headroom report may comprise a first power headroom value determined based on the first pathloss value. According to various embodiments, the wireless device may trigger the first power headroom report based on the first pathloss change value being larger than a power headroom pathloss change value. According to various embodiments, the wireless device may trigger the first power headroom report further based on a determination that a power headroom prohibit timer has expired. According to various embodiments, the first power headroom report may comprise a first power headroom value of the first antenna group. According to various embodiments, the first power headroom value may be determined based on the first pathloss value. According to various embodiments, the wireless device may start the power headroom prohibit timer and a power headroom periodic timer based on the transmitting the first power headroom report. According to various embodiments, the second pathloss value measured during the second time interval may be the last measurement before deactivating the first antenna group. According to various embodiments, the second pathloss value measured during the second time interval may be the first measurement after activating the deactivated first antenna group. According to various embodiments, the last transmission of power headroom report may be performed during the second time interval, the power headroom report comprising a third power headroom value of the first antenna group. According to various embodiments, the second time interval may be before deactivating the first antenna group. According to various embodiments, the wireless device may receive configuration parameters of one or more power headroom reports comprising the first power headroom report. According to various embodiments, the configuration parameters may indicate one or more reference signals of the first antenna group. According to various embodiments, the configuration parameters may indicate a first reference signal of the one or more reference signals being used for measuring the first pathloss value. According to various embodiments, the configuration parameters may indicate a second reference signal of the one or more reference signals being used for measuring the second pathloss value. According to various embodiments, the configuration parameters may indicate a power headroom pathloss change value used for determining to trigger a power headroom report based on a measured pathloss change. According to various embodiments, the configuration parameters may indicate a timer value used for determining when a power headroom prohibit timer expires. According to various embodiments, the wireless device may determine a plurality of pathloss change values comprising the first pathloss change value of the first antenna group. According to various embodiments, each of the plurality of pathloss change values may be for a respective one of a plurality of antenna groups of a cell. According to various embodiments, the first power headroom report may be triggered based on at least one of the plurality of pathloss change values being larger than a power headroom pathloss change value. According to various embodiments, the first power headroom report may indicate power headroom values of the plurality of antenna groups of the cell. According to various embodiments, the wireless device may transmit a second power headroom report. According to various embodiments, the second power headroom report may comprise, based on the first antenna group being activated, a respective power headroom value of the first antenna group. According to various embodiments, the second power headroom report may not comprise, based on the first antenna group being deactivated, the respective power headroom value of the first antenna group.

According to various embodiments, a wireless device may transmit, during a first time interval, a first power headroom report. The wireless device may measure a first pathloss during a second time interval. The wireless device may determine a first pathloss change value of a first antenna group based on a difference between the first pathloss value and a second pathloss value measured during a third time interval. According to various embodiments, the third time interval may be different from the first time interval. According to various embodiments, the third time interval may be determined based on deactivating or activating the first antenna group. According to various embodiments, the wireless device may transmit a second power headroom report based on the first pathloss change value.

According to various embodiments, the wireless device may transmit, via a first time interval, a first power headroom report. According to various embodiments, the wireless device may measure a first pathloss value of a first antenna group during a second time interval. According to various embodiments, the wireless device may determine a first pathloss change value of the first antenna group based on a difference between the first pathloss value and a second pathloss value measured during a third time interval. According to various embodiments, the third time interval may be different from the first time interval. According to various embodiments, the third time interval may be determined based on deactivating the first antenna group. According to various embodiments, the wireless device may transmit a first power headroom report triggered based on the difference being larger than a power headroom pathloss change.

According to various embodiments, a wireless device may deactivate a first antenna group. The wireless device may transmit a first power headroom report. According to various embodiments, the wireless device may activate the deactivated first antenna group. According to various embodiments, the wireless device may measure a first pathloss value of a first antenna group during a first time interval. According to various embodiments, the first pathloss value may be the first pathloss measurement of the first antenna group after activating the deactivated first antenna group. According to various embodiments, the wireless device may determine, during a second time interval, a first pathloss change value of the first antenna group. According to various embodiments, the first pathloss change value may be determined based on a difference between the first pathloss value and a second pathloss value measured during the second time interval. According to various embodiments, the wireless device may transmit a first power headroom report triggered based on the difference being larger than a power headroom pathloss change.

According to various embodiments, a wireless device may transmit a first power headroom report via a first time interval. According to various embodiments, the wireless device may measure a first pathloss value of a first antenna group during a second time interval. According to various embodiments, the wireless device may determine a first pathloss change value of a first antenna group of the wireless device based on a difference between the first pathloss value and a second pathloss value. According to various embodiments, the second pathloss value may be, in response to the first antenna group being activated during the first time interval, a pathloss value used for a power headroom value of the first antenna group in the first power headroom report. According to various embodiments, the second pathloss value may be, in response to the first antenna group being deactivated during the first time interval, a pathloss value measured while the first antenna group is being activated. According to various embodiments, the wireless device may transmit a second power headroom report indicating power headroom values of the plurality of antenna groups.

According to various embodiments, a base station may transmit, a deactivation indication deactivating a first antenna group. The base station may transmit an activation indication activating the deactivated first antenna group. According to various embodiments, the base station may receive a first power headroom report comprising a first power headroom value of the first antenna group. According to various embodiments, the first power headroom value may be based on a first pathloss change value of the first antenna group. According to various embodiments, the first pathloss change value of the first antenna group may be determined based on a difference between a first pathloss value and a second pathloss value measured during a second time interval. According to various embodiments, the second time interval may be determined based on deactivating or activating the first antenna group.

According to various embodiments, the first power headroom value may be determined based on the first pathloss value. According to various embodiments, the first power headroom report may be triggered based on the first pathloss change value being larger than a power headroom pathloss change value. According to various embodiments, the first power headroom report may be triggered further based on a determination that a power headroom prohibit timer has expired. According to various embodiments, the first pathloss value may be measured during a first time interval. According to various embodiments, the first time interval may be different from the second time interval. According to various embodiments, the base station may start the power headroom prohibit timer and a power headroom periodic timer based on the transmitting the first power headroom report. According to various embodiments, the second pathloss value measured during the second time interval may be the last measurement before deactivating the first antenna group. According to various embodiments, the second pathloss value measured during the second time interval may be the first measurement after activating the deactivated first antenna group. According to various embodiments, the last reception of power headroom report may be performed during the second time interval, wherein the power headroom report may comprise a third power headroom value of the first antenna group. According to various embodiments, the second time interval may be before deactivating the first antenna group. According to various embodiments, the base station may transmit configuration parameters of one or more power headroom reports comprising the first power headroom report. According to various embodiments, the configuration parameters may indicate one or more reference signals of the first antenna group. According to various embodiments, the configuration parameters may indicate that a first reference signal of the one or more reference signals may be used for measuring the first pathloss value. According to various embodiments, the configuration parameters may indicate that a second reference signal of the one or more reference signals may be used for measuring the second pathloss value. According to various embodiments, the configuration parameters may indicate a power headroom pathloss change value used for determining to trigger a power headroom report based on a measured pathloss change. According to various embodiments, the configuration parameters may indicate a timer value used for determining when a power headroom prohibit timer expires. According to various embodiments, the configuration parameters may indicate a plurality of antenna groups comprising the first antenna group. According to various embodiments, the first power headroom report may be triggered based on at least one of a plurality of pathloss change values being larger than a power headroom pathloss change value. According to various embodiments, the first power headroom report may indicate power headroom values of the plurality of antenna groups of the cell. According to various embodiments, the plurality of pathloss change values may comprise the first pathloss change value of the first antenna group. According to various embodiments, each of the plurality of pathloss change values may be for a respective one of a plurality of antenna groups of a cell. According to various embodiments, the base station may receive a second power headroom report. According to various embodiments, the second power headroom report may comprise, based on the first antenna group being activated, a respective power headroom value of the first antenna group. According to various embodiments, the second power headroom report may not comprise, based on the first antenna group being deactivated, the respective power headroom value of the first antenna group.

According to various embodiments, a base station may transmit configuration parameters of a first antenna group. According to various embodiments, the base station may transmit a deactivation indication deactivating the first antenna group. According to various embodiments, the base station may receive a first power headroom report that does not comprise a first power headroom value of the first antenna group. According to various embodiments, the base station may transmit an activation indication activating the deactivated first antenna group. According to various embodiments, the base station may receive a second power headroom report comprising a second power headroom value of the first antenna group. According to various embodiments, the second power headroom value may be based on a first pathloss change value of the first antenna group. According to various embodiments, the first pathloss change value of the first antenna group may be determined based on a difference between a first pathloss value and a second pathloss value measured during a second time interval. According to various embodiments, the second time interval may be determined based on deactivating or activating the first antenna group.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEW-MathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:
1. A wireless device comprising:
one or more processors; and
memory storing instructions that, when executed by the one or more processors, cause the wireless device to:
receive a radio resource control message comprising:
a first sounding reference signal (SRS) resource set identifier of a first SRS resource set of a serving cell; and
a second SRS resource set identifier of a second SRS resource set of the serving cell; and
transmit a power headroom report (PHR) medium access control control element (MAC CE) comprising:
a first field indicating a first power headroom value associated with the first SRS resource set; and
a second field indicating a second power headroom value associated with the second SRS resource set;
wherein an order of the first field and the second field in the PHR MAC CE is based on an ascending order of the first SRS resource set identifier and the second SRS resource set identifier.

2. The wireless device of claim 1, wherein:
the first SRS resource set comprises one or more first SRS resources; and
the second SRS resource set comprises one or more second SRS resources.

3. The wireless device of claim 1, wherein at least one of the first SRS resource set or the second SRS resource set is associated with a time domain behavior that is:
periodic;
semi-persistent; or
aperiodic.

4. The wireless device of claim 3, wherein the aperiodic time domain behavior is triggered by one or more trigger types.

5. The wireless device of claim 1, wherein a particular logical channel identifier (LCID) of the PHR MAC CE indicates the PHR MAC CE is a single entry PHR MAC CE or a multiple entry PHR MAC CE.

6. The wireless device of claim 1, wherein the PHR MAC CE further comprises at least one of:
a presence/absence indicator field indicating that power headroom is associated with a corresponding serving cell of a serving cell index;
a reservation field;
a power headroom mode indicator indicating whether a power headroom value is based on a real transmission or a reference format;
a power backoff indicator indicating whether power backoff is applied; or
a configured transmit power for a serving cell used for determining a preceding power headroom field.

7. The wireless device of claim 6, wherein the presence/absence indicator field is represented in:
a single octet bitmap if a highest serving cell index of the serving cell with configured uplink is less than 8; or
a four octet bitmap if the highest serving cell index of the serving cell with configured uplink is equal to or higher than 8.

8. A base station comprising:
one or more processors; and
memory storing instructions that, when executed by the one or more processors, cause the base station to:
transmit, to a wireless device, a radio resource control message comprising:
a first sounding reference signal (SRS) resource set identifier of a first SRS resource set of a serving cell; and
a second SRS resource set identifier of a second SRS resource set of the serving cell; and
receive, from the wireless device, a power headroom report (PHR) medium access control control element (MAC CE) comprising:
a first field indicating a first power headroom value associated with the first SRS resource set; and
a second field indicating a second power headroom value associated with the second SRS resource set;
wherein an order of the first field and the second field in the PHR MAC is based on an ascending order of the first SRS resource set identifier and the second SRS resource set identifier.

9. The base station of claim 8, wherein:
the first SRS resource set comprises one or more first SRS resources; and
the second SRS resource set comprises one or more second SRS resources.

10. The base station of claim 8, wherein at least one of the first SRS resource set or the second SRS resource set is associated with a time domain behavior that is:
periodic;
semi-persistent; or
aperiodic.

11. The base station of claim 10, wherein the aperiodic time domain behavior is triggered by one or more trigger types.

12. The base station of claim 8, wherein a particular logical channel identifier (LCID) of the PHR MAC CE indicates the PHR MAC CE is a single entry PHR MACE CE or a multiple entry PHR MAC CE.

13. The base station of claim 8, wherein the PHR MAC CE further comprises at least one of:
a presence/absence indicator field indicating that power headroom is associated with a corresponding serving cell of a serving cell index;
a reservation field;
a power headroom mode indicator indicating whether a power headroom value is based on a real transmission or a reference format;
a power backoff indicator indicating whether power backoff is applied; or
a configured transmit power for a serving cell used for determining a preceding power headroom field.

14. The base station of claim 13, wherein the presence/absence indicator field is represented in:
a single octet bitmap if a highest serving cell index of the serving cell with configured uplink is less than 8; or
a four octet bitmap if the highest serving cell index of the serving cell with configured uplink is equal to or higher than 8.

15. A non-transitory computer-readable medium comprising instructions that, when executed by one or more processors of a wireless device, cause the wireless device to:
receive a radio resource control message comprising:
a first sounding reference signal (SRS) resource set identifier of a first SRS resource set of a serving cell; and
a second SRS resource set identifier of a second SRS resource set of the serving cell; and
transmit a power headroom report (PHR) medium access control control element (MAC CE) comprising:
a first field indicating a first power headroom value associated with the first SRS resource set; and
a second field indicating a second power headroom value associated with the second SRS resource set;
wherein an order of the first field and the second field in the PHR MAC CE is based on an ascending order of the first SRS resource set identifier and the second SRS resource set identifier.

16. The non-transitory computer-readable medium of claim 15, wherein at least one of the first SRS resource set or the second SRS resource set is associated with a time domain behavior that is:
periodic;
semi-persistent; or
aperiodic.

17. The non-transitory computer-readable medium of claim 16, wherein the aperiodic time domain behavior is triggered by one or more trigger types.

18. The non-transitory computer-readable medium of claim 15, wherein a particular logical channel identifier (LCID) of the PHR MAC CE indicates the PHR MAC CE is a single entry PHR MAC CE or a multiple entry PHR MAC CE.

19. The non-transitory computer-readable medium of claim 15, wherein the PHR MAC CE further comprises at least one of:
- a presence/absence indicator field indicating that power headroom is associated with a corresponding serving cell of a serving cell index;
- a reservation field;
- a power headroom mode indicator indicating whether a power headroom value is based on a real transmission or a reference format;
- a power backoff indicator indicating whether power backoff is applied; or
- a configured transmit power for a serving cell used for determining a preceding power headroom field.

20. The non-transitory computer-readable medium of claim 19, wherein the presence/absence indicator field is represented in:
- a single octet bitmap if a highest serving cell index of the serving cell with configured uplink is less than 8; or
- a four octet bitmap if the highest serving cell index of the serving cell with configured uplink is equal to or higher than 8.

* * * * *